US012689731B2

(12) United States Patent (10) Patent No.: US 12,689,731 B2
Tsukuba (45) Date of Patent: Jul. 21, 2026

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 119 days.

(21) Appl. No.: 18/570,084

(22) PCT Filed: Jun. 20, 2022

(86) PCT No.: PCT/JP2022/024461
§ 371 (c)(1),
(2) Date: Dec. 14, 2023

(87) PCT Pub. No.: WO2022/270451
PCT Pub. Date: Dec. 29, 2022

(65) Prior Publication Data
US 2024/0275970 A1 Aug. 15, 2024

Related U.S. Application Data

(60) Provisional application No. 63/214,327, filed on Jun. 24, 2021.

(51) Int. Cl.
*H04N 19/13* (2014.01)
*H04N 19/103* (2014.01)
(Continued)

(52) U.S. Cl.
CPC ........... *H04N 19/13* (2014.11); *H04N 19/103* (2014.11); *H04N 19/157* (2014.11);
(Continued)

(58) Field of Classification Search
CPC .... H04N 19/103; H04N 19/13; H04N 19/157; H04N 19/18; H04N 19/176
See application file for complete search history.

(56) References Cited

U.S. PATENT DOCUMENTS

2012/0300839 A1* 11/2012 Sze ......................... H04N 19/91
375/E7.243
2013/0177069 A1* 7/2013 Sze ......................... H04N 19/70
375/240.02
(Continued)

FOREIGN PATENT DOCUMENTS

WO WO-2021058655 A1 4/2021
WO WO-2022232064 A1 11/2022

OTHER PUBLICATIONS

International Search Report and Written Opinion mailed on Aug. 23, 2022, received for PCT Application PCT/JP2022/024461, filed on Jun. 20, 2022, 11 pages including English Translation.
(Continued)

*Primary Examiner* — Zhubing Ren
(74) *Attorney, Agent, or Firm* — XSENSUS, LLP

(57) ABSTRACT

The present disclosure relates to an image processing device and method capable of suppressing an increase in a processing amount of encoding and decoding. In a case of a high-throughput mode in which a context encoding bin after a last coefficient position of image data is processed as a bypass encoding bin, a prefix portion of the last coefficient position is encoded or decoded as a bypass encoding bin. Furthermore, in the case of the high-throughput mode, encoding or decoding of the last coefficient position is skipped. The present disclosure can be applied to, for example, an image processing device, an image encoding device, an image decoding device, a transmission device, a reception device, a transmission and reception device, an information processing device, an imaging device, a regeneration device, an electronic device, an image processing method, an information processing method, or the like.

13 Claims, 33 Drawing Sheets

(51) Int. Cl.

| | |
|---|---|
| *H04N 19/157* | (2014.01) |
| *H04N 19/176* | (2014.01) |
| *H04N 19/18* | (2014.01) |
| *H04N 19/70* | (2014.01) |

(52) U.S. Cl.
CPC .......... *H04N 19/176* (2014.11); *H04N 19/18* (2014.11); *H04N 19/70* (2014.11)

(56) References Cited

U.S. PATENT DOCUMENTS

| 2013/0188734 | A1 | 7/2013 | Kim | |
| 2020/0396487 | A1* | 12/2020 | Nalci | H04N 19/186 |
| 2021/0211673 | A1* | 7/2021 | Schwarz | H04N 19/13 |
| 2024/0056585 | A1* | 2/2024 | Wang | H04N 19/13 |
| 2024/0064303 | A1* | 2/2024 | Yu | H04N 19/132 |

OTHER PUBLICATIONS

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v2, Oct. 7-16, 2020, pp. 1-512.

Wang et al., "AHG8: a full-bypass mode in residual coding for high bit depth and high bit rate extensions", Joint Video Experts Team (JVET) of ITU-T SG 16 WP 3 and ISO/IEC JTC 1/SC 29, JVET-V0122-v2, 22nd Meeting, by teleconference, Apr. 2021, pp. 1-217.

Wang et al., "AHG8: a combination of JVET-V0059 option 2 and JVET-V0122 for high bit depth and high bit rate extensions", JVET-V0178-v1, Joint Video Experts Team (JVET) of ITU-T SG 16 WP 3 and ISO/IEC JTC 1/SC 29, Apr. 27, 2021, pp. 1-217.

Chen et al., "Algorithm description for Versatile Video Coding and Test Model 11 (VTM 11)", Joint Video Experts Team (JVET) of ITU-T SG 16 WP 3 and ISO/IEC JTC 1/SC 29, JVET-T2002-v1, Oct. 7-16, 2020, pp. 1-102.

Sarwer et al., "CE-related: Additional bypass coding for high throughput CABAC", Joint Video Experts Team (JVET) of ITU-T SG 16 WP 3 and ISO/IEC JTC 1/SC 29, JVET-W0051-v3, Jul. 7-16, 2021, pp. 1-13.

Tsukuba et al., "CE-related: High throughput mode for high bit-depth coding—harmonization of CE-3.2 and CE-1.1-", Joint Video Experts Team (JVET) of ITU-T SG 16 WP 3 and ISO/IEC JTC 1/SC 29, JVET-W0114-v7, Jul. 7-16, 2021, pp. 1-19.

"Versatile video coding", Series H: Audiovisual and Mul Ti Media Systems Infrastructure of audiovisual services—Coding of moving video, ITU-T, H.266, Aug. 2020, 17 pages.

Joel Sole et al: "Transform Coefficient Coding in HEVC", IEEE Transactions On Circuits and Systems for Video Technology, IEEE, USA, vol. 22, No. 12, Dec. 1, 2012 (Dec. 1, 2012), pp. 1765-1777, XP011487805, ISSN: 1051-8215, DOI: 10.1109/TCSVT.2012. 2223055.

* cited by examiner

*FIG. 1*

| | QP | Reference(VTM-11.0) | |
|---|---|---|---|
| | | ctx bins/CoefGroup | ep bins/CoefGroup |
| Sequence Group A/LB | -13 | 30.8 | 180.1 |
| | -8 | 30.5 | 141.4 |
| | -3 | 30.3 | 113.1 |
| | 2 | 30.2 | 89.4 |
| | 7 | 30.1 | 69.5 |
| | 12 | 29.9 | 52.9 |
| Sequence Group B/LB | -13 | 20.6 | 20.9 |
| | -8 | 18.0 | 13.2 |
| | -3 | 15.8 | 8.8 |
| | 2 | 13.0 | 5.3 |
| | 7 | 7.8 | 2.7 |
| | 12 | 2.2 | 0.7 |

*FIG. 2*

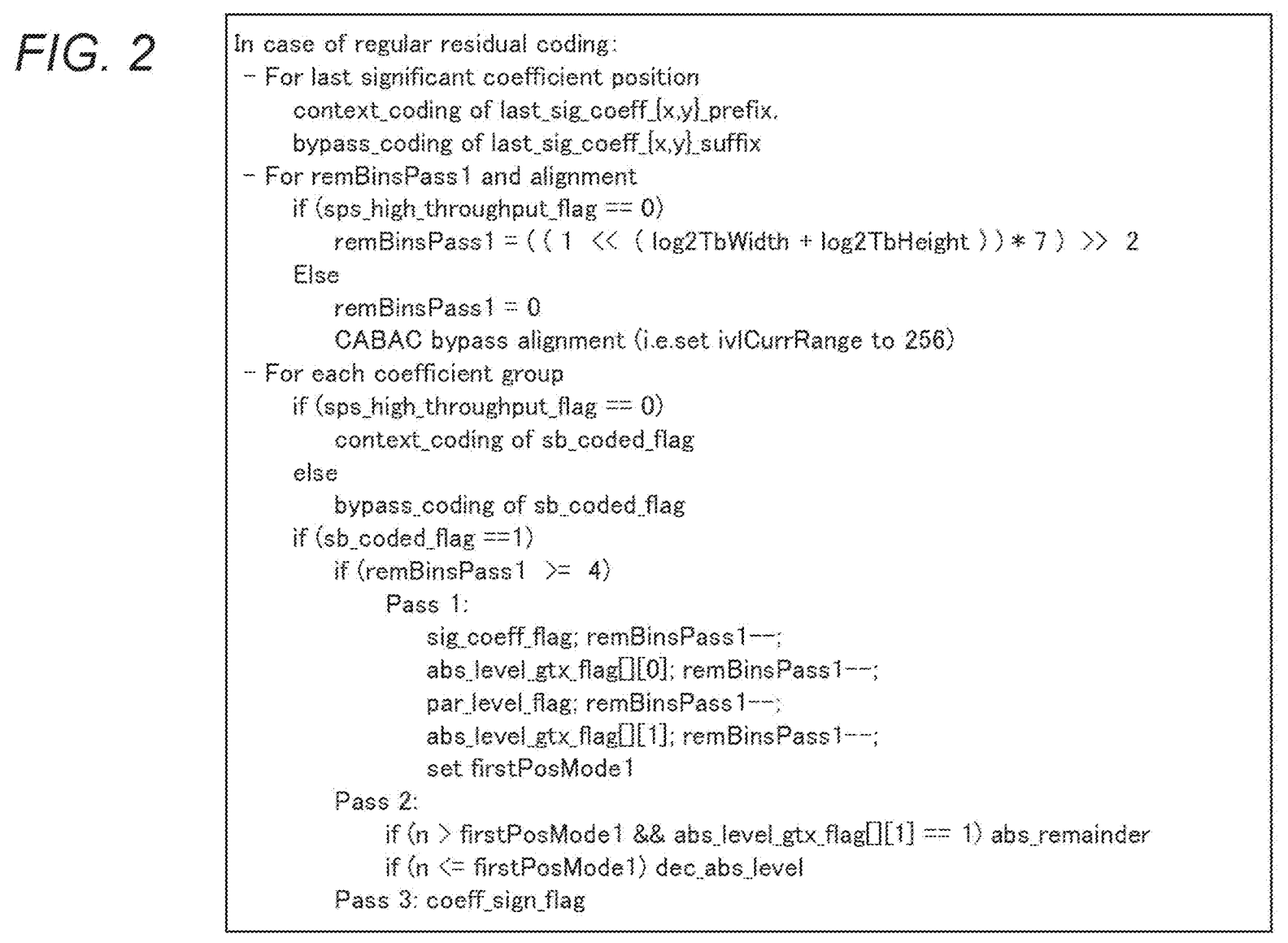

```
In case of regular residual coding:
- For last significant coefficient position
    context_coding of last_sig_coeff_[x,y]_prefix.
    bypass_coding of last_sig_coeff_[x,y]_suffix
- For remBinsPass1 and alignment
    if (sps_high_throughput_flag == 0)
        remBinsPass1 = ( ( ( 1 << ( ( log2TbWidth + log2TbHeight ) ) * 7 ) ) >> 2
    Else
        remBinsPass1 = 0
        CABAC bypass alignment (i.e.set ivlCurrRange to 256)
- For each coefficient group
    if (sps_high_throughput_flag == 0)
        context_coding of sb_coded_flag
    else
        bypass_coding of sb_coded_flag
    if (sb_coded_flag ==1)
        if (remBinsPass1 >= 4)
            Pass 1:
                sig_coeff_flag; remBinsPass1--;
                abs_level_gtx_flag[][0]; remBinsPass1--;
                par_level_flag; remBinsPass1--;
                abs_level_gtx_flag[][1]; remBinsPass1--;
                set firstPosMode1
            Pass 2:
                if (n > firstPosMode1 && abs_level_gtx_flag[][1] == 1) abs_remainder
                if (n <= firstPosMode1) dec_abs_level
            Pass 3: coeff_sign_flag
```

```
In case of transform-skip residual coding:
– For RemCcbs and alignment
    if (sps_high_throughput_flag == 0)
        RemCcbs = ( ( 1 << ( ( log2TbWidth + log2TbHeight ) ) * 7 ) ) >> 2
    else
        RemCcbs = 0
    CABAC bypass alignment (i.e.set ivlCurrRange to 256)
– For each coefficient group
    if (sps_high_throughput_flag == 0)
        context_coding of sb_coded_flag
    else
        bypass_coding of sb_coded_flag
    if (sb_coded_flag ==1)
        if (RemCcbs >= 4)
            Pass 1:
                sig_coeff_flag; RemCcbs––;
                coeff_sign_flag; RemCcbs––;
                abs_level_gtx_flag[][0]; RemCcbs––;
                par_level_flag; RemCcbs––;
        if (RemCcbs >= 4)
            Pass 2:
                abs_level_gtx_flag [][1]; RemCcbs––;
                abs_level_gtx_flag [][2]; RemCcbs––;
                abs_level_gtx_flag [][3]; RemCcbs––;
                abs_level_gtx_flag [][4]; RemCcbs––;
        Pass 3: abs_remainder, coeff_sign_flag
```

| | Descriptor |
|---|---|
| residual_coding(x0, y0, log2TbWidth, log2TbHeight, cIdx) { | |
|   if(sps_mts_enabled_flag && cu_sbt_flag && cIdx == 0 && | |
|     log2TbWidth == 5 && log2TbHeight < 6) | |
|     log2ZoTbWidth = 4 | |
|   else | |
|     log2ZoTbWidth = Min(log2TbWidth, 5) | |
|   if(sps_mts_enabled_flag && cu_sbt_flag && cIdx == 0 && | |
|     log2TbWidth < 6 && log2TbHeight == 5) | |
|     log2ZoTbHeight = 4 | |
|   else | |
|     log2ZoTbHeight = Min(log2TbHeight, 5) | |
|   if(log2TbWidth > 0) | |
|     last_sig_coeff_x_prefix | ae(v) |
|   if(log2TbHeight > 0) | |
|     last_sig_coeff_y_prefix | ae(v) |
|   if(last_sig_coeff_x_prefix > 3) | |
|     last_sig_coeff_x_suffix | ae(v) |
|   if(last_sig_coeff_y_prefix > 3) | |
|     last_sig_coeff_y_suffix | ae(v) |
|   log2TbWidth = log2ZoTbWidth | |
|   log2TbHeight = log2ZoTbHeight | |
|   ... | |

FIG. 7 last_sig_coeff_x_prefix specifies the prefix of the column position of the last significant coefficient in scanning order within a transform block. The values of last_sig_coeff_x_prefix shall be in the range of 0 to ( log2ZoTbWidth << 1 ) − 1, inclusive.

Figure 7:
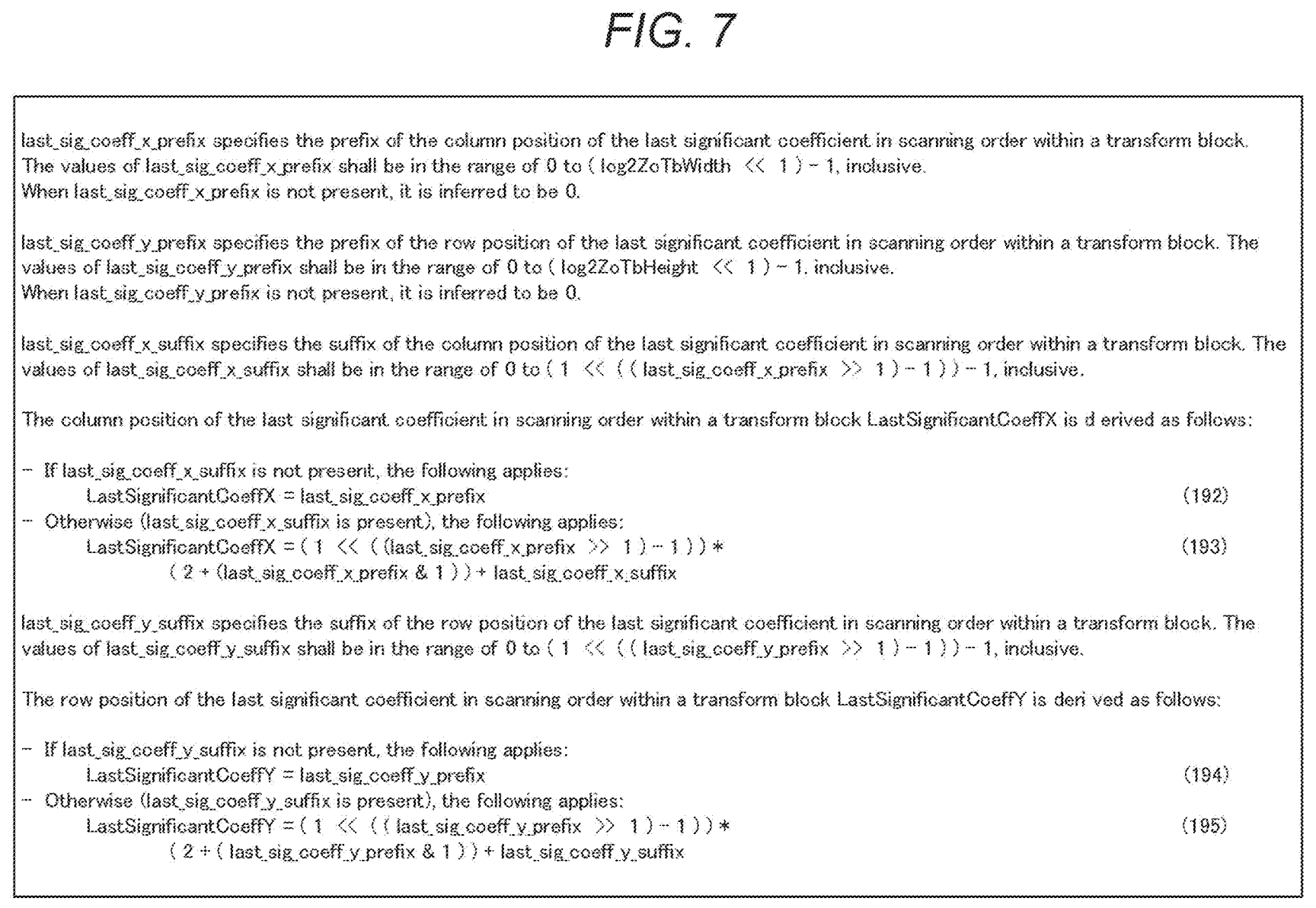

When last_sig_coeff_x_prefix is not present, it is inferred to be 0.

last_sig_coeff_y_prefix specifies the prefix of the row position of the last significant coefficient in scanning order within a transform block. The values of last_sig_coeff_y_prefix shall be in the range of 0 to ( log2ZoTbHeight << 1 ) − 1, inclusive.

When last_sig_coeff_y_prefix is not present, it is inferred to be 0.

last_sig_coeff_x_suffix specifies the suffix of the column position of the last significant coefficient in scanning order within a transform block. The values of last_sig_coeff_x_suffix shall be in the range of 0 to (1 << ( ( ( last_sig_coeff_x_prefix >> 1 ) − 1 ) ) − 1, inclusive.

The column position of the last significant coefficient in scanning order within a transform block LastSignificantCoeffX is derived as follows:

– If last_sig_coeff_x_suffix is not present, the following applies:

LastSignificantCoeffX = last_sig_coeff_x_prefix

– Otherwise (last_sig_coeff_x_suffix is present), the following applies:

LastSignificantCoeffX = (1 << ( ( last_sig_coeff_x_prefix >> 1 ) − 1 ) ) *    (192)

( 2 + (last_sig_coeff_x_prefix & 1 ) ) + last_sig_coeff_x_suffix    (193)

last_sig_coeff_y_suffix specifies the suffix of the row position of the last significant coefficient in scanning order within a transform block. The values of last_sig_coeff_y_suffix shall be in the range of 0 to (1 << ( ( ( last_sig_coeff_y_prefix >> 1 ) − 1 ) ) − 1, inclusive.

The row position of the last significant coefficient in scanning order within a transform block LastSignificantCoeffY is derived as follows:

– If last_sig_coeff_y_suffix is not present, the following applies:

LastSignificantCoeffY = last_sig_coeff_y_prefix

– Otherwise (last_sig_coeff_y_suffix is present), the following applies:

LastSignificantCoeffY = (1 << ( ( last_sig_coeff_y_prefix >> 1 ) − 1 ) ) *    (194)

( 2 + (last_sig_coeff_y_prefix & 1 ) ) + last_sig_coeff_y_suffix    (195)

FIG. 9

| #1 | IN CASE OF CABAC HIGH-THROUGHPUT MODE, PREFIX PORTION AT LAST COEFFICIENT POSITION IS SUBJECTED TO BYPASS ENCODING OR BYPASS DECODING |
|---|---|
| #1-1 | IN CASE OF NON-CABAC HIGH-THROUGHPUT MODE, PREFIX PORTION OF LAST COEFFICIENT POSITION MAY BE SUBJECTED TO CONTEXT ENCODING OR CONTEXT DECODING |
| #1-2 | SUFFIX PORTION OF LAST COEFFICIENT POSITION MAY BE SUBJECTED TO BYPASS ENCODING OR BYPASS DECODING |
| #1-3 | IN CASE OF CABAC HIGH-THROUGHPUT MODE, CABAC BYPASS ALIGNMENT PROCESSING IS PERFORMED IMMEDIATELY BEFORE ENCODING OR DECODING OF LAST COEFFICIENT POSITION |
| #1-3-1 | IvlCurrRange IS SET TO 256 |
| #1-3-2 | GENERATION AMOUNT OF CONTEXT ENCODING BIN NUMBER IS SET TO 0 |
| #1-3-3 | IN CASE OF NON-CABAC HIGH-THROUGHPUT MODE, GENERATION AMOUNT OF CONTEXT ENCODING BIN NUMBER IS DERIVED ON BASIS OF REFERENCE VALUE OF CONTEXT ENCODING BIN NUMBER AND TRANSFORM BLOCK SIZE |

*FIG. 10*

```
In case of regular residual coding:
-  For remBinsPass1 and alignment
      if (sps_high_throughput_flag == 0)
         remBinsPass1 = ( ( 1 << ( log2TbWidth + log2TbHeight ) ) * 7 ) >> 2
      else
         remBinsPass1 = 0
      CABAC bypass alignment (i.e. set ivlCurrRange to 256)
-  For last significant coefficient position
      if (sps_high_throughput_flag == 0)
         context_coding of last_sig_coeff_[x,y]_prefix
      else
         bypass_coding of last_sig_coeff_[x,y]_prefix
      bypass_coding of last_sig_coeff_[x,y]_suffix
-  For each coefficient group
      if (sps_high_throughput_flag == 0)
         context_coding of sb_coded_flag
      else
         bypass_coding of sb_coded_flag
      if (sb_coded_flag ==1)
         if (remBinsPass1 >= 4)
            Pass 1:
               sig_coeff_flag; remBinsPass1—;
               abs_level_gtx_flag[][0]; remBinsPass1—;
               par_level_flag; remBinsPass1—;
               abs_level_gtx_flag[][1]; remBinsPass1—;
               set firstPosMode1
            Pass 2:
               if (n > firstPosMode1 && abs_level_gtx_flag[][1] == 1) abs_remainder
               if (n <= firstPosMode1) dec_abs_level
            Pass 3: coeff_sign_flag
```

| | |
|---|---|
| #2 | IN CASE OF CABAC HIGH-THROUGHPUT MODE, ENCODING OR DECODING OF LAST COEFFICIENT POSITION IS SKIPPED |
| #2-1 | LAST COEFFICIENT POSITION IS SET TO LOWER RIGHT COORDINATE IN TRANSFORM BLOCK |
| #2-2 | IN CASE OF NON-CABAC HIGH-THROUGHPUT MODE, ENCODING OR DECODING OF LAST COEFFICIENT POSITION IS PERFORMED |
| #2-2-1 | PREFIX PORTION AT LAST COEFFICIENT POSITION IS SUBJECTED TO CONTEXT ENCODING OR CONTEXT DECODING, AND SUFFIX PORTION AT LAST COEFFICIENT POSITION IS SUBJECTED TO BYPASS ENCODING OR BYPASS DECODING |
| #2-3 | IN CASE OF CABAC HIGH-THROUGHPUT MODE, CABAC BYPASS ALIGNMENT PROCESSING IS PERFORMED IMMEDIATELY BEFORE ENCODING OR DECODING OF FIRST SUB-BLOCK COEFFICIENT FLAG |
| #2-3-1 | IVCurrRange IS SET TO 256 |
| #2-3-2 | GENERATION AMOUNT OF CONTEXT ENCODING BIN NUMBER IS SET TO 0 |
| #2-3-3 | IN CASE OF NON-CABAC HIGH-THROUGHPUT MODE, GENERATION AMOUNT OF CONTEXT ENCODING BIN NUMBER IS DERIVED ON BASIS OF REFERENCE VALUE OF CONTEXT ENCODING BIN NUMBER AND TRANSFORM BLOCK SIZE |

*FIG. 21*

```
In case of regular residual coding:
-   For last significant coefficient position
        if (sps_high_throughput_flag == 0)
            context_coding of last_sig_coeff_[x,y]_prefix
            bypass_coding of last_sig_coeff_[x,y]_suffix
-   For remBinsPass1 and alignment
        if (sps_high_throughput_flag == 0)
            remBinsPass1 = ( ( ( 1 << ( ( log2TbWidth + log2TbHeight ) ) * 7 ) ) >> 2
        else
            remBinsPass1 = 0
            CABAC bypass alignment (i.e. set ivlCurrRange to 256)
-   For each coefficient group
        if (sps_high_throughput_flag == 0)
            context_coding of sb_coded_flag
        else
            bypass_coding of sb_coded_flag
        if (sb_coded_flag ==1)
            if (remBinsPass1 >= 4)
                Pass 1:
                    sig_coeff_flag; remBinsPass1--;
                    abs_level_gtx_flag[][0]: remBinsPass1--;
                    par_level_flag; remBinsPass1--;
                    abs_level_gtx_flag[][1]: remBinsPass1--;
                    set firstPosMode1
                Pass 2:
                    if (n > firstPosMode1 && abs_level_gtx_flag[][1] == 1) abs_remainder
                    if (n <= firstPosMode1) dec_abs_level
                Pass 3: coeff_sign_flag
```

Align

- LastSignificantCoeffX = (1<<(log2TbWidth)) − 1
- LastSignificantCoeffY = (1<<(log2TbHeight)) − 1

*FIG. 23*

| | Descriptor |
|---|---|
| residual_coding(x0, y0, log2TbWidth, log2TbHeight, cIdx) { | |
|   if(sps_mts_enabled_flag && cu_sbt_flag && cIdx == 0 && | |
|     log2TbWidth == 5 && log2TbHeight < 6 ) | |
|     log2ZoTbWidth = 4 | |
|   else | |
|     log2ZoTbWidth = Min(log2TbWidth, 5) | |
|   if(sps_mts_enabled_flag && cu_sbt_flag && cIdx == 0 && | |
|     log2TbWidth < 6 && log2TbHeight == 5) | |
|     log2ZoTbHeight = 4 | |
|   else | |
|     log2ZoTbHeight = Min(log2TbHeight, 5) | |
|   if(sps_high_throughput_flag == 0) { | |
|     if(log2TbWidth > 0) | |
|       last_sig_coeff_x_prefix | ae(v) |
|     if(log2TbHeight > 0) | |
|       last_sig_coeff_y_prefix | ae(v) |
|     if(last_sig_coeff_x_prefix > 3) | |
|       last_sig_coeff_x_suffix | ae(v) |
|     if(last_sig_coeff_y_prefix > 3) | |
|       last_sig_coeff_y_suffix | ae(v) |
|   } | |
|   log2TbWidth = log2ZoTbWidth | |
|   log2TbHeight = log2ZoTbHeight | |
|   ... | |

FIG. 24 last_sig_coeff_x_prefix specifies the prefix of the column position of the last significant coefficient in scanning order within a transform block. The values of last_sig_coeff_x_prefix shall be in the range of 0 to ( log2ZoTbWidth << 1 ) − 1, inclusive. When last_sig_coeff_x_prefix is not present, it is inferred to be 0.

last_sig_coeff_y_prefix specifies the prefix of the row position of the last significant coefficient in scanning order within a transform block. The values of last_sig_coeff_y_prefix shall be in the range of 0 to ( log2ZoTbHeight << 1 ) − 1, inclusive. When last_sig_coeff_y_prefix is not present, it is inferred to be 0.

last_sig_coeff_x_suffix specifies the suffix of the column position of the last significant coefficient in scanning order within a transform block. The values of last_sig_coeff_x_suffix shall be in the range of 0 to ( 1 << ( ( last_sig_coeff_x_prefix >> 1 ) − 1 ) ) − 1, inclusive. When last_sig_coeff_x_suffix is not present, it is inferred to be 0.

The column position of the last significant coefficient in scanning order within a transform block LastSignificantCoeffX is derived as follows:
– If sps_high_throughput_flag is equal to 0, the following applies:
– If last_sig_coeff_x_suffix is not present, the following applies:
   LastSignificantCoeffX = last_sig_coeff_x_prefix
– Otherwise (last_sig_coeff_x_suffix is present), the following applies:
   LastSignificantCoeffX = ( 1 << ( ( last_sig_coeff_x_prefix >> 1 ) − 1 ) ) *
      ( 2 + (last_sig_coeff_x_prefix & 1 ) ) + last_sig_coeff_x_suffix    (192)
– Otherwise (sps_high_throughput_flag is equal to 1), the following applies:
   LastSignificantCoeffX = (1<< log2ZoTbWidth) − 1    (193)

last_sig_coeff_y_suffix specifies the suffix of the row position of the last significant coefficient in scanning order within a transform block. The values of last_sig_coeff_y_suffix shall be in the range of 0 to ( 1 << ( ( last_sig_coeff_y_prefix >> 1 ) − 1 ) ) − 1, inclusive. When last_sig_coeff_y_suffix is not present, it is inferred to be 0.

The row position of the last significant coefficient in scanning order within a transform block LastSignificantCoeffY is derived as follows:
– If sps_high_throughput_flag is equal to 0, the following applies:
– If last_sig_coeff_y_suffix is not present, the following applies:
   LastSignificantCoeffY = last_sig_coeff_y_prefix
– Otherwise (last_sig_coeff_y_suffix is present), the following applies:
   LastSignificantCoeffY = ( 1 << ( ( last_sig_coeff_y_prefix >> 1 ) − 1 ) ) *
      ( 2 + (last_sig_coeff_y_prefix & 1 ) ) + last_sig_coeff_y_suffix    (194)
– Otherwise (sps_high_throughput_flag is equal to 1), the following applies:
   LastSignificantCoeffY = (1<< log2ZoTbHeight) − 1    (195)

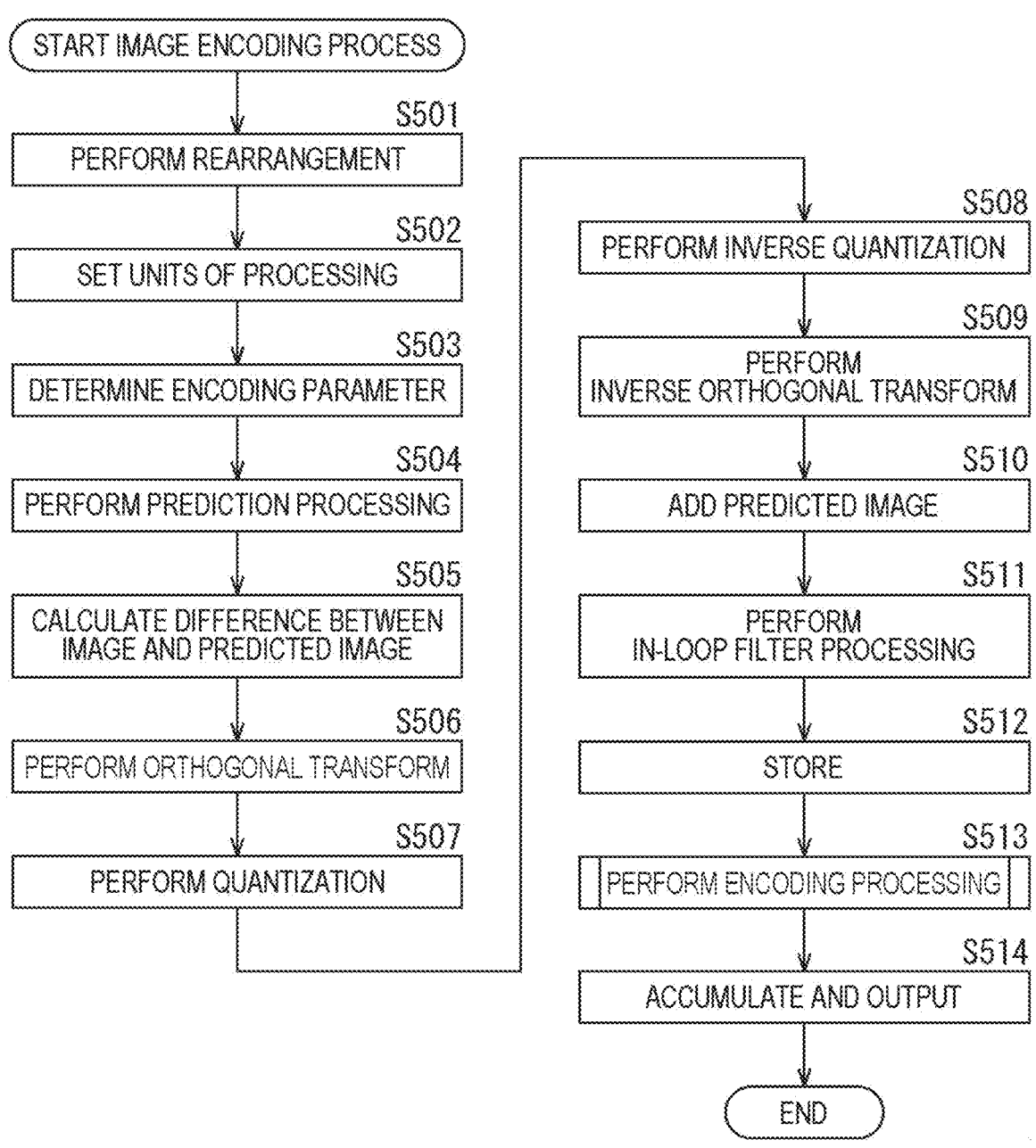

START IMAGE ENCODING PROCESS

S501
PERFORM REARRANGEMENT

S502
SET UNITS OF PROCESSING

S503
DETERMINE ENCODING PARAMETER

S504
PERFORM PREDICTION PROCESSING

S505
CALCULATE DIFFERENCE BETWEEN IMAGE AND PREDICTED IMAGE

S506
PERFORM ORTHOGONAL TRANSFORM

S507
PERFORM QUANTIZATION

S508
PERFORM INVERSE QUANTIZATION

S509
PERFORM INVERSE ORTHOGONAL TRANSFORM

S510
ADD PREDICTED IMAGE

S511
PERFORM IN-LOOP FILTER PROCESSING

S512
STORE

S513
PERFORM ENCODING PROCESSING

S514
ACCUMULATE AND OUTPUT

END

*FIG. 33*

IMAGE PROCESSING DEVICE AND METHOD

CROSS-REFERENCE TO RELATED APPLICATIONS

The present application is based on PCT filing PCT/JP2022/024461, filed Jun. 20, 2022, which claims priority from U.S. Provisional Patent Application No. 63/214,327, filed Jun. 24, 2021, the entire contents of each are incorporated herein by reference.

TECHNICAL FIELD

The present disclosure relates to an image processing device and method, and more particularly, to an image processing device and method capable of suppressing an increase in a processing amount of encoding and decoding.

BACKGROUND ART

Conventionally, there has been proposed an encoding method of deriving a prediction residual of a moving image and performing coefficient transform and quantization for encoding (e.g., see Non-Patent Document 1 and Non-Patent Document 2). In such image encoding, in a case of a high bit depth and a high bit rate, more context encoding bins and bypass encoding bins are generated, and thus, there is a possibility that a processing amount of a context-based adaptive binary arithmetic code (CABAC) increases. Therefore, in order to improve the throughput of CABAC, a method of simplifying the encoding processing and the decoding processing of the bypass encoding bin and replacing the context encoding bin (excluding the last coefficient position) in a transform block with the bypass encoding bin has been proposed (See, for example, Non-Patent Document 3.).

CITATION LIST

Non-Patent Document

Non-Patent Document 1: Benjamin Bross, Jianle Chen, Shan Liu, "Versatile Video Coding (Draft 10)", JVET-T2001-v2, Joint Video Experts Team (JVET) of ITU-T SG 16 WP 3 and ISO/IEC JTC 1/SC 29, version 1-date 2020-10-27

Non-Patent Document 2: Jianle Chen, Yan Ye, Seung Hwan Kim, "Algorithm description for Versatile Video Coding and Test Model 11 (VTM 11)", JVET-T2002-v1, Joint Video Experts Team (JVET) of ITU-T SG 16 WP 3 and ISO/IEC JTC 1/SC 29, version 1-date 2020-10-27

Non-Patent Document 3: Fan Wang, Zhihuang Xie, Yue Yu, Haoping Yu, Dong Wang, "AHG8: a combination of JVET-V0059 option 2 and JVET-V0122 for high bit depth and high bit rate extensions", JVET-V0178-v1, Joint Video Experts Team (JVET) of ITU-T SG 16 WP 3 and ISO/IEC JTC 1/SC 29, 2021-04-27

SUMMARY OF THE INVENTION

Problems to be Solved by the Invention

However, in this method, in the transform block, about 8% to 10% of the entire context encoding bins were the last coefficient positions. Therefore, there is a possibility that the throughput of CABAC can be further improved by replacing the last coefficient positions with the bypass encoding bins.

The present disclosure has been made in view of such a situation, and an object thereof is to suppress an increase in a processing amount of encoding and decoding.

Solutions to Problems

An image processing device according to one aspect of the present technology is an image processing device including an encoding unit that encodes a prefix portion of a last coefficient position included in image data as a bypass encoding bin in a case of a high-throughput mode in which a context encoding bin after the last coefficient position of the image data is processed as a bypass encoding bin.

An image processing method according to one aspect of the present technology is an image processing method including encoding a prefix portion of a last coefficient position included in image data as a bypass encoding bin in a case of a high-throughput mode in which a context encoding bin after the last coefficient position of the image data is processed as a bypass encoding bin.

An image processing device according to another aspect of the present technology is an image processing device including a decoding unit that decodes a prefix portion of a last coefficient position included in coded data of image data as a bypass encoding bin in a case of a high-throughput mode in which a context encoding bin after the last coefficient position of the image data is processed as a bypass encoding bin.

An image processing method according to another aspect of the present technology is an image processing method including decoding a prefix portion of a last coefficient position included in coded data of image data as a bypass encoding bin in a case of a high-throughput mode in which a context encoding bin after the last coefficient position of the image data is processed as a bypass encoding bin.

An image processing device according to still another aspect of the present technology is an image processing device including an encoding unit that skips encoding of a last coefficient position included in image data in a case of a high-throughput mode in which a context encoding bin after the last coefficient position of the image data is processed as a bypass encoding bin.

An image processing method according to still another aspect of the present technology is an image processing method including skipping encoding of a last coefficient position included in image data in a case of a high-throughput mode in which a context encoding bin after the last coefficient position of the image data is processed as a bypass encoding bin.

An image processing device according to still another aspect of the present technology is an image processing device including a decoding unit that skips decoding of a last coefficient position in a case of a high-throughput mode in which a context encoding bin after the last coefficient position of image data is processed as a bypass encoding bin.

An image processing method according to still another aspect of the present technology is an image processing method including skipping decoding of a last coefficient position in a case of a high-throughput mode in which a context encoding bin after the last coefficient position of image data is processed as a bypass encoding bin.

In the image processing device and method according to one aspect of the present technology, in the case of the high-throughput mode in which a context encoding bin after the last coefficient position of image data is processed as a bypass encoding bin, the prefix portion of the last coefficient position included in the image data is encoded as a bypass encoding bin.

In the image processing device and method according to another aspect of the present technology, in the case of the high-throughput mode in which a context encoding bin after the last coefficient position of image data is processed as a bypass encoding bin, the prefix portion of the last coefficient position included in coded data of the image data is decoded as a bypass encoding bin.

In the image processing device and method according to still another aspect of the present technology, in the case of the high-throughput mode in which a context encoding bin after the last coefficient position of image data is processed as a bypass encoding bin, encoding of the last coefficient position included in the image data is skipped.

In the image processing device and method according to still another aspect of the present technology, in the case of the high-throughput mode in which a context encoding bin after the last coefficient position of image data is processed as a bypass encoding bin, decoding of the last coefficient position is skipped.

BRIEF DESCRIPTION OF DRAWINGS

FIG. 1 is a diagram for explaining a generation amount of encoding bins.

FIG. 2 is a diagram illustrating an example of a pseudo code related to RRC.

FIG. 3 is a diagram illustrating an example of an RRC bit stream.

FIG. 4 is a diagram illustrating an example of a pseudo code related to TSRC.

FIG. 5 is a diagram illustrating an example of a TSRC bit stream.

FIG. 6 is a diagram illustrating an example of syntax related to RRC.

FIG. 7 is a diagram illustrating an example of semantics related to RRC.

FIG. 9 is a diagram illustrating an example of an encoding and decoding method in a case of a high-throughput mode.

FIG. 10 is a diagram illustrating an example of a pseudo code related to RRC.

FIG. 11 is a diagram illustrating an example of an RRC bit stream.

FIG. 13 is a block diagram illustrating a main configuration example of a Non-TS residual encoding unit.

FIG. 16 is a block diagram illustrating a main configuration example of a decoding device.

FIG. 17 is a block diagram illustrating a main configuration example of a Non-TS residual decoding unit.

FIG. 20 is a diagram illustrating an example of an encoding and decoding method in a case of a high-through-put mode.

FIG. 21 is a diagram illustrating an example of a pseudo code related to RRC.

FIG. 22 is a diagram illustrating an example of an RRC bit stream.

FIG. 23 is a diagram illustrating an example of syntax related to RRC.

FIG. 24 is a diagram illustrating an example of semantics related to RRC.

FIG. 25 is a block diagram illustrating a main configuration example of a Non-TS residual encoding unit.

FIG. 27 is a block diagram illustrating a main configuration example of a Non-TS residual decoding unit.

FIG. 29 is a block diagram illustrating a main configuration example of an image encoding device.

FIG. 30 is a flowchart illustrating an example of a flow of an image encoding process.

FIG. 33 is a block diagram illustrating a main configuration example of a computer.

MODE FOR CARRYING OUT THE INVENTION

Figure 8:
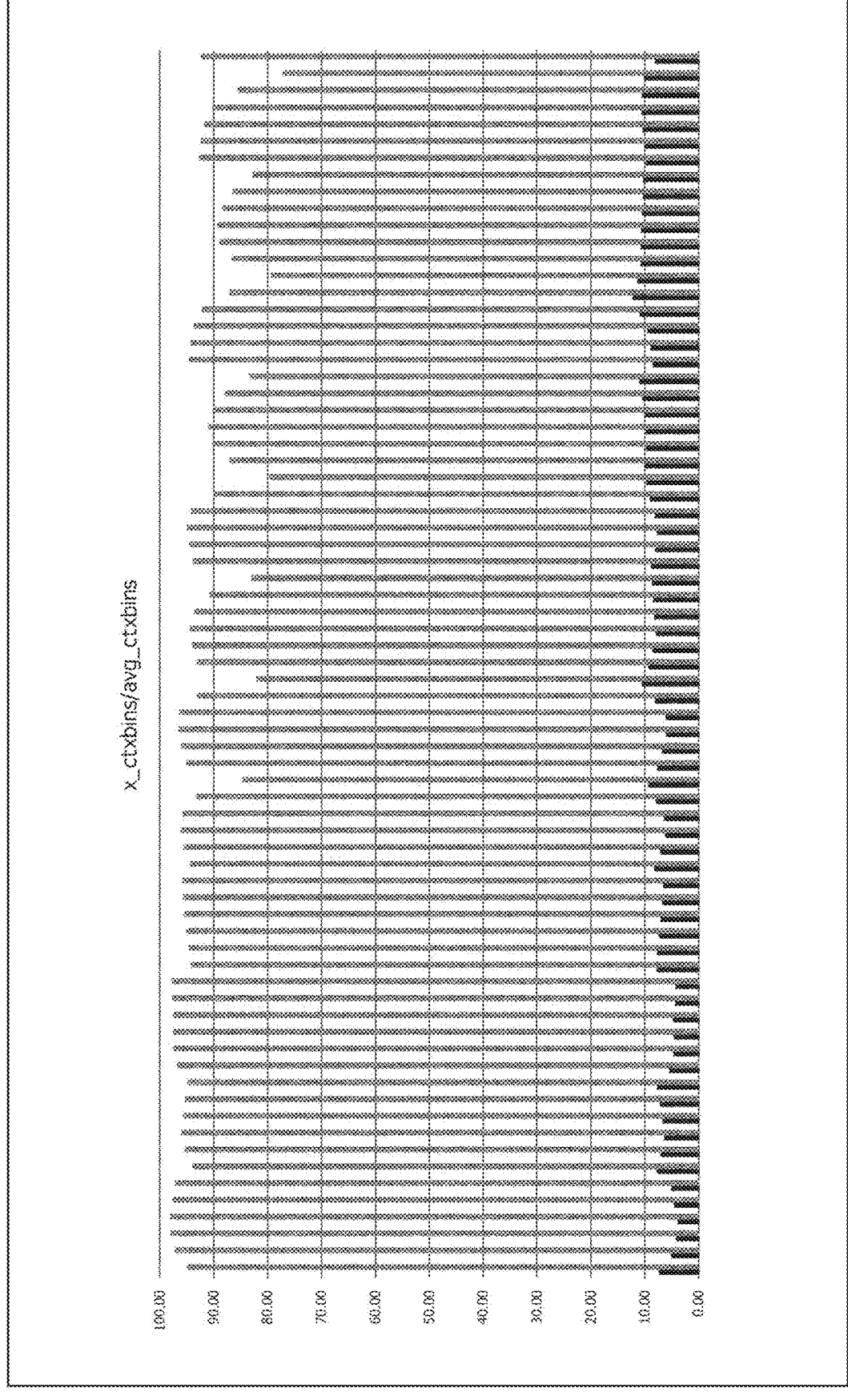
FIG. 8 is a diagram illustrating an example of a ratio of the number of context encoding bins.

Hereinafter, modes for carrying out the present disclosure (hereinafter referred to as embodiments) will be described. Note that a description will be given in the following order.

1. Documents and the like supporting technical content and technical terms
    2. CABAC
    3. Bypass encoding and bypass decoding of last coefficient position
    4. Skipping encoding or decoding of last coefficient position
    5. Embodiment (image encoding device)
    6. Embodiment (image decoding device)
    7. Supplementary note

1. Documents and the Like Supporting Technical Content and Technical Terms

The scope disclosed in the present technology includes not only the content described in the embodiments but also the content described in the following non-patent documents and the like that are known at the time of filing, the content of other documents referred to in the following non-patent documents, and the like.

Non-Patent Document 1: (described above)
Non-Patent Document 2: (described above)
Non-Patent Document 3: (described above)
Non-Patent Document 4: Recommendation ITU-T H. 264 (April 2017) "Advanced video coding for generic audiovisual services", April 2017
Non-Patent Document 5: Recommendation ITU-T H.265 (February 2018) "High efficiency video coding", February 2018

That is, the contents described in the above-mentioned non-patent documents are also the basis for determining the support requirements. For example, even in a case where the quad-tree block structure and the quad-tree plus binary tree (QTBT) block structure described in the above-described non-patent documents are not directly described in the embodiments, they are within the scope of disclosure of the present technology and are assumed to satisfy the support requirements of the claims. Furthermore, for example, technical terms such as parsing, syntax, and semantics are also within the scope of disclosure of the present technology even in a case where there is no direct description in the embodiments, and are assumed to meet the support requirements of the claims.

Furthermore, in the present description, a "block" (not a block indicating a processing unit) used in the description as a partial area of an image (picture) or a processing unit indicates an arbitrary partial area in the picture unless otherwise specified, and does not limit its size, shape, characteristics, and the like. For example, examples of the "block" include an arbitrary partial region (units of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a sub-block, a macroblock, a tile, or a slice described in an above-described Non Patent Document.

Furthermore, upon specifying the size of such a block, not only the block size may be directly specified, but also the block size may be indirectly specified. For example, the block size may be specified using identification information that identifies the size. Furthermore, for example, the block size may be specified by a ratio or difference with the size of the reference block (for example, LCU, SCU, or the like). For example, in a case of transmitting information for specifying the block size as a syntax element or the like, information for indirectly specifying the size as described above may be used as this information. In this manner, the amount of information of the information can be reduced, and encoding efficiency may be improved. Furthermore, the specification of the block size also includes a specification of the range of the block size (for example, the specification of the range of an allowable block size, or the like).

2. CABAC

<Generation Amount of Context Encoding Bins>

For example, context-based adaptive binary arithmetic code (CABAC) is used in the image encoding methods (Hereinafter, it is also referred to as versatile video coding (VVC).) described in Non-Patent Document 1 and Non-Patent Document 2. CABAC is an entropy encoding method using binary arithmetic encoding and context adaptation processing of estimating an occurrence probability of a binary symbol on the basis of a state (context) of surrounding parameters.

The table illustrated in FIG. 1 shows the average number of context encoding bins (ctx bins/CoefGroup) generated in units of a coefficient group ((CG); coefficient coding group; sub-blocks), and the number of bypass encoding bins (ep bins/CoefGroup) generated in units of CG in such CABAC for each quantization parameter (QP). In the table illustrated in FIG. 1, the number of context encoding bins and the number of bypass encoding bins are illustrated for each of a Sequence Group A and a Sequence Group B. It is assumed that the Sequence Group A is a sequence group in which encoding is difficult and many encoding bins are generated, and the Sequence Group B is a sequence group in which encoding is easier and fewer encoding bins are generated than the Sequence Group A.

In both of the Sequence Group A and the Sequence Group B, the number of context encoding bins and the number of bypass encoding bins that occur are greater for QP=−13

(higher bit rate) than for QP=12. When the generation amount is compared between the case of QP=−13 of the Sequence Group A and the case of QP=12 of the Sequence Group B, the number of context encoding bins is about 15 times, and the number of bypass encoding bins is about 257 times. As described above, in the encoding of the high bit depth and the high bit rate, the generation amount of the context encoding bin and the bypass encoding bin increases, and the processing amount per unit of CABAC may increase.

Therefore, in order to improve the throughput of CABAC, as described in Non-Patent Document 3, a method has been proposed in which the encoding processing and the decoding processing of the bypass encoding bin are simplified, and the context encoding bin (excluding the last coefficient position) in the transform block is replaced with the bypass encoding bin.

FIG. 2 is a pseudo code illustrating an outline of an encoding or decoding method described in Non-Patent Document 3. FIG. 2 illustrates an encoding and decoding method in the case of regular residual coding (RRC). For this method, as illustrated in "For last significant coefficient position", the prefix portion (last_sig_coeff_{x, y}_prefix) of the last coefficient position indicating the position of the last valid coefficient is encoded (also referred to as context encoding) and decoded (context decoding) as context encoding bins, and the suffix portion (last_sig_coeff_{x, y}_suffix) of the last coefficient position is encoded (also referred to as bypass encoding) and decoded (also referred to as bypass decoding) as bypass encoding bins.

Furthermore, the coefficient data is encoded or decoded for each sub-block after encoding or decoding of the last coefficient position, and at that time, as illustrated in "For each coefficient group", in the case of the high-throughput mode, a context encoding bin after the last coefficient position is encoded and decoded as a bypass encoding bin. As described above, by replacing the context encoding bin with the bypass encoding bin, the processing amount of CABAC can be reduced as compared with the case of encoding and decoding the context encoding bin as it is.

Furthermore, immediately before encoding or decoding for each sub-block, as described in "For remBinsPass1 and alignment", in the case of the high-throughput mode, the parameter remCcbs (remBinPass1 in FIG. 2) is set to 0, and CABAC bypass alignment is performed. The parameter remCcbs is a parameter indicating the generation amount of the number of context encoding bins. That is, the generation amount of the number of context encoding bins is set to 0, and bypass encoding and bypass decoding are selected as a method of encoding and decoding bins that have been encoded and decoded as context encoding bins. In the CABAC bypass alignment, for example, the parameter ivlCurrRange is set to 256. The parameter ivlCurrRange is a parameter indicating a range in the arithmetic encoding. The parameters ivlCurrRange and ivlOffset represent the state of the encoding engine. By setting the parameter ivlCurrRange to 256, the encoding or decoding of the bypass encoding bin can be simplified.

Figure 3:
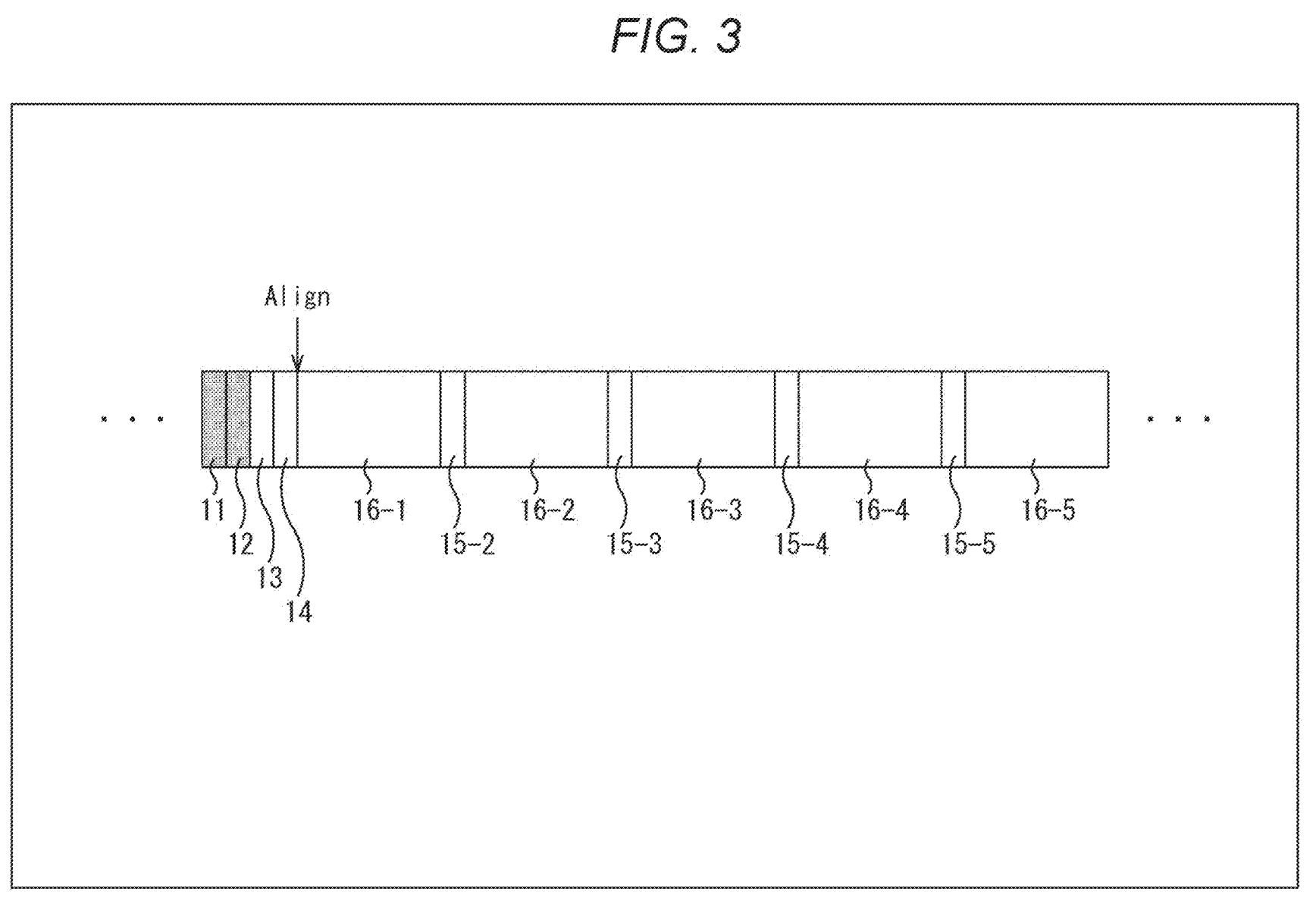

FIG. 3 illustrates a configuration example of a part of the bit stream generated by such encoding. As illustrated in FIG. 3, in the bit stream, the encoding bins for the last coefficient position (last_sig_coeff_x_prefix 11, last_sig_coeff_y_prefix 12, last_sig_coeff_x_suffix 13, and last_sig_coeff_y_suffix 14) are formed, followed by the encoding bins for each sub-block (Coefficient bits 16-1, sb_coded_flag 15-2, Coefficient bits 16-2, sb_coded_flag 15-3, Coefficient bits 16-3, sb_coded_flag 15-4, Coefficient bits 16-4, sb_coded_flag 15-5, and Coefficient bits 16-5). In a case where it is not necessary to distinguish and describe sb_coded_flag 15-2 to sb_coded_flag 15-5 from each other, they are also referred to as sb_coded_flag 15. Furthermore, in a case where it is not necessary to distinguish the Coefficient bits 16-1 to the Coefficient bits 16-5 from each other for explanation, they are also referred to as Coefficient bits 16.

last_sig_coeff_x_prefix 11 and last_sig_coeff_y_prefix 12 are context encoding bins. last_sig_coeff_x_suffix 13 and last_sig_coeff_y_suffix 14 are bypass encoding bins. sb_coded_flag 15 and Coefficient bits 16 are a bypass encoding bin group for each sub-block. CABAC bypass alignment processing is performed immediately before the encoding or decoding for each sub-block, that is, immediately before the processing of the Coefficient bits 16-1 (Align).

FIG. 4 is a pseudo code illustrating an outline of an encoding or decoding method described in Non-Patent Document 3. FIG. 4 illustrates an encoding and decoding method in transform-skip residual coding (TSRC). As illustrated in "For RemCcbs and alignment", in the case of the high-throughput mode, the parameter remCcbs is set to 0, and CABAC bypass alignment is performed.

Furthermore, thereafter, as illustrated in "For each coefficient group", in the case of the high-throughput mode, a context encoding bin after the last coefficient position is encoded and decoded as a bypass encoding bin.

Figure 5:
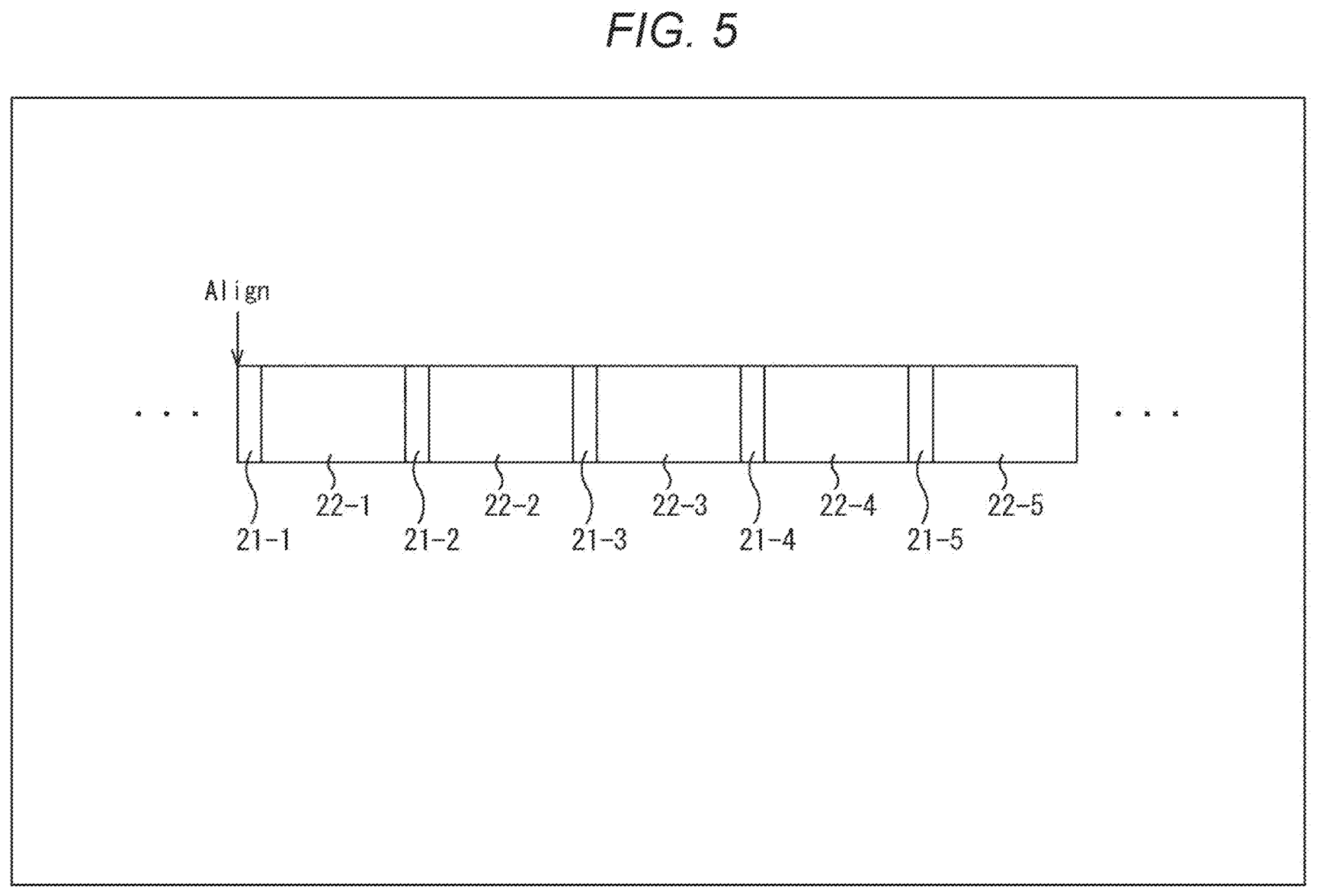

FIG. 5 illustrates a configuration example of a part of the bit stream generated by such encoding. As illustrated in FIG. 5, in the bit stream, an encoding bin (sb_coded_flag 21-1, Coefficient bits 22-1, sb_coded_flag 21-2, Coefficient bits 22-2, sb_coded_flag 21-3, Coefficient bits 22-3, sb_coded_flag 21-4, Coefficient bits 22-4, sb_coded_flag 21-5, and Coefficient bits 22-5) for each sub-block is formed. In a case where it is not necessary to distinguish and describe sb_coded_flag 21-1 to sb_coded_flag 21-5 from each other, they are also referred to as sb_coded_flag 21. Furthermore, the Coefficient2t bits 22-1 to the Coefficient bits 22-5 are also referred to as Coefficient bits 22 in a case where it is not necessary to distinguish the Coefficient2t bits to the Coefficient bits from each other for explanation.

sb_coded_flag 21 and Coefficient bits 22 are a bypass encoding bin group for each sub-block. CABAC bypass alignment processing is performed immediately before the encoding or decoding for each sub-block, that is, immediately before the processing of sb_coded_flag 21-1 (Align).

FIG. 6 is a diagram illustrating an example of syntax in the case of RRC of the encoding or decoding method described in Non-Patent Document 3. FIG. 7 is a diagram illustrating an example of semantics of each parameter corresponding to the syntax.

In the encoding or decoding method as described above, as in the graph illustrated in FIG. 8, in the transform block, the last coefficient position occupies about 8% to 10% of the entire context encoding bins. The bar graph illustrated in FIG. 8 illustrates an example of a ratio of components in a high-bit-rate bit stream. Each of the plurality of bar graphs indicates information about bit streams different from each other. A gray bar graph indicates a ratio of the syntax in the transform block to the number of context encoding bins occupied in the entire bit stream. The black bar graph indicates the proportion occupied by the last coefficient position in the number of context encoding bins in the entire bit stream. As illustrated in FIG. 8, in a case of a high-bit-rate bit stream, coefficient coding occupied about 90% of the total number of context encoding bins, and the last coefficient position occupied about 10% of the total number of context encoding bins. That is, in the method described in Non-Patent Document 3, about 80% of all context encoding bins are replaced with bypass encoding bins, but about 10% (last coefficient position) needs to be treated as context encoding bins. Therefore, there is a possibility that the throughput of CABAC can be further improved by replacing the last coefficient positions with the bypass encoding bins.

3. Bypass Encoding and Bypass Decoding of Last Coefficient Position

Method #1

Therefore, for example, as illustrated at the top of the table illustrated in FIG. 9, in the case of the CABAC high-throughput mode, the prefix portion at the last coefficient position may be subjected to bypass encoding or bypass decoding (Method #1).

The CABAC high-throughput mode is a mode in which processing is performed so as to improve the throughput of CABAC as compared with the case of the normal mode (case of not being in the high-throughput mode). For example, throughput can be improved by processing (encoding or decoding) context encoding bins as bypass encoding bins or by simplifying encoding or decoding processing. The CABAC high-throughput mode may be applied to, for example, an encoding target having a higher bit depth or a higher bit rate than usual. For example, in a case where an image with a bit depth of 10 bits is standard, the present disclosure may be applied when an image with a bit depth of 12 bits is to be encoded.

Note that, in the following, a case where CABAC is applied as encoding or decoding will be described, but the present technology can also be applied to encoding or decoding other than CABAC. Therefore, the CABAC high-throughput mode described above is also not limited to CABAC. That is, this mode may be simply a high-throughput mode.

For example, in a case of a high-throughput mode in which a context encoding bin after a last coefficient position of image data is processed as a bypass encoding bin, the image processing device may include an encoding unit that encodes a prefix portion of the last coefficient position included in the image data as a bypass encoding bin. Furthermore, for example, in the image processing method, in the case of the high-throughput mode in which the context encoding bin after the last coefficient position of the image data is processed as a bypass encoding bin, the prefix portion of the last coefficient position included in the image data may be encoded as a bypass encoding bin.

For example, in the case of a high-throughput mode in which a context encoding bin after a last coefficient position of image data is processed as a bypass encoding bin, the image processing device may include a decoding unit that decodes a prefix portion of the last coefficient position included in the coded data of the image data as a bypass encoding bin. Furthermore, for example, in the image processing method, in the case of the high-throughput mode in which the context encoding bin after the last coefficient position of the image data is processed as a bypass encoding bin, the prefix portion of the last coefficient position included in the coded data of the image data may be decoded as a bypass encoding bin.

FIG. 10 is a diagram illustrating an example of a pseudo code illustrating an outline of encoding (decoding) in a case where the present technology is applied. In the example of FIG. 10, "For last significant coefficient position" is executed before "For each coefficient group". Then, as illustrated in "For last significant coefficient position", in a case where sps_high_throughput_flag is true (not 0), last_sig_coeff_{x, y}_prefix is encoded and decoded as a bypass encoding bin (bypass_coding of last_sig_coeff_{x, y}_prefix).

sps_high_throughput_flag is flag information indicating whether or not the CABAC high-throughput mode is applied. In a case where sps_high_throughput_flag is true (for example, 1), it indicates that the CABAC high-through-put mode is applied. In a case where sps_high_throughput_flag is false (for example, 0), it indicates that the normal mode is applied (not the CABAC high-throughput mode). last_sig_coeff_{x, y}_prefix indicates a prefix portion of a position (last coefficient position) in the X direction or the Y direction of the last valid coefficient.

Figure 11:
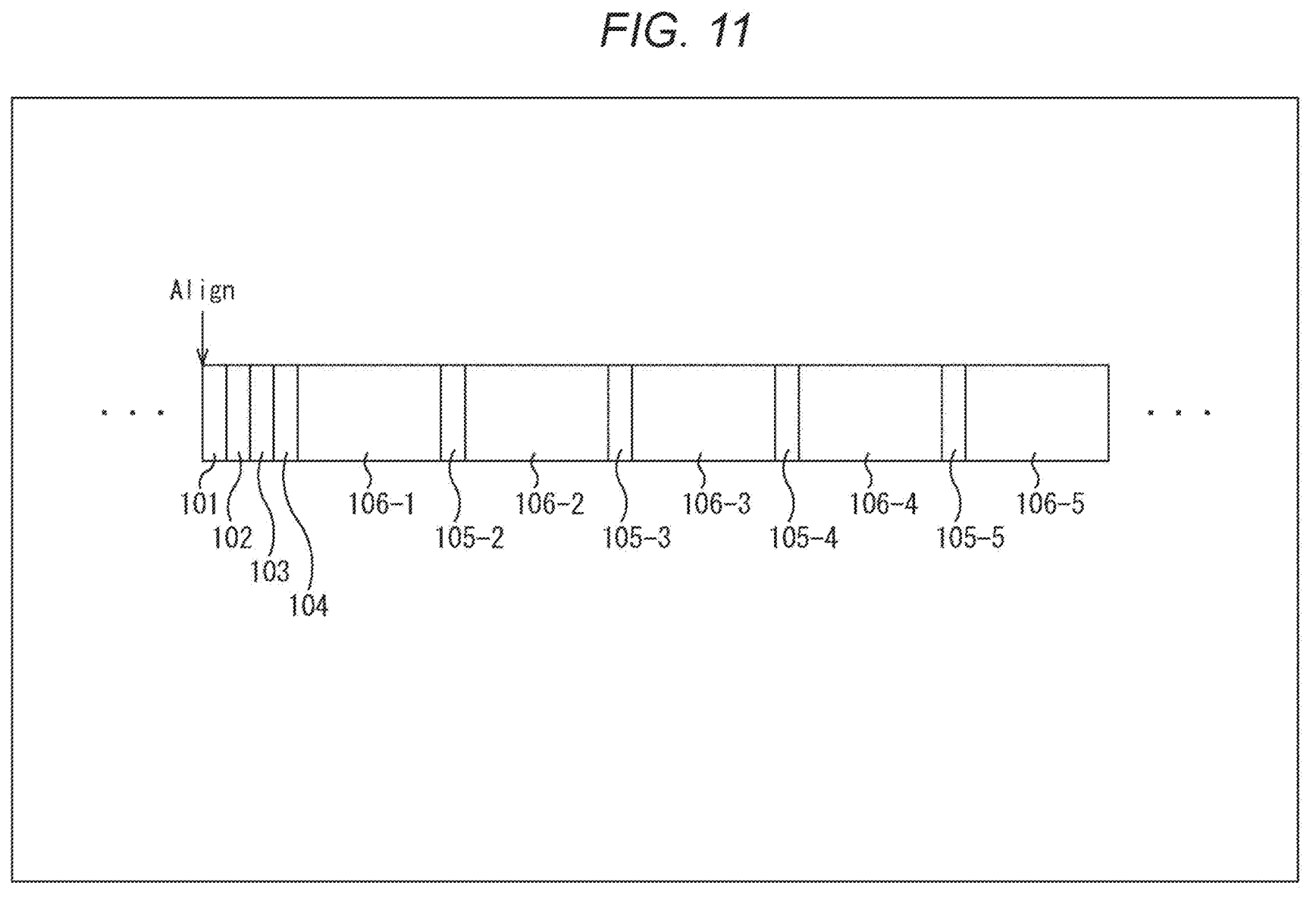

By encoding in this manner, as illustrated in FIG. 11, in the bit stream, the encoding bin (last_sig_coeff_x_prefix 101, last_sig_coeff_y_prefix 102, last_sig_coeff_x_suffix 103, and last_sig_coeff_y_suffix 104) related to the last coefficient position is formed, and then the encoding bin (Coefficient bits 106-1, sb_coded_flag 105-2, Coefficient bits 106-2, sb_coded_flag 105-3, Coefficient bits 106-3, sb_coded_flag 105-4, Coefficient bits 106-4, sb_coded_flag 105-5, and Coefficient bits 106-5) for each sub-block is formed. In a case where it is not necessary to distinguish and describe sb_coded_flag 105-2 to sb_coded_flag 105-5 from each other, they are also referred to as sb_coded_flag 105. Furthermore, in a case where it is not necessary to distinguish the Coefficient bits 106-1 to the Coefficient bits 106-5 from each other for explanation, they are also referred to as Coefficient bits 106.

last_sig_coeff_x_prefix 101 indicates the encoding bin of the prefix portion of the last coefficient position in the X direction. last_sig_coeff_y_prefix 102 indicates the encoding bin of the prefix portion of the last coefficient position in the Y direction. As described above, in a case where the CABAC high-throughput mode is applied, last_sig_coeff_x_prefix 101 and last_sig_coeff_y_prefix 102 are bypass encoding bins, since the prefix portion of the last coefficient position is processed as a bypass encoding bin.

As described with reference to FIG. 3 and the like, in the method described in Non-Patent Document 3, even in a case where the CABAC high-throughput mode is applied, the prefix portion (for example, last_sig_coeff_x_prefix 11 and last_sig_coeff_y_prefix 12) of the last coefficient position is encoded and decoded as a context encoding bin. On the other hand, in the Method #1, in a case where the CABAC high-throughput mode is applied, the prefix portion (last_sig_coeff_x_prefix 101 and last_sig_coeff_y_prefix 102) of the last coefficient position is encoded and decoded as a bypass encoding bin. The bypass encoding bin is lighter in throughput than the context encoding bin. Therefore, the generation amount of context encoding bins can be reduced, and an increase in the processing amount of encoding and decoding can be suppressed. For example, a processing amount of CABAC in encoding with a high bit depth and a high bit rate can be reduced, and throughput can be improved.

Note that, in FIG. 11, sb_coded_flag 105 is a sub-block coefficient flag and is flag information indicating whether or not all coefficients in the sub-block are 0. Therefore, sb_coded_flag 105 is set for each sub-block. Note that, in this case, since the last coefficient position has been sent, encoding or decoding is skipped for sb_coded_flag of the coefficient group including the last coefficient, and the value thereof is estimated to be 1. Coefficient bits 106 are encoding bins of coefficients per sub-block. That is, the coefficient is encoded and decoded for each sub-block (transform block).

Similarly to the case of the method described in Non-Patent Document 3, in the case of the CABAC high-throughput mode, a context encoding bin after the last coefficient position is encoded and decoded as a bypass encoding bin. That is, as illustrated in "For each coefficient group" in FIG. 10, in a case where the CABAC high-throughput mode is applied, each sub-block is bypass encoded and bypass decoded. That is, in FIG. 11, sb_coded_flag 105 and Coefficient bits 106 are configured by bypass encoding bins. As described above, by replacing the context encoding bin with the bypass encoding bin, the processing amount of CABAC can be reduced as compared with the case of encoding and decoding the context encoding bin as it is.

Method #1-1

For example, in a case where above-described Method #1 is applied, as illustrated in the second row from the top of the table illustrated in FIG. 9, in the case of the non-CABAC high-throughput mode, the prefix portion of the last coefficient position may be subjected to context encoding or context decoding (Method #1-1). That is, the prefix portion of the last coefficient position may be encoded or decoded as a context encoding bin in the case of not being in the high-throughput mode For example, in the image processing device, in the case of not being in the high-throughput mode, the encoding unit may encode the prefix portion of the last coefficient position as a context encoding bin. Furthermore, in the image processing device, in the case of not being in the high-throughput mode, the decoding unit may decode the prefix portion of the last coefficient position as a context encoding bin.

In the example of FIG. 10, as illustrated in "For last significant coefficient position", in a case where sps_high_throughput_flag is false (sps_high_throughput_flag==0), last_sig_coeff_{x, y}_preffix is encoded and decoded as a context encoding bin (context_coding of last_sig_coeff_{x, y}_preffix).

By doing so, only in the case of the high-throughput mode, the prefix portion of the last coefficient position can be processed as a bypass encoding bin.

Method #1-2

For example, in a case where above-described Method #1 is applied, the suffix portion of the last coefficient position may be subjected to bypass encoding or bypass decoding as illustrated in the third row from the top of the table illustrated in FIG. 9 (Method #1-2).

For example, in the image processing device, the encoding unit may encode the suffix portion of the last coefficient position included in the image data as a bypass encoding bin. Furthermore, in the image processing device, the decoding unit may decode the suffix portion of the last coefficient position included in the coded data as a bypass encoding bin.

In the example of FIG. 10, as illustrated in "For last significant coefficient position", last_sig_coeff_{x, y}_suffix is encoded and decoded as a bypass encoding bin regardless of whether or not the mode is the CABAC high-throughput mode (bypass_coding of last_sig_coeff_{x, y}_suffix). last_sig_coeff_{x, y} suffix indicates a suffix portion of a position (last coefficient position) in the X direction or the Y direction of the last valid coefficient.

In FIG. 11, last_sig_coeff_x_suffix 103 indicates the encoding bin of the suffix portion of the last coefficient position in the X direction. last_sig_coeff_y_suffix 104 indicates the encoding bin of the suffix portion of the last coefficient position in the Y direction. In the case of Method #1-2, since the suffix portion of the last coefficient position is encoded or decoded as a bypass encoding bin as described above, last_sig_coeff_x_suffix 103 and last_sig_coeff_y_suffix 104 are bypass encoding bins. That is, the last coefficient position and the context encoding bins (last_sig_coeff_x_prefix 101 to Coefficient bits 106 in FIG. 11) for each sub-block are all encoded or decoded as bypass encoding bins.

By doing so, the amount of context encoding bins generated can be reduced, and an increase in the processing amount of encoding and decoding can be suppressed. For example, a processing amount of CABAC in encoding with a high bit depth and a high bit rate can be reduced, and throughput can be improved.

Method #1-3

For example, in a case where above-described Method #1 is applied, as illustrated in the fourth row from the top of the table illustrated in FIG. 9, in the case of the CABAC high-throughput mode, the CABAC bypass alignment processing may be performed immediately before the encoding or decoding of the last coefficient position (Method #1-3).

For example, in the image processing device, the encoding unit may perform the alignment processing of the encoding process immediately before the encoding of the last coefficient position in the case of the high-throughput mode. Furthermore, in the image processing device, the decoding unit may perform alignment processing of the decoding process immediately before decoding of the last coefficient position in the case of the high-throughput mode.

In the example of FIG. 10, at "For remBinsPass1 and alignment" before "For last significant coefficient position", in a case where sps_high_throughput_flag is true (not 0), a CABAC bypass alignment is performed (CABAC bypass alignment). That is, in the case of the CABAC high-throughput mode, as illustrated in FIG. 11, the CABAC bypass alignment processing is performed (Align) immediately before the processing of last_sig_coeff_x_prefix 101. CABAC bypass alignment is processing of adjusting the CABAC process. By performing this processing, a plurality of bypass encoding bins can be easily processed in parallel. That is, by performing the CABAC bypass alignment processing immediately before the encoding or decoding of the last coefficient position, the bypass encoding bin of the last coefficient position can also be easily processed in parallel. Therefore, an increase in the processing amount of encoding and decoding can be suppressed.

Note that, as described above, the present technology can also be applied to encoding or decoding other than CABAC. Accordingly, the CABAC bypass alignment described above is also not limited to CABAC. That is, this processing may be simply processing (alignment processing) of adjusting the encoding process (or decoding process).

Method #1-3-1

For example, in a case where above-described Method #1-3 is applied, as illustrated in the fifth row from the top of the table illustrated in FIG. 9, in the CABAC bypass alignment processing, the parameter iVlCurrRange may be set to 256 (Method #1-3-1).

The parameter ivlCurrRange is a parameter indicating a range in the arithmetic encoding. The parameters ivlCurrRange and ivlOffset represent the state of the encoding engine.

For example, in the image processing device, the encoding unit may set the variable iVlCurrRange indicating the range in the arithmetic encoding to 256 in the alignment processing. Furthermore, in the image processing device, the decoding unit may set the variable iVlCurrRange indicating the range in the arithmetic encoding to 256 in the alignment processing.

By fixing the parameter ivlCurrRange to 256, the encoding or decoding of the bypass encoding bin is simplified and 1 bit of the bit stream can be directly processed as a bypass encoding bin. This allows multiple bypass encoding bins to be processed in parallel. That is, by performing this setting immediately before encoding or decoding of the last coefficient position, the bypass encoding bins of the entire coefficient encoding including the last coefficient position can be easily processed in parallel. Therefore, an increase in the processing amount of encoding and decoding can be suppressed.

Method #1-3-2

For example, in a case where above-described Method #1-3 is applied, as illustrated in the sixth row from the top of the table illustrated in FIG. 9, when the CABAC bypass alignment processing is performed, the generation amount of the context encoding bin number may be further set to 0 (Method #1-3-2).

For example, in the image processing device, the encoding unit may further set the generation amount of the number of context encoding bins to 0 immediately before encoding of the last coefficient position. Furthermore, in the image processing device, the decoding unit may further set the generation amount of the number of context encoding bins to 0 immediately before decoding of the last coefficient position.

In the example of FIG. 10, in a case where sps_high_throughput_flag is true (not 0) in "For remBinsPass1 and alignment", the parameter remCcbs (remBinPass1 in FIG. 10) is set to 0 (remBinPass1=0). That is, in the case of the CABAC high-throughput mode, the parameter remCcbs is set to 0. The parameter remCcbs is a parameter indicating the generation amount of the number of context encoding bins. That is, bypass encoding is selected. By setting the parameter remCcbs to 0 before the encoding or decoding of the last coefficient position, the encoding bins of the entire coefficient encoding including the last coefficient position can be processed as bypass encoding bins. Therefore, the generation amount of context encoding bins can be reduced, and an increase in the processing amount of encoding and decoding can be suppressed.

Method #1-3-3

For example, in a case where above-described Method #1-3 is applied, as illustrated in the bottom row of the table illustrated in FIG. 9, in the case of the non-CABAC high-throughput mode, the generation amount of the context encoding bin number may be derived on the basis of the reference value of the context encoding bin number and the transform block size (Method #1-3-3).

For example, in the image processing device, in the case of not being in the high-throughput mode, the encoding unit may derive the generation amount of the number of context encoding bins on the basis of the reference value of the number of context encoding bins and the transform block size immediately before encoding of the last coefficient position. Furthermore, in the image processing device, in the case of not being in the high-throughput mode, the decoding unit may derive the generation amount of the number of context encoding bins on the basis of the reference value of the number of context encoding bins and the transform block size immediately before decoding of the last coefficient position.

In the example of FIG. 10, in "For remBinsPass1 and alignment", in a case where sps_high_throughput_flag is false (sps_high_throughput_flag==0), CABAC bypass alignment is not executed. Furthermore, a parameter remCcbs (remBinPass1 in FIG. 10) is derived on the basis of the parameter ctxBinSampleRatioBase, the parameter TbWidth, and the parameter TbHeight (remBinsPass1= ((1<<(log 2TbWidth+log 2TbHeight))*7)>2).

The parameter ctxBinSampleRatioBase indicates a reference value of the number of context encoding bins. In the example of FIG. 10, the parameter ctxBinSampleRatioBase is set to 7. The parameter TbWidth indicates the size (width) in the horizontal direction of the transform block. The parameter TbHeight indicates the size (height) in the vertical direction of the transform block. That is, the parameter remCcbs is derived by the following Formula (1).

$$remCcbs = ctxBinSampleRatioBase * (TbWidth * TbHeight >> 4) \quad (1)$$

In this way, in the case of not being in the high-throughput mode, the prefix portion of the last coefficient position can be processed as a context encoding bin.

<Encoding Device>

Figure 12:
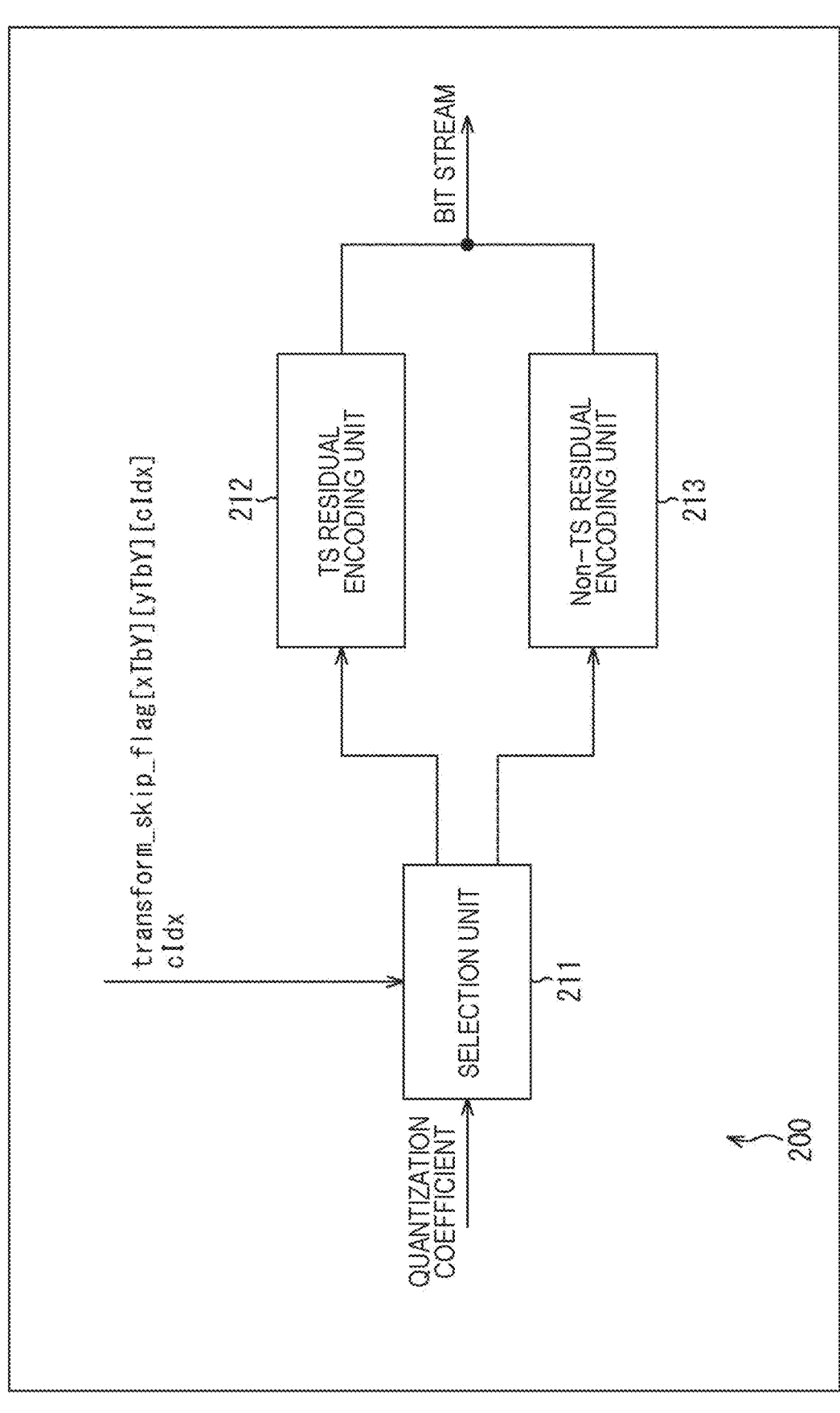
FIG. 12 is a block diagram illustrating a main configuration example of an encoding device.

FIG. 12 is a block diagram illustrating an example of a configuration of an encoding device which is an aspect of an image processing device to which the present technology is applied. An encoding device 200 illustrated in FIG. 12 is a device that encodes a quantization coefficient using CABAC.

The quantization coefficient is data generated using image data to be encoded. For example, the predicted image is derived for the image data. Then, a difference (prediction residual) between the image data and the predicted image is derived. Then, the prediction residual is subjected to coefficient transform (for example, orthogonal transform) to generate a transform coefficient. Then, the transform coefficient is quantized to generate a quantization coefficient. In this manner, the above-described quantization coefficient may be generated. Furthermore, among the above-described processes, for example, the coefficient transform may be skipped (omitted).

Note that FIG. 12 illustrates a main configuration including processing units, data flows, and the like, and the processing units and data flows illustrated in FIG. 12 are not necessarily all. That is, the encoding device 200 may include a processing unit not illustrated as a block in FIG. 12. Furthermore, the encoding device 200 may have a process or a data flow that is not illustrated as an arrow or the like in FIG. 12.

As illustrated in FIG. 12, the encoding device 200 includes a selection unit 211, a TS residual encoding unit 212, and a Non-TS residual encoding unit 213.

The selection unit 211 performs processing related to selection of encoding processing to be executed. For example, the selection unit 211 may acquire the quantization coefficient. Furthermore, the selection unit 211 may acquire transform_skip_flag and cIdx. transform_skip_flag is a transform skip flag and is flag information indicating whether or not the coefficient transform (for example, orthogonal transform) for the transform block corresponding to the flag has been skipped (omitted). In a case where transform_skip_flag is true (e.g., 1), it indicates that the coefficient transform has been skipped. In a case where transform_skip_flag is false (e.g., 0), it indicates that a coefficient transform has been applied. cIdx is a component identifier for identifying a color component such as a luminance component or a color component.

The selection unit 211 may select whether to apply TSRC (encoding in the TS residual encoding mode) or RRC (encoding in the Non-TS residual encoding mode) to the quantization coefficient for each transform block on the basis of transform_skip_flag and cIdx. For example, in a case where transform_skip_flag [cIdx] is true, the selection unit 211 may select application of TSRC and supply the quantization coefficient to the TS residual encoding unit 212. Furthermore, in a case where transform_skip_flag [cIdx] is false, the selection unit 211 may select application of RRC and supply the quantization coefficient to the Non-TS residual encoding unit 213.

The TS residual encoding unit 212 performs a process relating to encoding (TSRC) in the TS residual encoding mode. For example, the TS residual encoding unit 212 may acquire the quantization coefficient supplied from the selection unit 211. Furthermore, the TS residual encoding unit 212 may encode the quantization coefficient in the TS residual encoding mode. For example, the TS residual encoding unit 212 may encode (TSRC) the quantization coefficient by a method similar to the method described in Non-Patent Document 3. Then, the TS residual encoding unit 212 may output the bit stream generated by the encoding to the outside of the encoding device 200.

The Non-TS residual encoding unit 213 (encoding unit) executes processing related to encoding (RRC) in the Non-TS residual encoding mode. For example, the Non-TS residual encoding unit 213 may acquire the quantization coefficient supplied from the selection unit 211. Furthermore, the Non-TS residual encoding unit 213 may encode the quantization coefficient in the Non-TS residual encoding mode. For example, the Non-TS residual encoding unit 213 may encode (RRC) the quantization coefficient by applying any of the methods described above with reference to FIG. 9 and the like. Then, the Non-TS residual encoding unit 213 may output the bit stream generated by the encoding to the outside of the encoding device 200.

<Non-TS Residual Encoding Unit>

Figure 13:
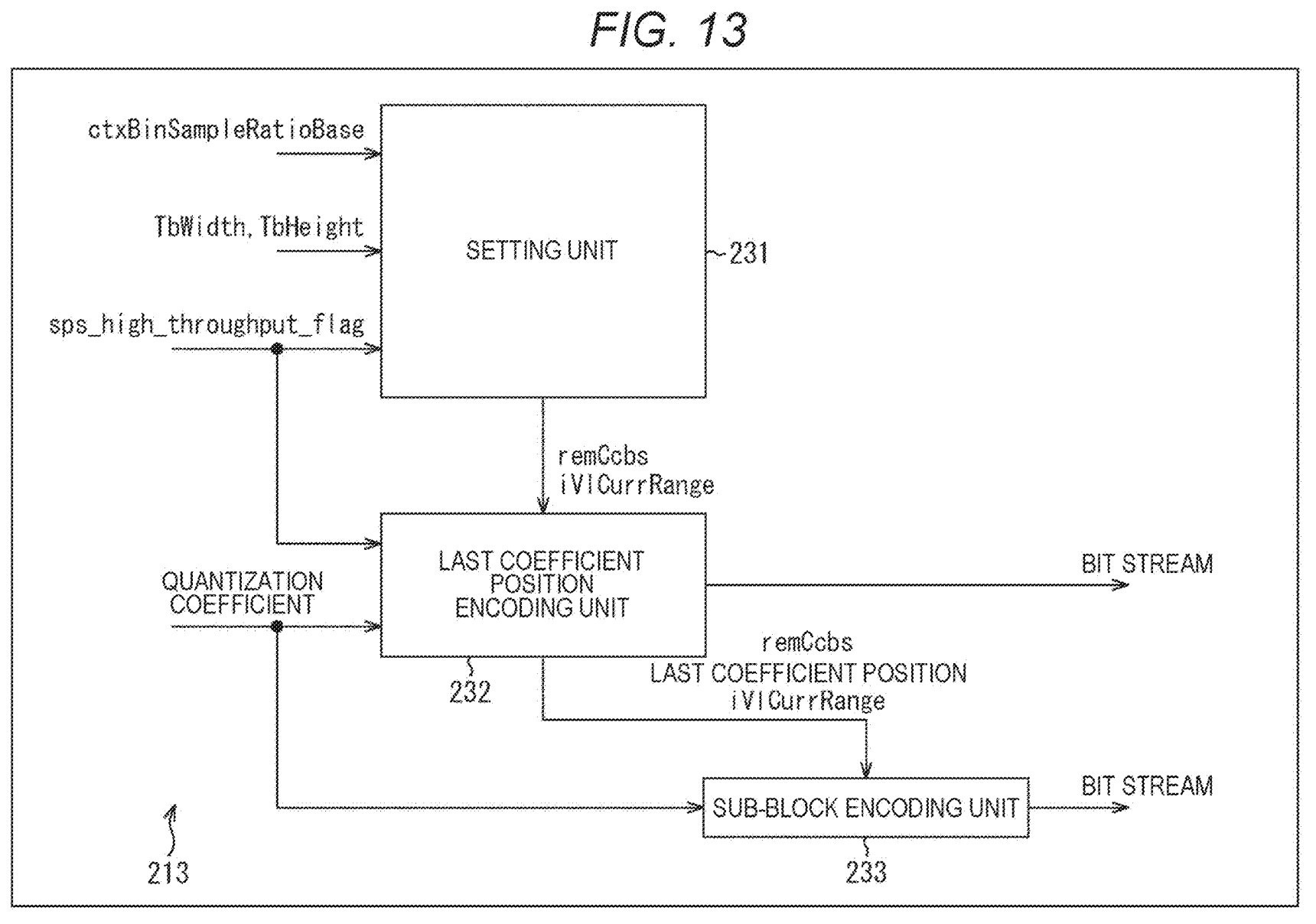

FIG. 13 is a block diagram illustrating a main configuration example of the Non-TS residual encoding unit 213 in FIG. 12. Note that, in FIG. 13, main parts of processing units, data flows, and the like are illustrated, and those illustrated in FIG. 13 are not necessarily all. That is, the Non-TS residual encoding unit 213 may include a processor not illustrated as a block in FIG. 13. Furthermore, the Non-TS residual encoding unit 213 may have processing or a data flow that is not illustrated as an arrow or the like in FIG. 13.

As illustrated in FIG. 13, the Non-TS residual encoding unit 213 includes a setting unit 231, a last coefficient position encoding unit 232, and a sub-block encoding unit 233.

The setting unit 231 performs processing related to parameter setting. For example, the setting unit 231 may acquire ctxBinSampleRatioBase. ctxBinSampleRatioBase is a parameter indicating a reference value of the number of context encoding bins. Furthermore, the setting unit 231 may acquire TbWidth and TbHeight. TbWidth is a parameter indicating the size (width) in the horizontal direction of the transform block. TbHeight is a parameter indicating the size (height) in the vertical direction of the transform block. Furthermore, the setting unit 231 may acquire sps_high_throughput_flag. As described above, sps_high_throughput_flag is flag information indicating whether or not the CABAC high-throughput mode is applied.

For example, in a case where sps_high_throughput_flag is true, the setting unit 231 may apply above-described Method #1-3 and perform CABAC bypass alignment processing immediately before encoding of the last coefficient position. In this case, for example, the setting unit 231 may apply above-described Method #1-3-1 and set the parameter iVl-CurrRange to 256 in the CABAC bypass alignment processing. Furthermore, the setting unit 231 may apply above-described Method #1-3-2 and further set the generation amount of the number of context encoding bins to 0. That is, the setting unit 231 may set the parameter remCcbs indicating the generation amount of the context encoding bin number to 0.

Furthermore, in a case where sps_high_throughput_flag is false, the setting unit 231 may apply above-described Method #1-3-3, and derive the generation amount (remCcbs) of the number of context encoding bins on the basis of the reference value of the number of context encoding bins (ctxBinSampleRatioBase) and the transform block size (TbWidth, TbHeight). For example, the setting unit 231 may derive remCcbs using the above-described Formula (1).

For example, the setting unit 231 may supply the value remCcbs to which the value is set to the last coefficient position encoding unit 232. Furthermore, in a case where the CABAC bypass alignment processing is performed, the setting unit 231 may supply the set iVlCurrRange to the last coefficient position encoding unit 232.

The last coefficient position encoding unit 232 performs processing related to encoding of the last coefficient position. For example, the last coefficient position encoding unit 232 may obtain sps_high_throughput_flag. Furthermore, the last coefficient position encoding unit 232 may obtain the quantization coefficient. Furthermore, the last coefficient position encoding unit 232 may acquire remCcbs supplied from the setting unit 231. Furthermore, the last coefficient position encoding unit 232 may acquire iVlCurrRange supplied from the setting unit 231.

For example, the last coefficient position encoding unit 232 may set a prefix portion (last_sig_coeff_{x, y}_prefix) and a suffix portion (last_sig_coeff_{x, y} suffix) of the last coefficient position on the basis of the last coefficient positions (LastSignificantCoef {X,Y}) in the X direction and the Y direction. In last_sig_coeff_{x, y}_prefix, a prefix portion (last_sig_coeff_x_prefix) of the last coefficient position in the X direction and a prefix portion (last_sig_coeff_y_prefix) of the last coefficient position in the Y direction are collectively abbreviated. Similarly, last_sig_coeff_{x, y} suffix is a simplified notation of a suffix portion (last_sig_coeff_x_suffix) of the last coefficient position in the X direction and a suffix portion (last_sig_coeff_y_suffix) of the last coefficient position in the Y direction collectively.

Furthermore, the last coefficient position encoding unit 232 may apply Method #1 described above, and encode a prefix portion (last_sig_coeff_{x, y}_prefix) of the last coefficient position as a bypass code bin in a case where sps_high_throughput_flag is true. Furthermore, the last coefficient position encoding unit 232 may apply Method

1-1 described above, and in a case where sps_high_throughput_flag is false, encode a prefix portion (last_sig_coeff_{x, y}_prefix) of the last coefficient position as a context encoding bin. Moreover, the last coefficient position encoding unit 232 may apply Method #1-2 described above, and encode the suffix portion (last_sig_coeff_{x, y}_suffix) of the last coefficient position as a bypass code bin regardless of whether or not the mode is the CABAC high-throughput mode.

For example, the last coefficient position encoding unit 232 may output the encoding bin corresponding to the prefix portion and the encoding bin corresponding to the suffix portion of the last coefficient position generated by encoding as described above to the outside of the encoding device 200 as a bit stream. Furthermore, the last coefficient position encoding unit 232 may supply remCcbs to the sub-block encoding unit 233. Furthermore, the last coefficient position encoding unit 232 may supply iVlCurrRange to the sub-block encoding unit 233. Furthermore, the last coefficient position encoding unit 232 may supply the last coefficient position (LastSignificantCoef {X, Y}) to the sub-block encoding unit 233.

The sub-block encoding unit 233 performs processing related to encoding of coefficients and the like for each sub-block. For example, the sub-block encoding unit 233 may obtain the quantization coefficient. Furthermore, the sub-block encoding unit 233 may obtain remCcbs supplied from the last coefficient position encoding unit 232. Furthermore, the sub-block encoding unit 233 may obtain iVlCurrRange supplied from the last coefficient position encoding unit 232. Furthermore, the sub-block encoding unit 233 may obtain the last coefficient position (LastSignificantCoef {X, Y}) supplied from the last coefficient position encoding unit 232.

For example, the sub-block encoding unit 233 may encode the sub-block coefficient flag (sb_coded_flag) and the quantization coefficient for each sub-block using the information supplied from the last coefficient position encoding unit 232. For example, the sub-block encoding unit 233 may encode a sub-block coefficient flag (sb_coded_flag) or a quantization coefficient as a bypass encoding bin.

For example, the sub-block encoding unit 233 may output a bypass encoding bin group (sub-block coefficient flag (sb_coded_flag) and bypass encoding bin of quantization coefficient) for each sub-block generated by such encoding to the outside of the encoding device 200 as a bit stream.

With such a configuration, the encoding device 200 can apply each of the methods described above in <3. Bypass encoding and bypass decoding of last coefficient position>. That is, the encoding device 200 can obtain an effect similar to the effect of each method described above in <3. Bypass encoding and bypass decoding of last coefficient position>. Therefore, the encoding device 200 can reduce the generation amount of context encoding bins and suppress an increase in the processing amount of encoding and decoding. For example, the encoding device 200 can reduce a processing amount of CABAC in encoding with a high bit depth and a high bit rate, and improve throughput.

<Flow of Encoding Process>

An example of a flow of an encoding process executed by the encoding device 200 will be described with reference to a flowchart in FIG. 14.

When the encoding process is started, the encoding device 200 encodes the transform mode information (transform_skip_flag or the like) of the transform block corresponding to the component identifier cIdx in step S101.

In step S102, the selection unit 211 determines whether or not to perform encoding in the TS residual encoding mode. For example, in a case where transform_skip_flag [cIdx] is true and it is determined that encoding is performed in the TS residual encoding mode, the processing proceeds to step S103.

In step S103, the TS residual encoding unit 212 encodes the quantization coefficient in the TS residual encoding mode. For example, the TS residual encoding unit 212 may encode (TSRC) the quantization coefficient by a method similar to the method described in Non-Patent Document 3. When the processing of step S103 ends, the encoding process ends.

Furthermore, in a case where transform_skip_flag [cIdx] is false and it is determined in step S102 that encoding is performed in the Non-TS residual encoding mode, the process proceeds to step S104.

In step S104, the Non-TS residual encoding unit 213 executes a Non-TS residual encoding process to encode the quantization coefficient in the Non-TS residual encoding mode. For example, the Non-TS residual encoding unit 213 may encode (RRC) the quantization coefficient by applying any of the methods described above with reference to FIG. 9 and the like. When the processing of step S104 ends, encoding process ends.

<Flow of Non-TS Residual Encoding Process>

Next, an example of a flow of the Non-TS residual encoding process executed in step S104 of FIG. 14 will be described with reference to a flowchart of FIG. 15.

When the Non-TS residual encoding process is started, in step S131, the setting unit 231 of the Non-TS residual encoding unit 213 determines whether or not the mode is the CABAC high-throughput mode.

In a case where sps_high_throughput_flag is determined to be true (that is, the mode is the CABAC high-throughput mode), the process proceeds to step S132. In step S132, the setting unit 231 applies Method #1-3-2 described above, and sets the generation amount (remCcbs) of the number of context encoding bins to 0. As a result, bypass encoding is selected in subsequent encoding.

In step S133, the setting unit 231 applies Method #1-3 described above and performs CABAC bypass alignment. At that time, the setting unit 231 may apply Method #1-3-1 described above and set the parameter iVlCurrRange to 256. This simplifies the encoding of the bypass encoding bins and further allows multiple bypass encoding bins to be processed in parallel. When the processing of step S133 ends, the process proceeds to step S135.

Furthermore, in a case where sps_high_throughput_flag is determined to be false (that is, the mode is the non-CABAC high-throughput mode) in step S131, the process proceeds to step S134. In step S134, the setting unit 231 applies Method #1-3-3 described above, and derives the generation amount (remCcbs) of the number of context encoding bins on the basis of the reference value (ctxBinSampleRatioBase) of the number of context encoding bins and the transform block size (TbWidth, TbHeight). When the processing of step S134 ends, the process proceeds to step S135.

In step S135, the last coefficient position encoding unit 232 sets a prefix portion (last_sig_coeff_{x, y)}_prefix) and a suffix portion (last_sig_coeff_{x, y}_suffix) of the last coefficient position on the basis of the last coefficient positions (LastSignificantCoef {X, Y}) in the X direction and the Y direction.

In step S136, the last coefficient position encoding unit 232 determines whether or not the CABAC high-throughput mode is set.

In a case where sps_high_throughput_flag is determined to be true (that is, the mode is the CABAC high-throughput mode), the process proceeds to step S137. In step S137, the last coefficient position encoding unit 232 applies Method #1 described above, and encodes the prefix portion (last_sig_coeff_{x, y}_prefix) of the last coefficient position as a bypass code bin. When the processing of step S137 ends, the process proceeds to step S139.

Furthermore, in a case where sps_high_throughput_flag is determined to be false (that is, the mode is the non-CABAC high-throughput mode) in step S136, the process proceeds to step S138. In step S138, the last coefficient position encoding unit 232 applies Method #1-1 described above, and encodes a prefix portion (last_sig_coeff_{x, y}_prefix) of the last coefficient position as a context encoding bin. When the processing of step S138 ends, the process proceeds to step S139.

In step S139, the last coefficient position encoding unit 232 applies Method #1-2 described above, and encodes the suffix portion (last_sig_coeff_{x, y}_suffix) of the last coefficient position as a bypass code bin.

In step S140, the sub-block encoding unit 233 encodes coefficients and the like for each sub-block. When the processing of step S140 ends, the Non-TS residual encoding process ends, and the process returns to FIG. 14.

By executing each process as described above, the encoding device 200 can apply each method described above in <3. Bypass encoding and bypass decoding of last coefficient position>. That is, the encoding device 200 can obtain an effect similar to the effect of each method described above in <3. Bypass encoding and bypass decoding of last coefficient position>. Therefore, the encoding device 200 can reduce the generation amount of context encoding bins and suppress an increase in the processing amount of encoding and decoding. For example, the encoding device 200 can reduce a processing amount of CABAC in encoding with a high bit depth and a high bit rate, and improve throughput.

<Decoding Device>

Figure 16:
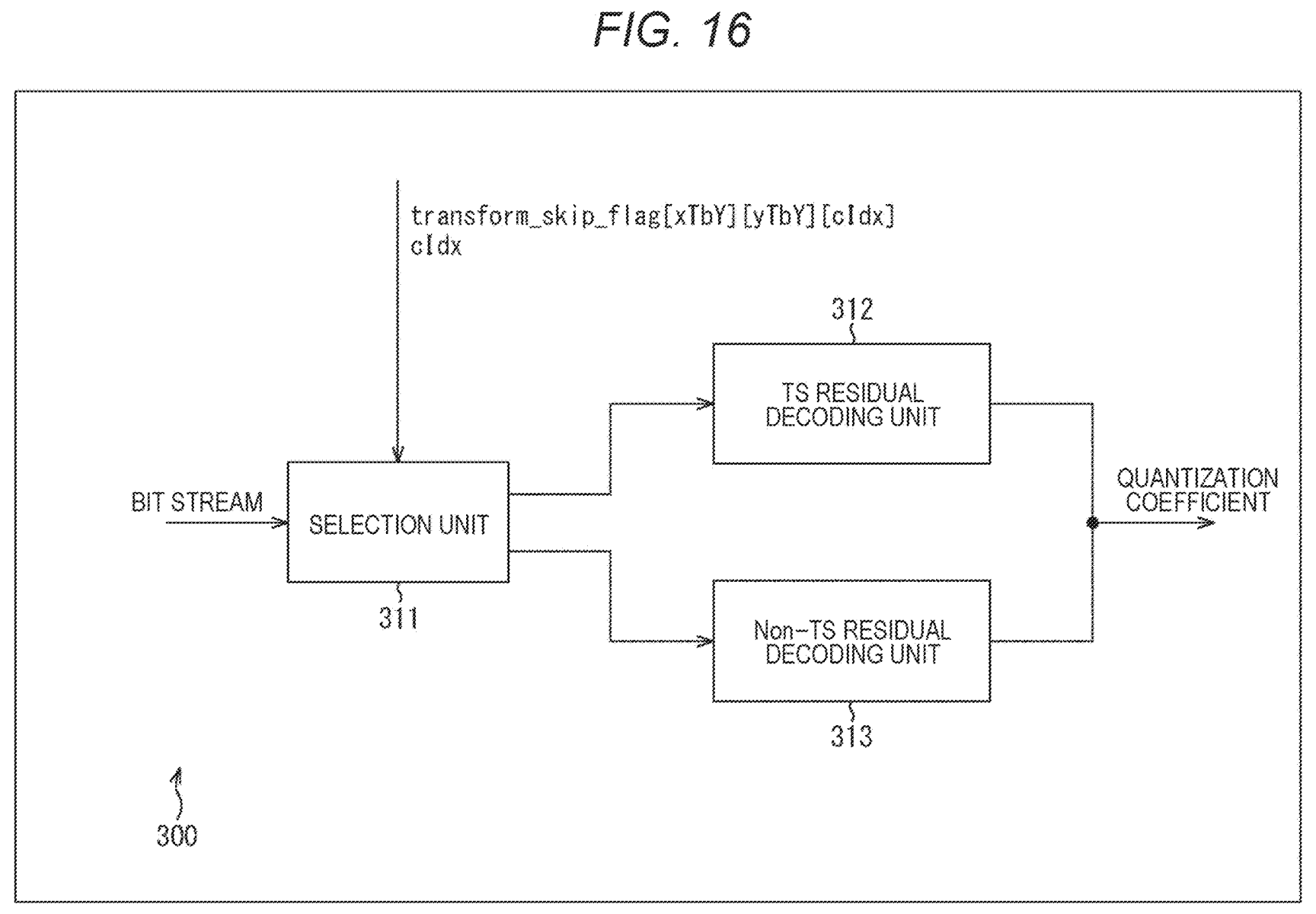

FIG. 16 is a block diagram illustrating an example of a configuration of a decoding device which is an aspect of an image processing device to which the present technology is applied. A decoding device 300 illustrated in FIG. 16 is a device that decodes a bit stream using CABAC and generates (restores) a quantization coefficient.

Similarly to the case of the encoding device 200, the quantization coefficient is data generated using image data to be encoded. That is, the bit stream to be decoded is generated by encoding the quantization coefficient by the image processing device (for example, the encoding device 200) to which the present technology is applied.

Note that while FIG. 16 illustrates main elements such as processing units and data flows, those depicted in FIG. 16 do not necessarily include all elements. That is, the decoding device 300 may include a processor not illustrated as a block in FIG. 16. Furthermore, the decoding device 300 may have a process or a data flow that is not illustrated as an arrow or the like in FIG. 16.

As illustrated in FIG. 16, the decoding device 300 includes a selection unit 311, a TS residual decoding unit 312, and a Non-TS residual decoding unit 313.

The selection unit 311 performs processing related to selection of decoding processing to be executed. For example, the selection unit 311 may acquire a bit stream. Furthermore, the selection unit 311 may acquire transform_skip_flag and cIdx.

The selection unit 311 may select, for each transform block, whether to apply TSRC (decoding in the TS residual encoding mode) or RRC (decoding in the Non-TS residual encoding mode) to the bit stream on the basis of transform_skip_flag and cIdx. For example, in a case where transform_skip_flag [cIdx] is true, the selection unit 311 may select application of TSRC and supply the bit stream to the TS residual decoding unit 312. Furthermore, in a case where transform_skip_flag [cIdx] is false, the selection unit 311 may select application of RRC and supply the bit stream to the Non-TS residual decoding unit 313.

The TS residual decoding unit 312 performs a process related to decoding (TSRC) in the TS residual encoding mode. For example, the TS residual decoding unit 312 may acquire the bit stream supplied from the selection unit 311. Furthermore, the TS residual decoding unit 312 may decode the bit stream in the TS residual encoding mode to generate (restore) the quantization coefficient. For example, the TS residual decoding unit 312 may decode (TSRC) the bit stream by a method similar to the method described in Non-Patent Document 3. Then, the TS residual decoding unit 312 may output the quantization coefficient generated (restored) by the decoding to the outside of the decoding device 300.

The Non-TS residual decoding unit 313 (decoding unit) executes processing related to decoding (RRC) in the Non-TS residual encoding mode. For example, the Non-TS residual decoding unit 313 may acquire the bit stream supplied from the selection unit 311. Furthermore, the Non-TS residual decoding unit 313 may decode the bit stream in the Non-TS residual encoding mode to generate (restore) the quantization coefficient. For example, the Non-TS residual decoding unit 313 may decode (RRC) the bit stream by applying any of the methods described above with reference to FIG. 9 and the like. Then, the Non-TS residual decoding unit 313 may output the quantization coefficient generated (restored) by the decoding to the outside of the decoding device 300.

<Non-TS Residual Decoding Unit>

Figure 17:
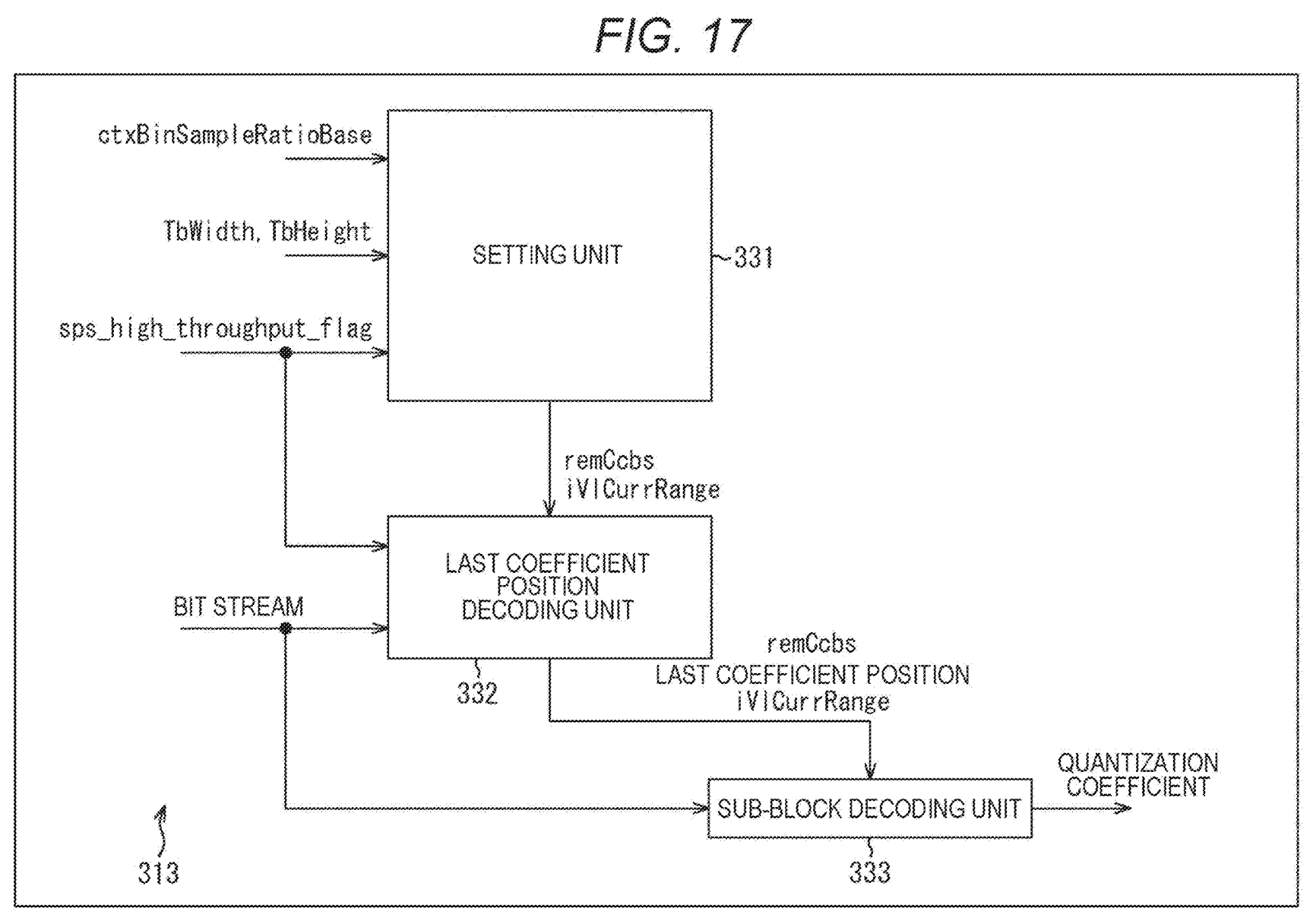

FIG. 17 is a block diagram illustrating a main configuration example of the Non-TS residual decoding unit 313 in FIG. 16. Note that, in FIG. 17, main parts of processing units, data flows, and the like are illustrated, and those illustrated in FIG. 17 are not necessarily all. That is, the Non-TS residual decoding unit 313 may include a processor not illustrated as a block in FIG. 17. Furthermore, the Non-TS residual decoding unit 313 may have a process or a data flow that is not illustrated as an arrow or the like in FIG. 17.

As illustrated in FIG. 17, the Non-TS residual decoding unit 313 includes a setting unit 331, a last coefficient position decoding unit 332, and a sub-block decoding unit 333.

The setting unit 331 performs processing related to parameter setting. For example, the setting unit 331 may acquire ctxBinSampleRatioBase. Furthermore, the setting unit 331 may acquire TbWidth and TbHeight. Furthermore, the setting unit 331 may acquire sps_high_throughput_flag.

For example, in a case where sps_high_throughput_flag is true, the setting unit 331 may apply above-described Method #1-3 and perform CABAC bypass alignment processing immediately before decoding of the last coefficient position. In this case, for example, the setting unit 331 may apply above-described Method #1-3-1 and set the parameter iVlCurrRange to 256 in the CABAC bypass alignment processing. Furthermore, the setting unit 331 may apply Method #1-3-2 described above, and further set the generation amount (remCcbs) of the number of context encoding bins to 0.

Furthermore, in a case where sps_high_throughput_flag is false, the setting unit 331 may apply above-described Method #1-3-3, and derive the generation amount (remCcbs) of the number of context encoding bins on the basis of the reference value of the number of context encoding bins (ctxBinSampleRatioBase) and the transform block size (TbWidth, TbHeight). For example, the setting unit 331 may derive remCcbs using the above-described Formula (1).

For example, the setting unit 331 may supply the value remCcbs to which the value is set to the last coefficient position decoding unit 332. Furthermore, in a case where the CABAC bypass alignment processing is performed, the setting unit 331 may supply the set iVlCurrRange to the last coefficient position decoding unit 332.

The last coefficient position decoding unit 332 performs processing related to decoding of the last coefficient position. For example, the last coefficient position decoding unit 332 may acquire sps_high_throughput_flag. Furthermore, last coefficient position decoding unit 332 may obtain the bit stream. Furthermore, the last coefficient position decoding unit 332 may acquire remCcbs supplied from the setting unit 331. Furthermore, the last coefficient position decoding unit 332 may acquire iVlCurrRange supplied from the setting unit 331.

For example, in a case where above-described Method #1 is applied and sps_high_throughput_flag is true, the last coefficient position decoding unit 332 may decode a prefix portion (last_sig_coeff_{x, y)}_prefix) of the last coefficient position included in the bit stream as a bypass code bin. Furthermore, the last coefficient position decoding unit 332 may apply above-described Method #1-1, and in a case where sps_high_throughput_flag is false, decode the prefix portion (last_sig_coeff_{x, y}_prefix) of the last coefficient position included in the bit stream as a context encoding bin. Moreover, the last coefficient position decoding unit 332 may decode the suffix portion (last_sig_coeff_{x, y}_suffix) of the last coefficient position included in the bit stream as a bypass code bin regardless of whether or not the mode is the CABAC high-throughput mode by applying above-described Method #1-2.

Furthermore, the last coefficient position decoding unit 332 may set the last coefficient positions in the X direction and the Y direction (LastSignificantCoef {X, Y}) on the basis of the prefix portion (last_sig_coeff_{x, y}_prefix) and the suffix portion (last_sig_coeff_{x, y}_suffix) of the last coefficient position obtained by decoding the bit stream.

For example, the last coefficient position decoding unit 332 may supply remCcbs to the sub-block decoding unit 333. Furthermore, the last coefficient position decoding unit 332 may supply iVlCurrRange to the sub-block decoding unit 333. Furthermore, the last coefficient position decoding unit 332 may supply the last coefficient position (LastSignificantCoef {X, Y}) to the sub-block decoding unit 333.

The sub-block decoding unit 333 performs processing related to decoding of coefficients and the like for each sub-block. For example, the sub-block decoding unit 333 may obtain a bit stream. Furthermore, the sub-block decoding unit 333 may acquire remCcbs supplied from the last coefficient position decoding unit 332. Furthermore, the sub-block decoding unit 333 may acquire iVlCurrRange supplied from the last coefficient position decoding unit 332. Furthermore, the sub-block decoding unit 333 may obtain the last coefficient position (LastSignificantCoef {X, Y}) supplied from the last coefficient position decoding unit 332.

For example, the sub-block decoding unit 333 may decode the bit stream using the information supplied from the last coefficient position decoding unit 332, and generate (restore) the sub-block coefficient flag (sb_coded_flag) and the quantization coefficient for each sub-block. For example, the sub-block decoding unit 333 may decode a sub-block coefficient flag (sb_coded_flag) and a quantization coefficient included in the bit stream as a bypass encoding bin.

For example, the sub-block decoding unit 333 may output the quantization coefficient for each sub-block generated (restored) by such decoding to the outside of the decoding device 300.

With such a configuration, the decoding device 300 can apply each method described above in <3. Bypass encoding and bypass decoding of last coefficient position>. That is, the decoding device 300 can obtain an effect similar to the effect of each method described above in <3. Bypass encoding and bypass decoding of last coefficient position>. Therefore, the decoding device 300 can reduce the generation amount of context encoding bins and suppress an increase in the processing amount of encoding and decoding. For example, the decoding device 300 can reduce the processing amount of CABAC in decoding at a high bit depth and a high bit rate, and improve the throughput.

<Flow of Decoding Process>

An example of a flow of a decoding process executed by the decoding device 300 will be described with reference to a flowchart of FIG. 18.

When the decoding process is started, in step S201, the decoding device 300 decodes the coded data of the transform mode information (transform_skip_flag or the like) of the transform block corresponding to the component identifier cIdx.

In step S202, the selection unit 311 determines whether or not decoding is performed in the TS residual encoding mode. For example, in a case where transform_skip_flag [cIdx] is true and it is determined that decoding is performed in the TS residual encoding mode, the processing proceeds to step S203.

In step S203, the TS residual decoding unit 312 decodes the bit stream in the TS residual encoding mode, and generates (restores) the quantization coefficient. For example, the TS residual decoding unit 312 may decode (TSRC) the bit stream by a method similar to the method described in Non-Patent Document 3. When the processing of step S203 ends, the decoding process ends.

Furthermore, in step S202, in a case where transform_skip_flag [cIdx] is false and it is determined that decoding is performed in the Non-TS residual encoding mode, the processing proceeds to step S204.

In step S204, the Non-TS residual decoding unit 313 executes a Non-TS residual decoding process to decode the bit stream in the Non-TS residual encoding mode and generate (restore) the quantization coefficient. For example, the Non-TS residual decoding unit 313 may decode (RRC) the bit stream by applying any of the methods described above with reference to FIG. 9 and the like. When the processing of step S204 ends, the decoding processing ends.

<Flow of Non-TS Residual Decoding Process>

Next, an example of a flow of a Non-TS residual decoding process executed in step S204 of FIG. 18 will be described with reference to a flowchart of FIG. 19.

When the Non-TS residual decoding process is started, in step S231, the setting unit 331 of the Non-TS residual decoding unit 313 determines whether or not the mode is the CABAC high-throughput mode.

In a case where sps_high_throughput_flag is determined to be true (that is, the mode is the CABAC high-throughput mode.), the process proceeds to step S232. In step S232, the setting unit 331 applies Method #1-3-2 described above, and sets the generation amount (remCcbs) of the number of context encoding bins to 0. As a result, bypass decoding is selected in subsequent decoding.

In step S233, the setting unit 331 applies Method #1-3 described above and performs CABAC bypass alignment. At that time, the setting unit 331 may apply Method #1-3-1 described above and set the parameter iVlCurrRange to 256. This simplifies the decoding of the bypass encoding bins and further allows multiple bypass encoding bins to be processed in parallel.

In step S234, the last coefficient position decoding unit 332 applies Method #1 described above, and decodes a prefix portion (last_sig_coeff_{x, y}_prefix) of the last coefficient position included in the bit stream as a bypass code bin. When the processing of step S234 ends, the process proceeds to step S237.

Furthermore, in a case where sps_high_throughput_flag is determined to be false (that is, the mode is the non-CABAC high-throughput mode.) in step S231, the process proceeds to step S235. In step S235, the setting unit 331 applies Method #1-3-3 described above, and derives the generation amount (remCcbs) of the number of context encoding bins on the basis of the reference value (ctxBinSampleRatioBase) of the number of context encoding bins and the transform block size (TbWidth, TbHeight).

In step S236, the last coefficient position decoding unit 332 applies Method #1-1 described above, and decodes the prefix portion (last_sig_coeff_{x, y}_prefix) of the last coefficient position included in the bit stream as a context encoding bin. When the processing of step S236 ends, the process proceeds to step S237.

In step S237, the last coefficient position decoding unit 332 applies Method #1-2 described above, and decodes the suffix portion (last_sig_coeff_{x, y} suffix) of the last coefficient position included in the bit stream as a bypass code bin.

In step S238, the last coefficient position decoding unit 332 sets the last coefficient positions in the X direction and the Y direction (LastSignificantCoef {X, Y}) on the basis of the prefix portion (last_sig_coeff_{x, y}_prefix) of the last coefficient position obtained by the processing in step S234 or step S236 and the suffix portion (last_sig_coeff_{x, y}_suffix) of the last coefficient position obtained by the processing in step S237.

In step S239, the sub-block decoding unit 333 decodes the bit stream, and generates (restores) a sub-block coefficient flag (sb_coded_flag) and a quantization coefficient for each sub-block. For example, the sub-block decoding unit 333 may decode a sub-block coefficient flag (sb_coded_flag) and a quantization coefficient included in the bit stream as a bypass encoding bin. When the processing of step S239 ends, the Non-TS residual decoding process ends, and the process returns to FIG. 18.

By executing each processing as described above, the decoding device 300 can apply each method described above in <3. Bypass encoding and bypass decoding of last coefficient position>. That is, the decoding device 300 can obtain an effect similar to the effect of each method described above in <3. Bypass encoding and bypass decoding of last coefficient position>. Therefore, the decoding device 300 can reduce the generation amount of context encoding bins and suppress an increase in the processing amount of encoding and decoding. For example, the decoding device 300 can reduce the processing amount of CABAC in decoding at a high bit depth and a high bit rate, and improve the throughput.

4. Skipping Encoding or Decoding of Last Coefficient Position

Method #2

Furthermore, for example, as illustrated in the uppermost row of the table illustrated in FIG. 20, in the case of the CABAC high-throughput mode, encoding or decoding of the last coefficient position may be skipped (omitted) (Method #2).

For example, in a case of a high-throughput mode in which a context encoding bin after a last coefficient position of image data is processed as a bypass encoding bin, the image processing device may include an encoding unit that skips (omits) encoding of the last coefficient position included in the image data. Furthermore, for example, in the image processing method, in the case of the high-throughput mode in which the context encoding bin after the last coefficient position of the image data is processed as a bypass encoding bin, the encoding of the last coefficient position included in the image data may be skipped (omitted).

For example, in the case of the high-throughput mode in which a context encoding bin after a last coefficient position of image data is processed as a bypass encoding bin, the image processing device may include a decoding unit that skips (omits) decoding of the last coefficient position. Furthermore, for example, in the image processing method, in the case of the high-throughput mode in which the context encoding bin after the last coefficient position of the image data is processed as a bypass encoding bin, decoding of the last coefficient position may be skipped (omitted).

FIG. 21 is a diagram illustrating an example of a pseudo code illustrating an outline of encoding (decoding) in a case where the present technology is applied in this case. In the example of FIG. 21, as illustrated in "For last significant coefficient position", in a case where sps_high_throughput_flag is true (not 0), the encoding or decoding of last_sig_coeff_{x, y}_prefix and last_sig_coeff_{x, y} suffix is skipped (omitted).

Figure 22:
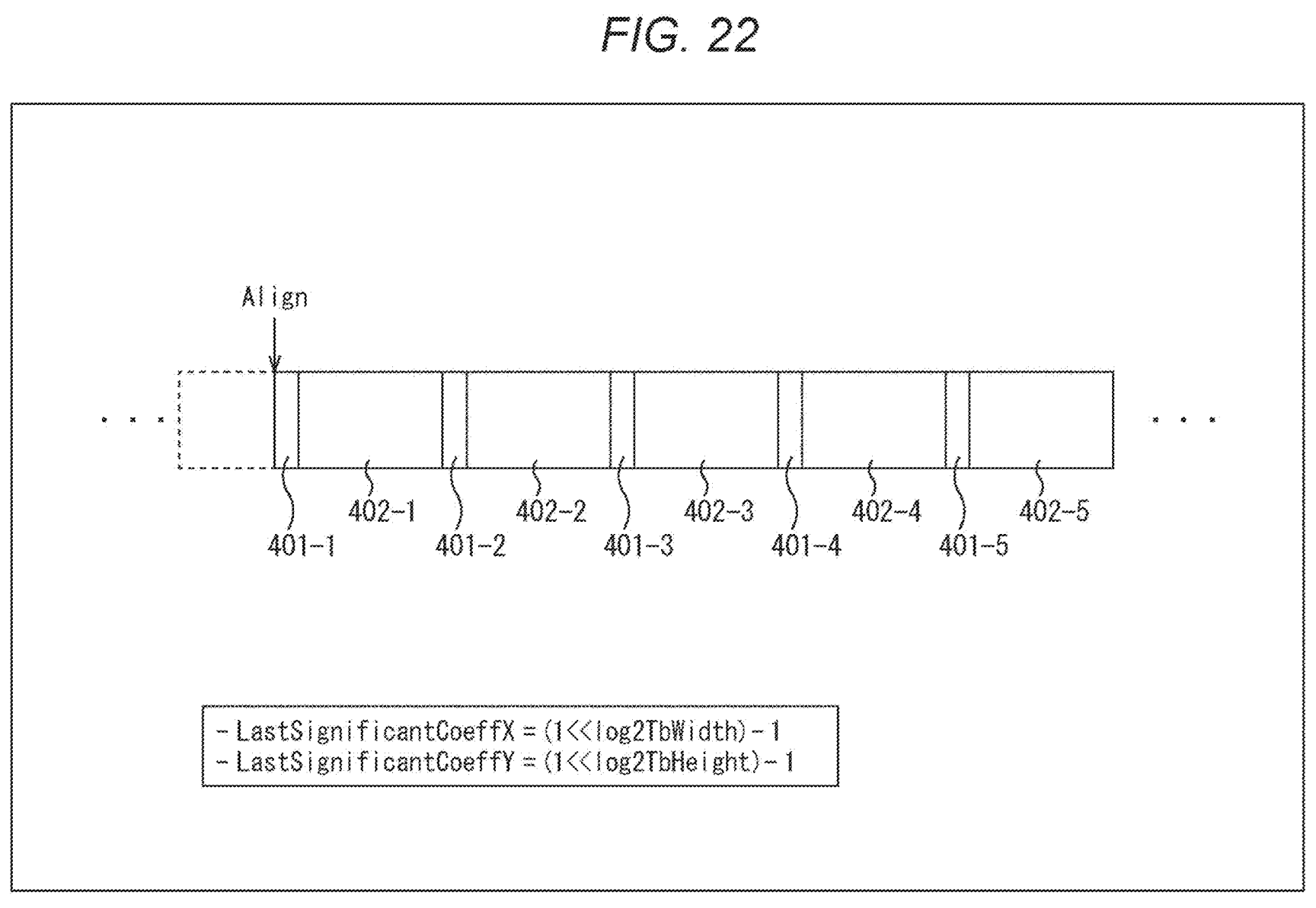

By encoding in this manner, as illustrated in FIG. 22, the bit stream does not include the encoding bin corresponding to the last coefficient position. FIG. 23 illustrates an example of syntax regarding RRC in this case. In the syntax of FIG. 23, as indicated by the gray line, last_sig_coeff_{x, y}_prefix and last_sig_coeff_{x, y}_suffix are transmitted only in a case where sps_high_throughput_flag is false. In other words, in a case where sps_high_throughput_flag is true (not 0), last_sig_coeff_{x, y}_prefix and last_sig_coeff_{x, y}_suffix are not transmitted.

FIG. 24 illustrates an example of semantics in this case. As illustrated in FIG. 24, in a case where last_sig_coeff_{x, y}_prefix and last_sig_coeff_{x, y}_suffix are not transmitted, these values are estimated to be 0.

As described with reference to FIG. 3 and the like, in the method described in Non-Patent Document 3, even in a case where the CABAC high-throughput mode is applied, the prefix portion and the suffix portion (for example, last_sig_coeff_x_prefix 11 to last_sig_coeff_y_suffix 14) of the last coefficient position are encoded and decoded. On the other hand, in Method #1, in a case where the CABAC high-throughput mode is applied, the encoding or decoding of the last coefficient position is skipped, so that these encoding bins do not occur. Therefore, the generation amount of context encoding bins can be reduced, and an increase in the processing amount of encoding and decoding can be suppressed. For example, a processing amount of CABAC in encoding with a high bit depth and a high bit rate can be reduced, and throughput can be improved.

Note that, in this case as well, since encoding and decoding of coefficients and the like for each sub-block are performed, an encoding bin (sb_coded_flag 401-1, Coefficient bits 402-1, sb_coded_flag 401-2, Coefficient bits 402-2, sb_coded_flag 401-3, Coefficient bits 402-3, sb_coded_flag 401-4, Coefficient bits 402-4, sb_coded_flag 401-5, and Coefficient bits 402-5) for each sub-block is formed in the bit stream of the example in FIG. 22. In a case where it is not necessary to distinguish and describe sb_coded_flag 401-1 to sb_coded_flag 401-5 from each other, they are also referred to as sb_coded_flag 401. Furthermore, in a case where it is not necessary to distinguish the Coefficient bits 402-1 to the Coefficient bits 402-5 from each other for explanation, they are also referred to as Coefficient bits 402.

sb_coded_flag 105 is a sub-block coefficient flag and is flag information indicating whether or not all coefficients in the sub-block are 0. Therefore, sb_coded_flag 105 is set for each sub-block. Coefficient bits 106 are encoding bins of coefficients per sub-block. That is, the coefficient is encoded and decoded for each sub-block (transform block).

Similarly to the case of the method described in Non-Patent Document 3, in the case of the CABAC high-throughput mode, a context encoding bin after the last coefficient position is encoded and decoded as a bypass encoding bin. That is, as illustrated in "For each coefficient group" in FIG. 21, in a case where the CABAC high-throughput mode is applied, each sub-block is bypass encoded and bypass decoded. That is, in FIG. 22, sb_coded_flag 401 and Coefficient bits 402 are configured by bypass encoding bins. As described above, in the case of the CABAC high throughput, by skipping the encoding or decoding of last_sig_coeff_{x, y}_{prefix, suffix}, the entire coefficient encoding of RRC can be processed in the bypass encoding bin. The bypass encoding bin is lighter in throughput than the context encoding bin. Therefore, by replacing the context encoding bin with the bypass encoding bin in this manner, the processing amount of CABAC can be reduced as compared with the case of encoding and decoding the context encoding bin as it is.

Note that encoding or decoding of sb_coded_flag 401-1 may be skipped (omitted). In a case where encoding or decoding of the sb_coded_flag 401-1 is skipped, the value thereof is estimated to be 1. Furthermore, in the case of encoding or decoding the sb_coded_flag 401-1, it is determined whether or not there is actually a significant coefficient for the coefficient group that should have included the last coefficient position, and in a case where there is no significant coefficient, decoding of the coefficient group may be skipped.

Method #2-1

For example, in a case where above-described Method #2 is applied, as illustrated in the second row from the top of the table illustrated in FIG. 20, the last coefficient position may be set to the lower right coordinate in the transform block (Method #2-1).

For example, in the image processing device, the encoding unit may set the last coefficient position to the lower right coordinate in the transform block. Furthermore, in the image processing device, the decoding unit may set the last coefficient position to the lower right coordinate in the transform block.

For example, as illustrated in the semantics of FIG. 24, in the case of the CABAC high-throughput mode, the last coefficient position (LastSignificantCoeffX) in the X direction and the last coefficient position (LastSignificantCoeffY) in the Y direction may be set as in the following Formulas (2) and (3), respectively.

$$LastSignificantCoeffX = (1 << \log 2 TbWidth) - 1 \quad (2)$$

$$LastSignificantCoeffY = (1 << \log 2 TbHeight) - 1 \quad (3)$$

For a high-bit-rate encoding target, the last coefficient position is concentrated in the lower right of the transform block. Therefore, by assuming that the last coefficient position is at the lower right of the transform block, the number of bins required for encoding the last coefficient can be reduced while suppressing the influence on the encoding efficiency. In other words, by fixing the last coefficient position to the lower right of the transform block, encoding and decoding of the last coefficient position can be skipped.

Method #2-2

For example, in a case where above-described Method #2 is applied, as illustrated in the third row from the top of the table illustrated in FIG. 20, in the case of the non-CABAC high-throughput mode, encoding or decoding of the last coefficient position may be performed (Method #2-2).

For example, in the image processing device, in the case of not being in the high-throughput mode, the encoding unit may encode the prefix portion and the suffix portion of the last coefficient position. Furthermore, in the image processing device, in the case of not being in the high-throughput mode, the decoding unit may decode the prefix portion and the suffix portion of the last coefficient position.

In the syntax of FIG. 23, as indicated by the gray line, last_sig_coeff_{x, y}_prefix and last_sig_coeff_{x, y}_suffix are transmitted only in a case where sps_high_t-hroughput_flag is false. In other words, in the case of not being in the high-throughput mode, the prefix portion and the suffix portion of the last coefficient position are encoded and decoded. By doing so, the encoding or decoding of the last coefficient position can be skipped only in the case of the high-throughput mode.

Method #2-2-1

For example, in a case where above-described Method #2-2 is applied, as illustrated in the fourth row from the top of the table illustrated in FIG. 20, the prefix portion at the last coefficient position (in the case of the non-CABAC high-throughput mode) may be subjected to context encoding or context decoding, and the suffix portion at the last coefficient position may be subjected to bypass encoding or bypass decoding (Method #2-2-1).

For example, in an image processing device, an encoding unit may encode a prefix portion of a last coefficient position as a context encoding bin and encode a suffix portion of the last coefficient position as a bypass encoding bin. Furthermore, in the image processing device, the decoding unit may decode the prefix portion of the last coefficient position as a context encoding bin and decode the suffix portion of the last coefficient position as a bypass encoding bin.

As illustrated in the pseudo code in FIG. 21, in the case of the non-CABAC high-throughput mode (sps_high_t-hroughput_flag==0), the prefix portion of the last coefficient position is encoded or decoded as a context encoding bin (context_coding of last_sig_coeff_{x, y}_prefix), and the suffix portion of the last coefficient position is encoded or decoded as a bypass encoding bin (bypass_coding of last_sig_coeff_{x, y}_suffix).

As described above, by encoding and decoding the suffix portion of the last coefficient position as a bypass encoding bin, the processing amount of CABAC can be reduced as compared with the case of encoding and decoding the context encoding bin as it is.

Method #2-3

For example, in a case where above-described Method #2 is applied, as illustrated in the fifth row from the top of the table illustrated in FIG. 20, in the case of the CABAC high-throughput mode, the CABAC bypass alignment processing may be performed immediately before the encoding or decoding of the first sub-block coefficient flag (Method #2-3).

For example, in the image processing device, in the case of the high-throughput mode, the encoding unit may perform the alignment processing of the encoding process immediately before the encoding of the first sub-block coefficient flag included in the image data. Furthermore, in the image processing device, in the case of the high-throughput mode, the decoding unit may perform alignment processing of the decoding process immediately before decoding of the first sub-block coefficient flag included in the coded data.

In the example of FIG. 21, at "For remBinsPass1 and alignment" before "For each coefficient group", in a case where sps_high_throughput_flag is true (not 0), a CABAC bypass alignment is performed (CABAC bypass alignment). That is, in the case of the CABAC high-throughput mode, as illustrated in FIG. 22, the CABAC bypass alignment processing is performed (Align) immediately before the processing of the sb_coded_flag 401-1. CABAC bypass alignment is processing of adjusting the CABAC process. By performing this processing, a plurality of bypass encoding bins can be easily processed in parallel. That is, by performing the CABAC bypass alignment processing immediately before the encoding or decoding of the first sub-block coefficient flag, the bypass encoding bins corresponding to the coefficients and the like for each sub-block can be easily processed in parallel. Note that, as described above, in the case of the CABAC high-throughput mode, the encoding or decoding of the last coefficient position is omitted, so that substantially all bypass encoding bins can be easily processed in parallel by this CABAC bypass alignment. Therefore, an increase in the processing amount of encoding and decoding can be suppressed.

Note that, also in this case, the present technology can be applied to encoding or decoding other than CABAC. Therefore, the CABAC bypass alignment in this case is also not limited to CABAC. That is, this processing may be simply processing (alignment processing) of adjusting the encoding process (or decoding process).

Method #2-3-1

For example, in a case where above-described Method #2-3 is applied, as illustrated in the sixth row from the top of the table illustrated in FIG. 20, in the CABAC bypass alignment processing, the parameter iVlCurrRange indicating the range in the arithmetic encoding may be set to 256 (Method #2-3-1).

For example, in the image processing device, the encoding unit may set the variable iVlCurrRange indicating the range in the arithmetic encoding to 256 in the alignment processing. Furthermore, in the image processing device, the decoding unit may set the variable iVlCurrRange indicating the range in the arithmetic encoding to 256 in the alignment processing.

Since the encoding or decoding of the last coefficient position is omitted in the case of the CABAC high-throughput mode as described above, this setting is performed immediately before the encoding or decoding of the first sub-block coefficient flag, so that the bypass encoding bins of the entire coefficient encoding can be easily processed in parallel. Therefore, an increase in the processing amount of encoding and decoding can be suppressed.

Method #2-3-2

For example, in a case where above-described Method #2-3 is applied, as illustrated in the seventh row from the top of the table illustrated in FIG. 20, when the CABAC bypass alignment processing is performed, the generation amount of the context encoding bin number may be further set to 0 (Method #2-3-2).

For example, in the image processing device, the encoding unit may further set the generation amount of the number of context encoding bins to 0 immediately before encoding of the first sub-block coefficient flag. Furthermore, in the image processing device, the decoding unit may further set the generation amount of the number of context encoding bins to 0 immediately before decoding of the first sub-block coefficient flag.

In the example of FIG. 21, in a case where sps_high_throughput_flag is true (not 0) in "For remBinsPass1 and alignment", the parameter remCcbs (remBinPass1 in FIG. 21) is set to 0 (remBinPass1=0). That is, in the case of the CABAC high-throughput mode, the parameter remCcbs indicating the generation amount of the number of context encoding bins is set to 0. That is, bypass encoding is selected.

Since the encoding or decoding of the last coefficient position is omitted in the case of the CABAC high-throughput mode as described above, this setting is performed immediately before the encoding or decoding of the first sub-block coefficient flag, so that the bypass encoding bin of the entire coefficient encoding can be processed as a bypass encoding bin. Therefore, the generation amount of context encoding bins can be reduced, and an increase in the processing amount of encoding and decoding can be suppressed.

Method #2-3-3

For example, in a case where above-described Method #2-3 is applied, as illustrated in the bottom row of the table illustrated in FIG. 20, in the case of the non-CABAC high-throughput mode, the generation amount of the context encoding bin number may be derived on the basis of the reference value of the context encoding bin number and the transform block size (Method #2-3-3).

For example, in the image processing device, in the case of not being in the high-throughput mode, the encoding unit may derive the generation amount of the number of context encoding bins on the basis of the reference value of the number of context encoding bins and the transform block size immediately before encoding of the first sub-block coefficient flag. Furthermore, in the image processing device, in the case of not being in the high-throughput mode, the decoding unit may derive the generation amount of the number of context encoding bins on the basis of the reference value of the number of context encoding bins and the transform block size immediately before decoding of the first sub-block coefficient flag.

In the example of FIG. 21, in "For remBinsPass1 and alignment", in a case where sps_high_throughput_flag is false (sps_high_throughput_flag==0), CABAC bypass alignment is not executed. Furthermore, a parameter remCcbs (remBinPass1 in FIG. 21) is derived on the basis of the parameter ctxBinSampleRatioBase, the parameter TbWidth, and the parameter TbHeight (remBinsPass1= ((1<<(log 2TbWidth+log 2TbHeight))*7)>>2). In the example of FIG. 21, the parameter ctxBinSampleRatioBase is set to 7. That is, the parameter remCcbs is derived by the above-described Formula (1).

In this way, in the case of not being in the high-throughput mode, the prefix portion of the last coefficient position can be processed as a context encoding bin.

<Encoding Device>

Also in this case, the present technology can be applied to the encoding device 200 (FIG. 12). In this case, the Non-TS residual encoding unit 213 may encode (RRC) the quantization coefficient by applying any of the methods described above with reference to FIG. 20 and the like.

<Non-TS Residual Encoding Unit>

Figure 25:
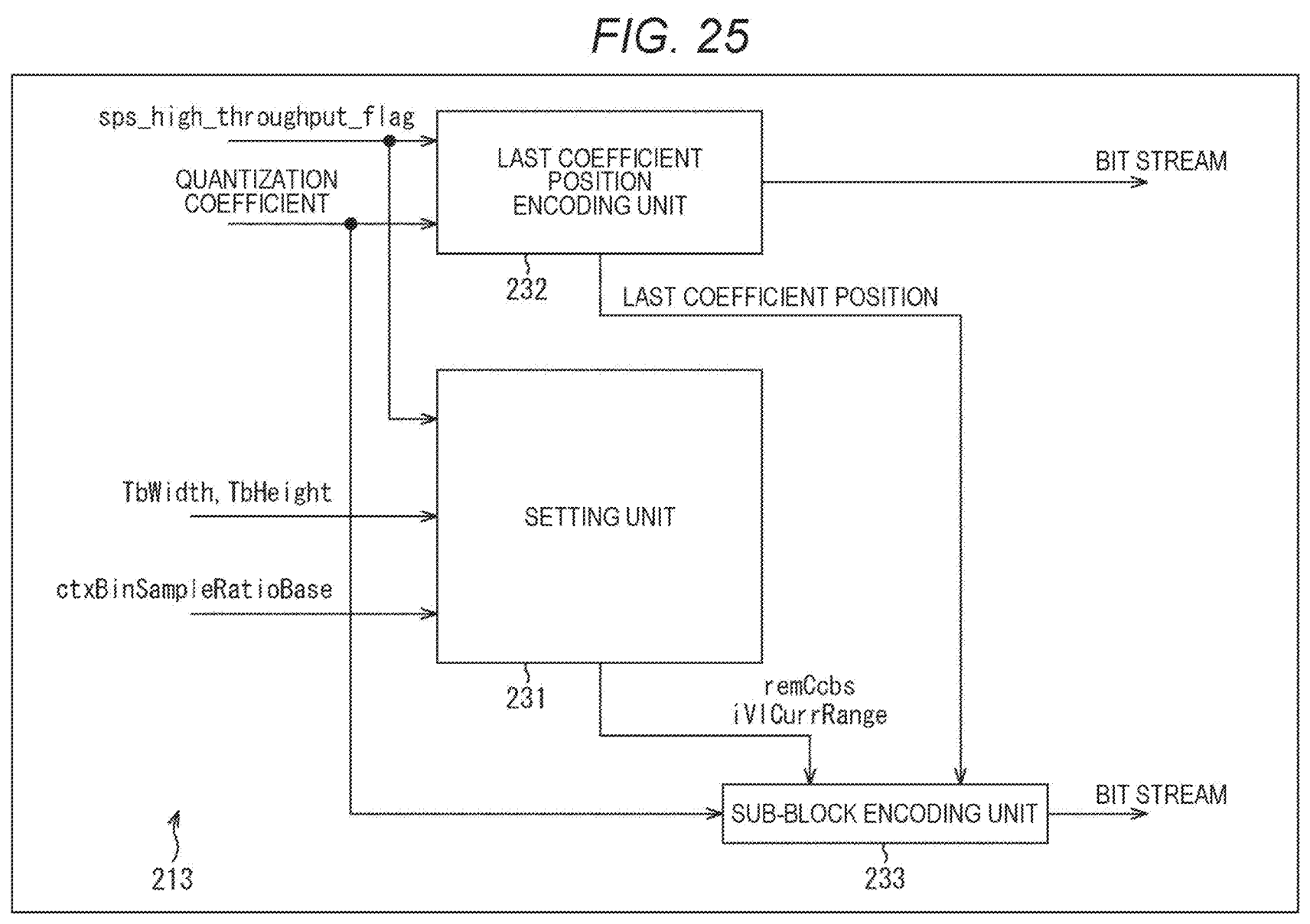

FIG. 25 is a block diagram illustrating a main configuration example of the Non-TS residual encoding unit 213 in this case. Note that while FIG. 25 illustrates main elements such as processing units and data flows, those depicted in FIG. 25 do not necessarily include all elements. That is, the Non-TS residual encoding unit 213 may include a processor not illustrated as a block in FIG. 25. Furthermore, the Non-TS residual encoding unit 213 may have processing or a data flow that is not illustrated as an arrow or the like in FIG. 25.

As illustrated in FIG. 25, also in this case, the Non-TS residual encoding unit 213 includes the setting unit 231, the last coefficient position encoding unit 232, and the sub-block encoding unit 233.

The setting unit 231 performs processing related to parameter setting. For example, the setting unit 231 may acquire the reference value (ctxBinSampleRatioBase) of the number of context encoding bins. Furthermore, the setting unit 231 may acquire the transform block size (TbWidth and TbHeight). Furthermore, the setting unit 231 may acquire flag information (sps_high_throughput_flag) indicating whether or not the CABAC high-throughput mode is applied.

For example, in a case where sps_high_throughput_flag is true, the setting unit 231 may apply Method #2-3 described above, and perform CABAC bypass alignment processing immediately before encoding of the first sub-block coefficient flag. In this case, for example, the setting unit 231 may apply Method #2-3-1 described above and set the parameter iVlCurrRange to 256 in the CABAC bypass alignment processing. Furthermore, the setting unit 231 may apply Method #2-3-2 described above, and further set the generation amount (remCcbs) of the number of context encoding bins to 0.

Furthermore, in a case where sps_high_throughput_flag is false, the setting unit 231 may apply Method #2-3-3 described above, and derive the generation amount (remCcbs) of the number of context encoding bins on the basis of the reference value of the number of context encoding bins (ctxBinSampleRatioBase) and the transform block size (TbWidth, TbHeight). For example, the setting unit 231 may derive remCcbs using the above-described Formula (1).

For example, the setting unit 231 may supply the value remCcbs to which the value is set to the last coefficient position encoding unit 232. Furthermore, in a case where the CABAC bypass alignment processing is performed, the setting unit 231 may supply the set iVlCurrRange to the last coefficient position encoding unit 232.

The last coefficient position encoding unit 232 performs processing related to encoding of the last coefficient position. For example, the last coefficient position encoding unit 232 may obtain sps_high_throughput_flag. Furthermore, the last coefficient position encoding unit 232 may obtain the quantization coefficient.

For example, the last coefficient position encoding unit 232 may set a prefix portion (last_sig_coeff_{x, y}_prefix) and a suffix portion (last_sig_coeff_{x, y}_suffix) of the last coefficient position on the basis of the last coefficient positions (LastSignificantCoef {X, Y}) in the X direction and the Y direction. For example, in the case of the CABAC high-throughput mode, the last coefficient position encoding unit 232 may set the prefix portion (last_sig_coeff_{x, y}_prefix) and the suffix portion (last_sig_coeff_{x, y}_suffix) of the last coefficient position to 0.

Furthermore, the last coefficient position encoding unit 232 may apply Method #2 described above, and may skip (omit) encoding of the last coefficient position in a case where sps_high_throughput_flag is true. Furthermore, the last coefficient position encoding unit 232 may apply Method #2-1 described above, and set the last coefficient position to the lower right coordinate in the transform block. Furthermore, the last coefficient position encoding unit 232 may apply Method #2-2 described above, and encode the last coefficient position in a case where sps_high_throughput_flag is false. In the encoding, the last coefficient position encoding unit 232 may apply Method #2-2-1 described above, context encode the prefix portion of the last coefficient position, and bypass encode the suffix portion of the last coefficient position.

For example, in the case of encoding the last coefficient position, the last coefficient position encoding unit 232 may output the encoding bin corresponding to the prefix portion and the encoding bin corresponding to the suffix portion of the generated last coefficient position to the outside of the encoding device 200 as a bit stream. Furthermore, the last coefficient position encoding unit 232 may supply remCcbs to the sub-block encoding unit 233. Furthermore, the last coefficient position encoding unit 232 may supply the last coefficient position (LastSignificantCoef {X, Y}) to the sub-block encoding unit 233.

The sub-block encoding unit 233 performs processing related to encoding of coefficients and the like for each sub-block. For example, the sub-block encoding unit 233 may obtain the quantization coefficient. Furthermore, the sub-block encoding unit 233 may acquire remCcbs supplied from the setting unit 231. Furthermore, the sub-block encoding unit 233 may acquire iVlCurrRange supplied from the setting unit 231. Furthermore, the sub-block encoding unit 233 may obtain the last coefficient position (LastSignificantCoef {X, Y}) supplied from the last coefficient position encoding unit 232.

For example, the sub-block encoding unit 233 may encode the sub-block coefficient flag (sb_coded_flag) and the quantization coefficient for each sub-block using the information supplied from the setting unit 231 or the last coefficient position encoding unit 232. For example, the sub-block encoding unit 233 may encode a sub-block coefficient flag (sb_coded_flag) or a quantization coefficient as a bypass encoding bin.

For example, the sub-block encoding unit 233 may output a bypass encoding bin group (sub-block coefficient flag (sb_coded_flag) and bypass encoding bin of quantization coefficient) for each sub-block generated by such encoding to the outside of the encoding device 200 as a bit stream.

With such a configuration, the encoding device 200 can apply each of the methods described above in <4. Skipping encoding or decoding of last coefficient position>. That is, the encoding device 200 can obtain an effect similar to the effect of each method described above in <4. Skipping encoding or decoding of last coefficient position>. Therefore, the encoding device 200 can reduce the generation amount of context encoding bins and suppress an increase in the processing amount of encoding and decoding. For example, the encoding device 200 can reduce a processing amount of CABAC in encoding with a high bit depth and a high bit rate, and improve throughput.

<Flow of Encoding Processing>

Figure 14:
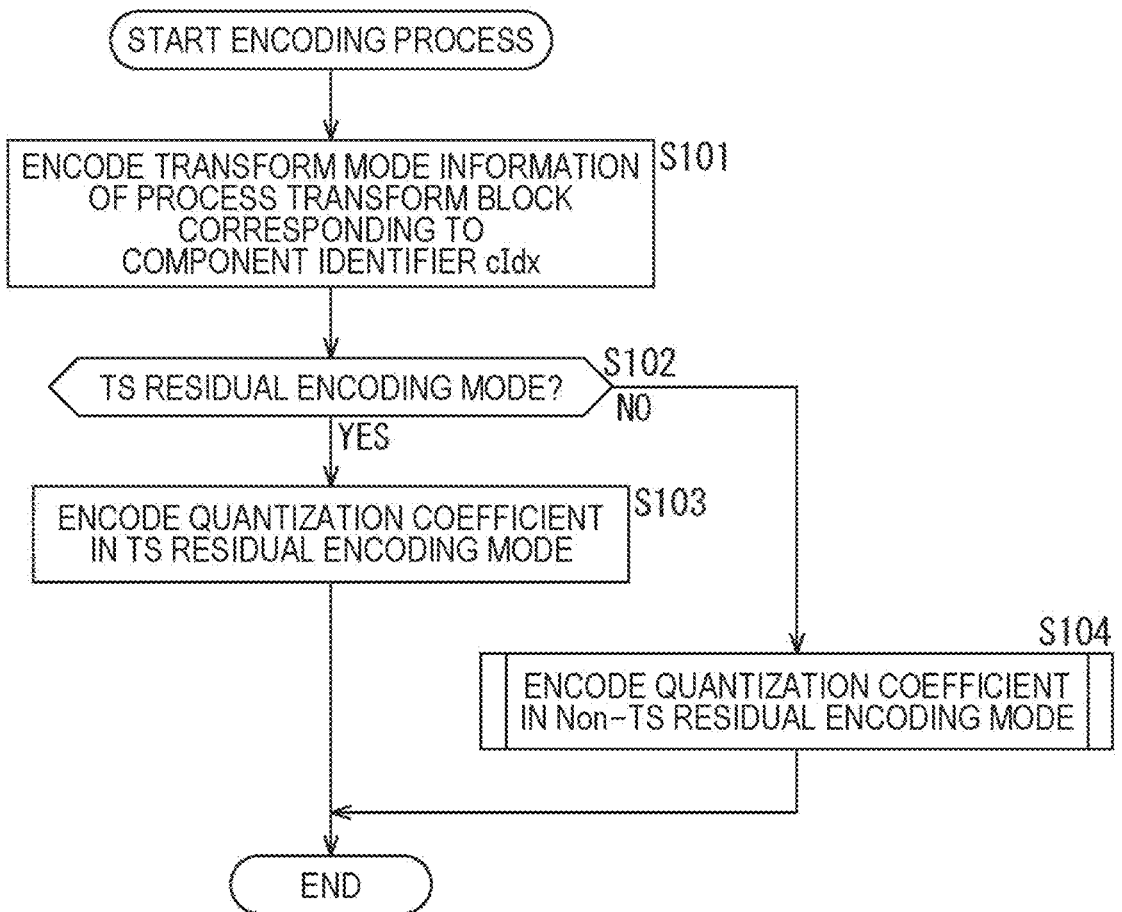
FIG. 14 is a flowchart illustrating an example of a flow of encoding processing.
Figure 15:
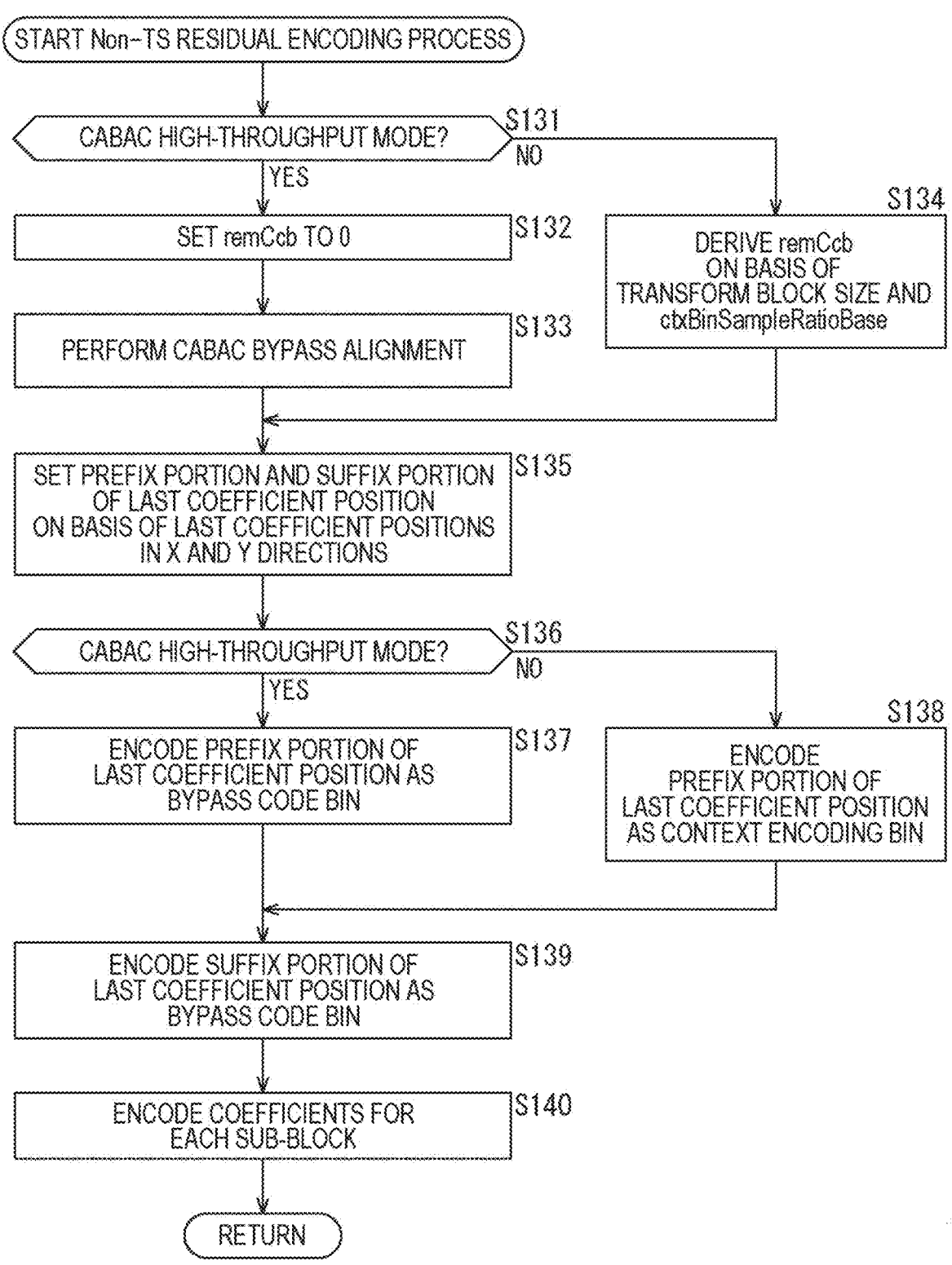
FIG. 15 is a flowchart illustrating an example of a flow of Non-TS residual encoding processing.

Also in this case, the encoding processing executed by the encoding device 200 is executed in a flow similar to the case with reference to the flowchart in FIG. 14.

<Flow of Non-TS Residual Encoding Process>

Figure 26:
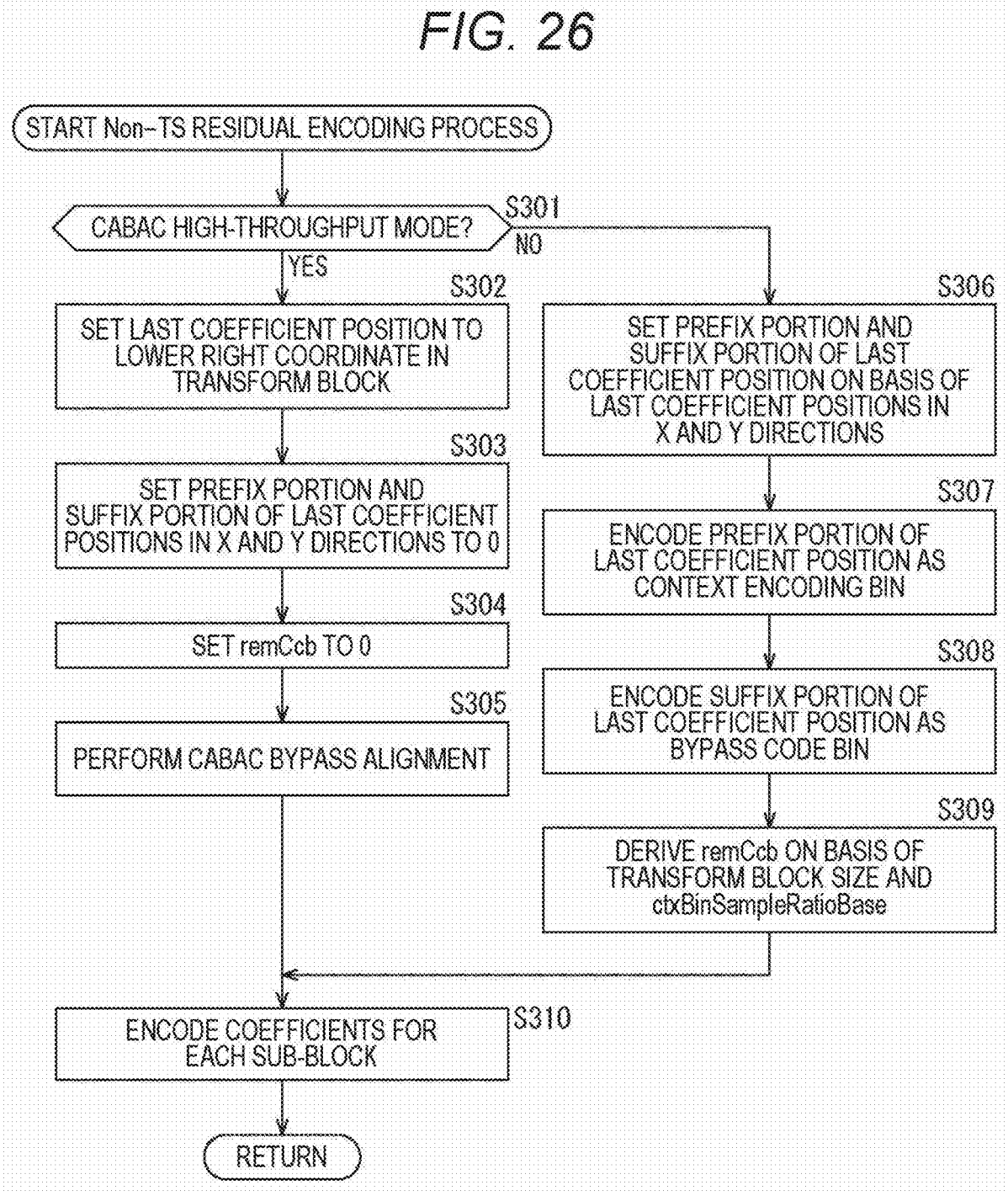
FIG. 26 is a flowchart illustrating an example of a flow of Non-TS residual encoding processing.

Next, an example of a flow of the Non-TS residual encoding process in this case (processing executed in step S104 (FIG. 14) of the encoding process in this case) will be described with reference to a flowchart in FIG. 26.

When the Non-TS residual encoding process is started, in step S301, the setting unit 231 of the Non-TS residual encoding unit 213 determines whether or not the mode is the CABAC high-throughput mode.

In a case where sps_high_throughput_flag is determined to be true (that is, the mode is the CABAC high-throughput mode), the process proceeds to step S302. In step S302, the last coefficient position encoding unit 232 applies Method #2-1 described above, and sets the last coefficient position to the lower right coordinate in the transform block.

In step S303, the last coefficient position encoding unit 232 applies Method #2 described above, and skips (omits) encoding of the last coefficient position. Furthermore, the last coefficient position encoding unit 232 sets each of the prefix portion (last_sig_coeff_{x, y}_prefix) and the suffix portion (last_sig_coeff_{x, y}_suffix) of the last coefficient position to 0.

In step S304, the setting unit 231 applies Method #2-3-2 described above, and sets the generation amount (remCcbs) of the number of context encoding bins to 0. As a result, bypass encoding is selected in subsequent encoding.

In step S305, the setting unit 231 applies Method #2-3 described above and performs CABAC bypass alignment. At that time, the setting unit 231 may apply Method #2-3-1 described above and set the parameter iVlCurrRange to 256. This simplifies the encoding of the bypass encoding bins and further allows multiple bypass encoding bins to be processed in parallel. When the processing of step S305 ends, the process proceeds to step S310.

Furthermore, in a case where sps_high_throughput_flag is determined to be false (that is, the mode is the non-CABAC high-throughput mode) in step S301, the process proceeds to step S306. In step S306, the last coefficient position encoding unit 232 sets a prefix portion (last_sig_coeff_{x, y}_prefix) and a suffix portion (last_sig_coeff_{x, y}_suffix) of the last coefficient position on the basis of the last coefficient positions (LastSignificantCoef {X, Y}) in the X direction and the Y direction.

In steps S307 and S308, the last coefficient position encoding unit 232 applies Method #2-2 described above, and encodes the prefix portion and the suffix portion of the last coefficient position. For example, applying Method #2-2-1 described above, the last coefficient position encoding unit 232 encodes the prefix portion (last_sig_coeff_{x, y}_prefix) of the last coefficient position as a context encoding bin in step S307, and encodes the suffix portion (last_sig_coeff_{x, y}_suffix) of the last coefficient position as a bypass code bin in step S308.

In step S309, the setting unit 231 applies Method #2-3-3 described above, and derives the generation amount (remCcbs) of the number of context encoding bins on the basis of the reference value (ctxBinSampleRatioBase) of the number of context encoding bins and the transform block size (TbWidth, TbHeight). When the processing of step S309 ends, the process proceeds to step S310.

In step S310, the sub-block encoding unit 233 encodes coefficients and the like for each sub-block. When the processing of step S310 ends, the Non-TS residual encoding process ends, and the process returns to FIG. 14.

By executing each processing as described above, the encoding device 200 can apply each method described above in <4. Skipping encoding or decoding of last coefficient position>. That is, the encoding device 200 can obtain an effect similar to the effect of each method described above in <4. Skipping encoding or decoding of last coefficient position>. Therefore, the encoding device 200 can reduce the generation amount of context encoding bins and suppress an increase in the processing amount of encoding and decoding. For example, the encoding device 200 can reduce a processing amount of CABAC in encoding with a high bit depth and a high bit rate, and improve throughput.

<Decoding Device>

Also in this case, the present technology can be applied to the decoding device 300 (FIG. 16). In this case, the Non-TS residual decoding unit 313 may decode (RRC) the bit stream by applying any of the methods described above with reference to FIG. 20 and the like.

<Non-TS Residual Decoding Unit>

Figure 27:
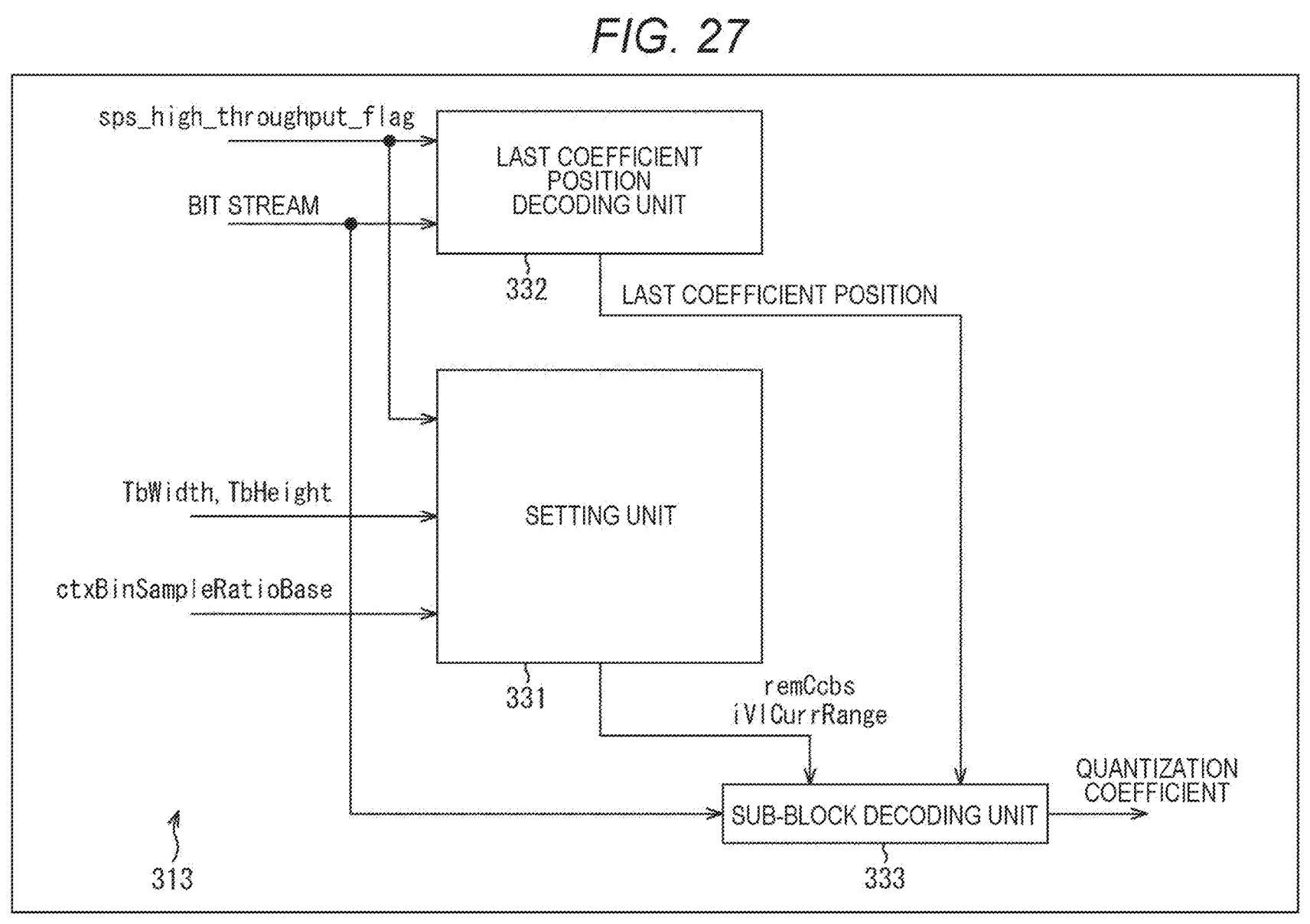

FIG. 27 is a block diagram illustrating a main configuration example of the Non-TS residual decoding unit 313 in this case. Note that while FIG. 27 illustrates main elements such as processing units and data flows, those depicted in FIG. 27 do not necessarily include all elements. That is, the Non-TS residual decoding unit 313 may include a processor not illustrated as a block in FIG. 27. Furthermore, the Non-TS residual decoding unit 313 may have a process or a data flow that is not illustrated as an arrow or the like in FIG. 27.

As illustrated in FIG. 27, also in this case, the Non-TS residual decoding unit 313 includes the setting unit 331, the last coefficient position decoding unit 332, and the sub-block decoding unit 333.

The setting unit 331 performs processing related to parameter setting. For example, the setting unit 331 may acquire ctxBinSampleRatioBase. Furthermore, the setting unit 331 may acquire TbWidth and TbHeight. Furthermore, the setting unit 331 may acquire sps_high_throughput_flag.

For example, in a case where sps_high_throughput_flag is true, the setting unit 331 may apply Method #2-3 described above, and perform CABAC bypass alignment processing immediately before decoding of the first sub-block coefficient flag. In this case, for example, the setting unit 331 may apply Method #2-3-1 described above and set the parameter iVlCurrRange to 256 in the CABAC bypass alignment processing. Furthermore, the setting unit 331 may apply Method #2-3-2 described above, and further set the generation amount (remCcbs) of the number of context encoding bins to 0.

Furthermore, in a case where sps_high_throughput_flag is false, the setting unit 331 may apply Method #2-3-3 described above, and derive the generation amount (remCcbs) of the number of context encoding bins on the basis of the reference value of the number of context encoding bins (ctxBinSampleRatioBase) and the transform block size (TbWidth, TbHeight). For example, the setting unit 331 may derive remCcbs using the above-described Formula (1).

For example, the setting unit 331 may supply the remCcbs to which the value is set to the sub-block decoding unit 333. Furthermore, in a case where the CABAC bypass alignment processing is performed, the setting unit 331 may supply the set iVlCurrRange to the sub-block decoding unit 333.

The last coefficient position decoding unit 332 performs processing related to decoding of the last coefficient position. For example, the last coefficient position decoding unit 332 may acquire sps_high_throughput_flag. Furthermore, last coefficient position decoding unit 332 may obtain the bit stream.

For example, the last coefficient position decoding unit 332 may apply Method #2 described above, and skip decoding of the last coefficient position in a case where sps_high_throughput_flag is true. Then, last coefficient position decoding unit 332 may apply above-described Method #2-1 to set the last coefficient position to the lower right coordinate in the transform block. Furthermore, the last coefficient position decoding unit 332 may apply Method #2-2 described above, and decode the last coefficient position (the encoding bin corresponding to the prefix portion and the encoding bin corresponding to the suffix portion of) included in the bit stream in a case where sps_high_throughput_flag is false. For example, the last coefficient position decoding unit 332 may apply Method #2-2-1 described above, perform context decoding on a prefix portion (last_sig_coeff_{x, y}_prefix) of the last coefficient position included in the bit stream, and perform bypass decoding on a suffix portion (last_sig_coeff_{x, y}_suffix) of the last coefficient position.

Furthermore, in a case where sps_high_throughput_flag is false, the last coefficient position decoding unit 332 may set the last coefficient positions (LastSignificantCoef {X, Y}) in the X direction and the Y direction on the basis of the prefix portion (last_sig_coeff_{x, y}_prefix) and the suffix portion (last_sig_coeff_{x, y}_suffix) of the last coefficient position obtained by decoding the bit stream.

For example, the last coefficient position decoding unit 332 may supply the last coefficient position (LastSignificantCoef {X, Y}) to the sub-block decoding unit 333.

The sub-block decoding unit 333 performs processing related to decoding of coefficients and the like for each sub-block. For example, the sub-block decoding unit 333 may obtain a bit stream. Furthermore, the sub-block decoding unit 333 may acquire remCcbs supplied from the setting unit 331. Furthermore, the sub-block decoding unit 333 may acquire iVlCurrRange supplied from the setting unit 331. Furthermore, the sub-block decoding unit 333 may obtain the last coefficient position (LastSignificantCoef {X, Y}) supplied from the last coefficient position decoding unit 332.

For example, the sub-block decoding unit 333 may decode the bit stream using the information supplied from the setting unit 331 and the last coefficient position decoding unit 332, and generate (restore) the sub-block coefficient flag (sb_coded_flag) and the quantization coefficient for each sub-block. For example, the sub-block decoding unit 333 may decode a sub-block coefficient flag (sb_coded_flag) and a quantization coefficient included in the bit stream as a bypass encoding bin.

For example, the sub-block decoding unit 333 may output the quantization coefficient for each sub-block generated (restored) by such decoding to the outside of the decoding device 300.

With such a configuration, the decoding device 300 can apply each method described above in <4. Skipping encoding or decoding of last coefficient position>. That is, the decoding device 300 can obtain an effect similar to the effect of each method described above in <4. Skipping encoding or decoding of last coefficient position>. Therefore, the decoding device 300 can reduce the generation amount of context encoding bins and suppress an increase in the processing amount of encoding and decoding. For example, the decoding device 300 can reduce the processing amount of CABAC in decoding at a high bit depth and a high bit rate, and improve the throughput.

<Flow of Decoding Process>

Figure 18:
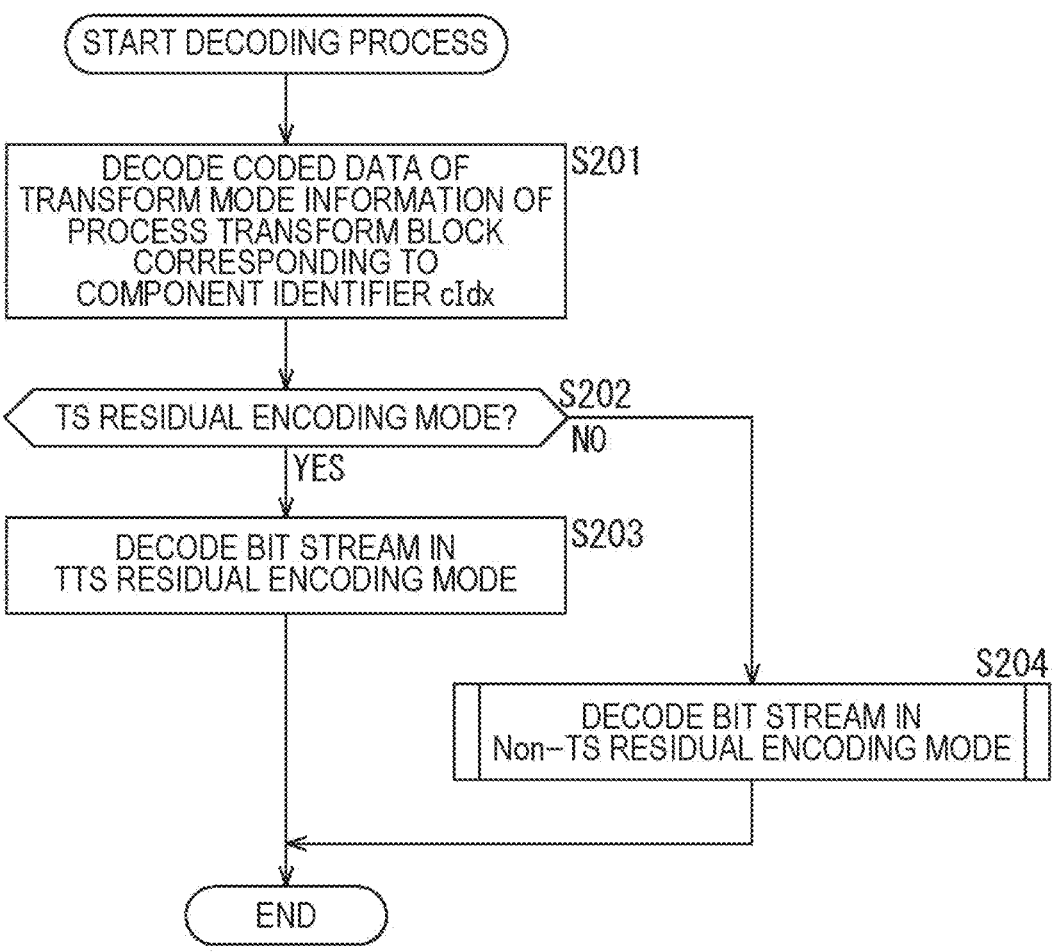
FIG. 18 is a flowchart illustrating an example of a flow of decoding processing.
Figure 19:
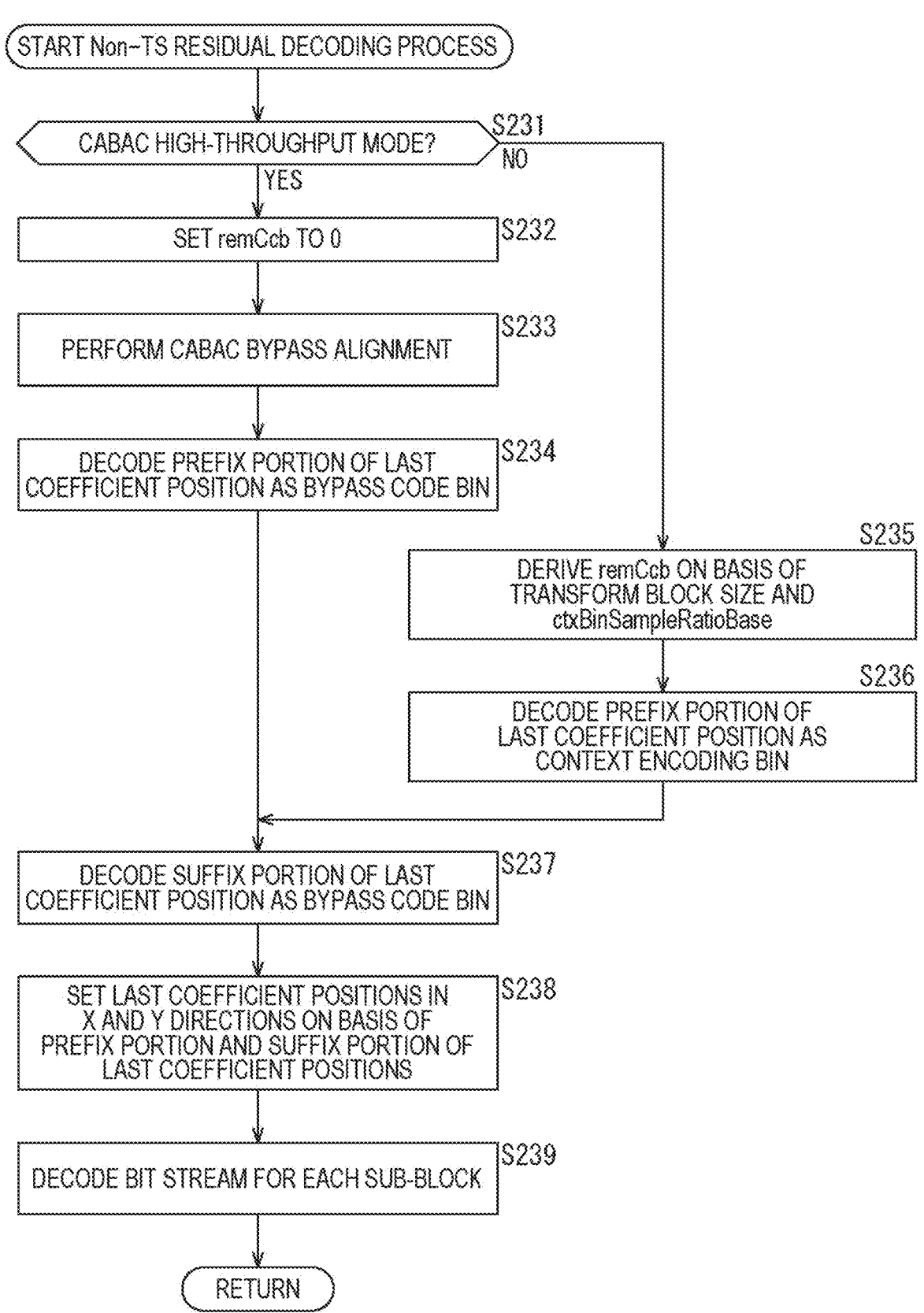
FIG. 19 is a flowchart illustrating an example of a flow of Non-TS residual decoding processing.

Also in this case, the decoding process executed by the decoding device 300 is executed in a flow similar to the case with reference to the flowchart in FIG. 18.

<Flow of Non-TS Residual Decoding Process>

Figure 28:
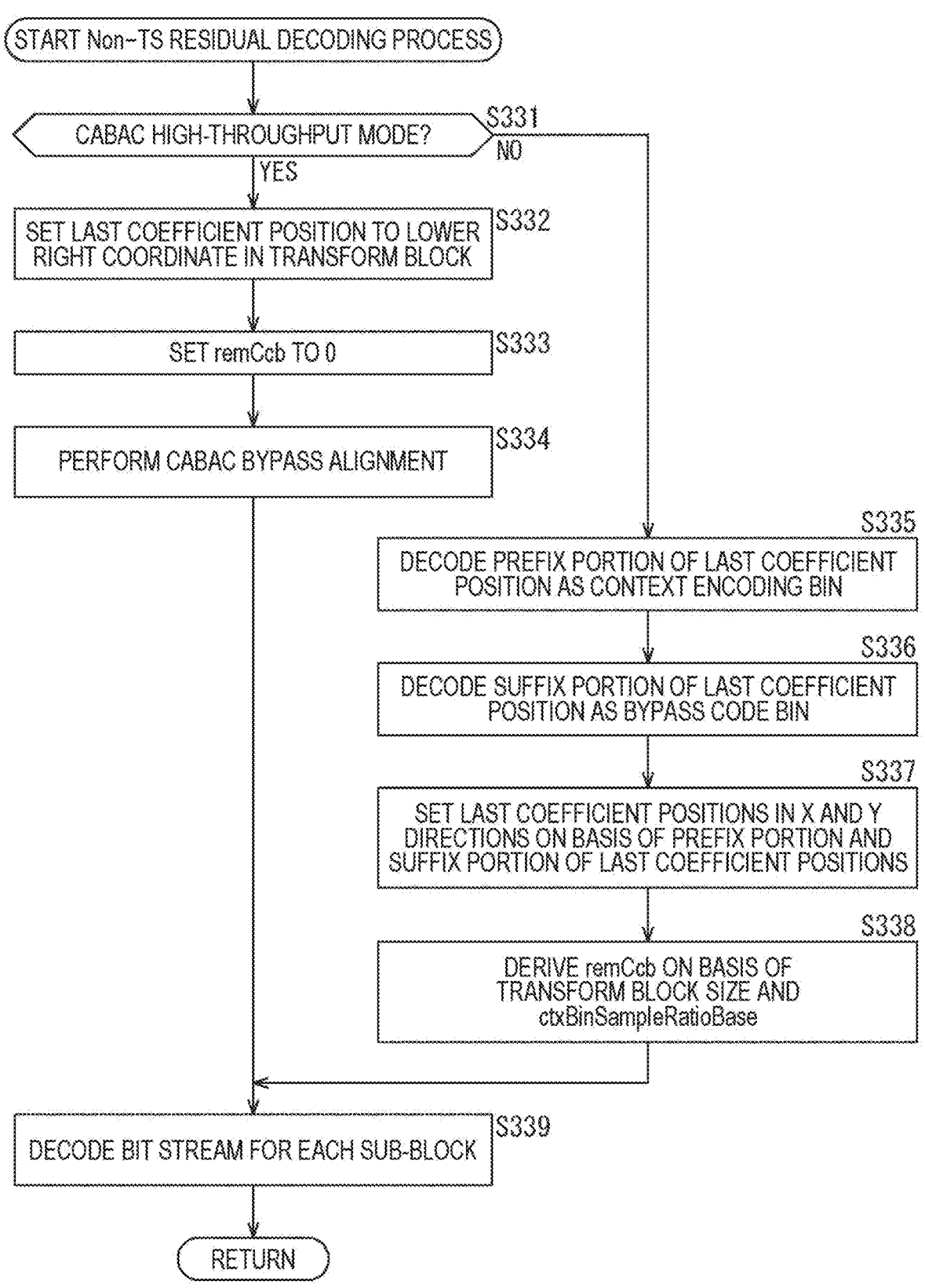
FIG. 28 is a flowchart illustrating an example of a flow of Non-TS residual decoding processing.

Next, an example of a flow of the Non-TS residual decoding process in this case (processing executed in step S204 (FIG. 18) of the decoding process in this case) will be described with reference to a flowchart in FIG. 28.

When the Non-TS residual decoding process is started, the last coefficient position decoding unit 332 of the Non-TS residual decoding unit 313 determines whether or not the mode is the CABAC high-throughput mode in step S331.

In a case where sps_high_throughput_flag is determined to be true (that is, the mode is the CABAC high-throughput mode), the process proceeds to step S332. In step S332, the last coefficient position decoding unit 332 applies Method #2 described above, and skips (omits) decoding of the last coefficient position. This can reduce the amount of context encoding bins generated. Moreover, the last coefficient position decoding unit 332 applies Method #2-1 described above, and sets the last coefficient position to the lower right coordinate in the transform block. As a result, the number of bins required for encoding the last coefficient can be reduced while suppressing the influence on the encoding efficiency.

In step S333, the setting unit 331 applies Method #2-3-2 described above, and sets the generation amount (remCcbs) of the number of context encoding bins to 0. As a result, bypass decoding is selected in subsequent decoding.

In step S334, the setting unit 331 applies Method #2-3 described above and performs CABAC bypass alignment. At that time, the setting unit 331 may apply Method #2-3-1 described above and set the parameter iVlCurrRange to 256. This simplifies the decoding of the bypass encoding bins and further allows multiple bypass encoding bins to be processed in parallel. When the processing of step S334 ends, the process proceeds to step S339.

Furthermore, in a case where sps_high_throughput_flag is determined to be false (that is, the mode is the non-CABAC high-throughput mode) in step S331, the process proceeds to step S335. In steps S335 and S336, the last coefficient position decoding unit 332 applies Method #2-2 described above, and decodes the prefix portion and the suffix portion of the last coefficient position included in the bit stream. For example, the last coefficient position decoding unit 332 applies the above-described Method #2-2-1, decodes the prefix portion (last_sig_coeff_{x, y}_prefix) of the last coefficient position included in the bit stream as a context encoding bin in step S335, and decodes the suffix portion (last_sig_coeff_{x, y}_suffix) of the last coefficient position included in the bit stream as a bypass code bin in step S336.

In step S337, the last coefficient position decoding unit 332 sets the last coefficient positions in the X direction and the Y direction (LastSignificantCoef {X, Y}) on the basis of the prefix portion (last_sig_coeff_{x, y}_prefix) of the last coefficient position obtained by the processing in step S335 and the suffix portion (last_sig_coeff_{x, y}_suffix) of the last coefficient position obtained by the processing in step S336.

In step S338, the setting unit 331 applies Method #2-3-3 described above, and derives the generation amount (remCcbs) of the number of context encoding bins on the basis of the reference value (ctxBinSampleRatioBase) of the number of context encoding bins and the transform block size (TbWidth, TbHeight). When the processing of step S338 ends, the process proceeds to step S339.

In step S339, the sub-block decoding unit 333 decodes the bit stream, and generates (restores) a sub-block coefficient flag (sb_coded_flag) and a quantization coefficient for each sub-block. For example, the sub-block decoding unit 333 may decode a sub-block coefficient flag (sb_coded_flag) and a quantization coefficient included in the bit stream as a bypass encoding bin. When the processing of step S339 ends, the Non-TS residual decoding process ends, and the process returns to FIG. 18.

By executing each processing as described above, the decoding device 300 can apply each method described above in <4. Skipping encoding or decoding of last coefficient position>. That is, the decoding device 300 can obtain an effect similar to the effect of each method described above in <4. Skipping encoding or decoding of last coefficient position>. Therefore, the decoding device 300 can reduce the generation amount of context encoding bins and suppress an increase in the processing amount of encoding and decoding. For example, the decoding device 300 can reduce the processing amount of CABAC in decoding at a high bit depth and a high bit rate, and improve the throughput.

5. Embodiment (Image Encoding Device)

<Image Encoding Device>

Figure 29:
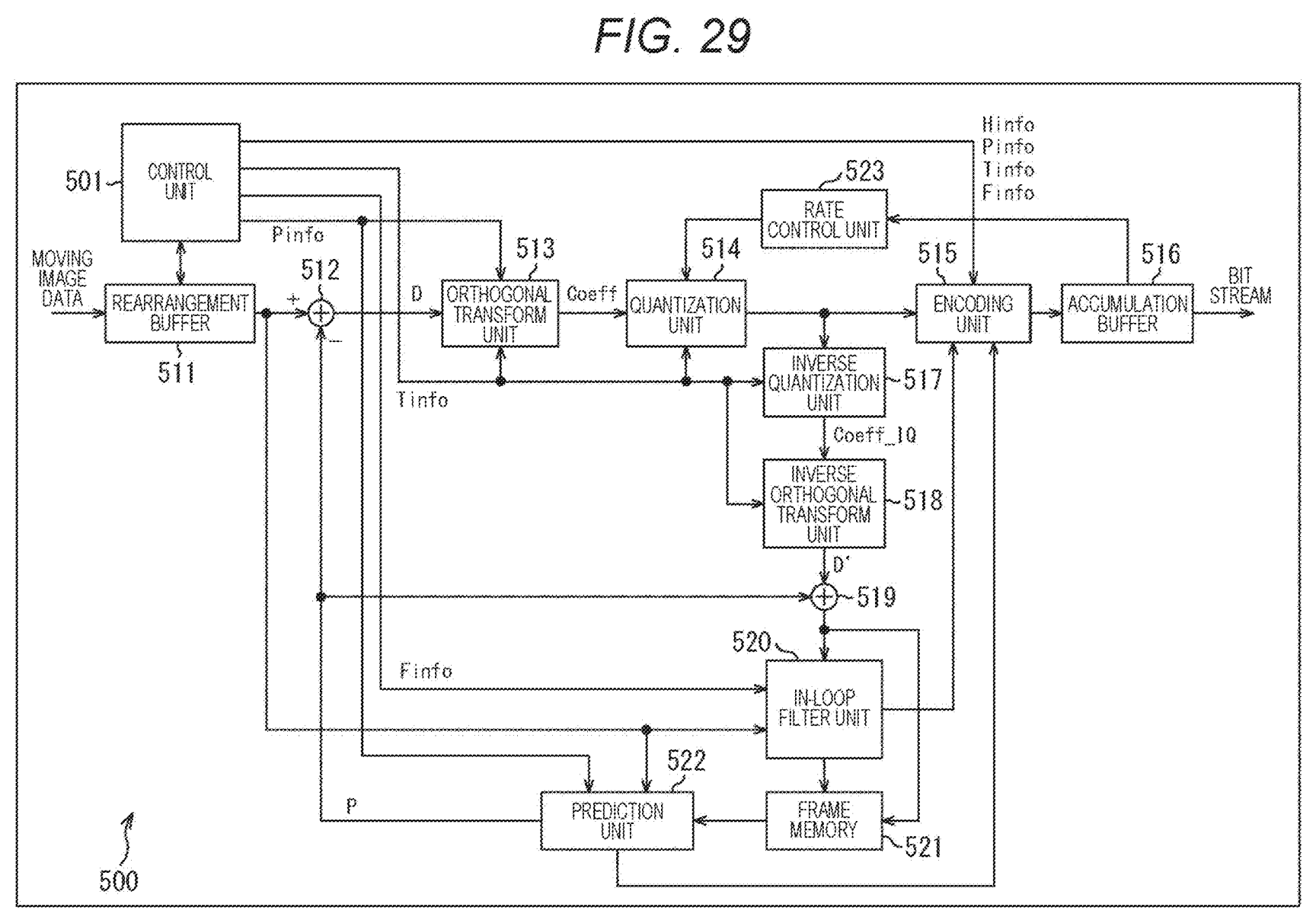

The present technology described above can be applied to any configuration. For example, the present technology can be applied to an image encoding device. FIG. 29 is a block diagram illustrating an example of a configuration of an image encoding device which is an aspect of an image processing device to which the present technology is applied. An image encoding device 500 illustrated in FIG. 29 is a device that encodes image data of a moving image. For example, the image encoding device 500 can encode image data of a moving image by an encoding method described in any one of the above-described Non-Patent Documents.

Note that, in FIG. 29, main processing units (blocks), data flows, and the like are illustrated, and those illustrated in FIG. 29 are not necessarily all. That is, the image encoding device 500 may include a processing unit not illustrated as a block in FIG. 29. Furthermore, the image encoding device 500 may have processing or a data flow that is not illustrated as an arrow or the like in FIG. 29.

As illustrated in FIG. 29, the image encoding device 500 includes a control unit 501, a rearrangement buffer 511, a calculation unit 512, an orthogonal transform unit 513, a quantization unit 514, an encoding unit 515, an accumulation buffer 516, an inverse quantization unit 517, an inverse orthogonal transform unit 518, a calculation unit 519, an in-loop filter unit 520, a frame memory 521, a prediction unit 522, and a rate control unit 523.

<Control Unit>

The control unit 501 divides the moving image data held by the rearrangement buffer 511 into blocks (CU, PU, transform block, and the like) in units of processing on the basis of a block size in units of processing specified outside or in advance. Furthermore, the control unit 501 determines encoding parameters (Header information Hinfo, prediction mode information Pinfo, transform information Tinfo, filter information Finfo, and the like) to be supplied to each block on the basis of, for example, rate-distortion optimization (RDO).

Details of these encoding parameters will be described later. When determining the encoding parameters as described above, the control unit 501 supplies the encoding parameters to each of the blocks. Specifically, details are as follows.

Header information Hinfo is supplied to each of the blocks. The prediction mode information Pinfo is supplied to the encoding unit 515 and the prediction unit 522. The transform information Tinfo is supplied to the encoding unit 515, the orthogonal transform unit 513, the quantization unit 514, the inverse quantization unit 517, and the inverse orthogonal transform unit 518. The filter information Finfo is supplied to the in-loop filter unit 520.

<Rearrangement Buffer>

Each of fields (input images) of moving image data is input to the image encoding device 500 in order of regeneration (order of display) thereof. The rearrangement buffer 511 acquires and holds (stores) each of the input images in order of regeneration (order of display) thereof. The rearrangement buffer 511 rearranges the input images in order of coding (order of decoding) or partitions the input images into blocks in units of processing on the basis of control by the control unit 501. The rearrangement buffer 511 supplies each of the processed input images to the calculation unit 512. Furthermore, the rearrangement buffer 511 also supplies the input images (original images) to the prediction unit 522 and the in-loop filter unit 520.

<Calculation Unit>

The calculation unit 512 uses the image I corresponding to the block of the processing unit and the predicted image P supplied from the prediction unit 522 as inputs, subtracts the predicted image P from the image I as illustrated in the following equation to derive a prediction residual D, and supplies the prediction residual D to the orthogonal transform unit 513.

$$D=I-P$$

<Orthogonal Transform Unit>

The orthogonal transform unit 513 uses the prediction residual D supplied from the calculation unit 512 and the transform information Tinfo supplied from the control unit 501 as inputs, and performs orthogonal transform on the prediction residual D on the basis of the transform information Tinfo to derive a transform coefficient Coeff. For example, the orthogonal transform unit 513 performs primary transform for the prediction residual D to generate a primary transform coefficient, and performs secondary transform for the primary transform coefficient on the basis of the ST identifier to generate a secondary transform coefficient. The orthogonal transform unit 513 supplies the obtained secondary transform coefficient to the quantization unit 514 as a transform coefficient Coeff. Note that the orthogonal transform unit 513 is not limited to the orthogonal transform, and can perform arbitrary coefficient transform. That is, the transform coefficient Coeff may be derived by performing arbitrary coefficient transform on the prediction residual D. Therefore, the orthogonal transform unit 513 can also be referred to as a coefficient transform unit.

<Quantization Unit>

The quantization unit 514 uses the transform coefficient Coeff supplied from the orthogonal transform unit 513 and the transform information Tinfo supplied from the control unit 501 as inputs, and scales (quantizes) the transform coefficient Coeff on the basis of the transform information Tinfo. Note that the quantization rate is controlled by the rate control unit 523. The quantization unit 514 supplies the quantization coefficient qcoeff, which is the level value of the transform coefficient quantized in this way, to the encoding unit 515 and the inverse quantization unit 517.

<Encoding Unit>

The encoding unit 515 uses the quantization coefficient qcoeff supplied from the quantization unit 514, various encoding parameters (Header information Hinfo, prediction mode information Pinfo, transform information Tinfo, filter information Finfo, and the like) supplied from the control unit 501, information regarding a filter such as a filter coefficient supplied from the in-loop filter unit 520, and information regarding an optimum prediction mode supplied from the prediction unit 522 as inputs. The encoding unit 515 performs variable-length coding (for example, arithmetic encoding) on quantization coefficient qcoeff to generate a bit string (coded data).

Moreover, the encoding unit 515 includes the information regarding the filter supplied from the in-loop filter unit 520 in the filter information Finfo, and includes the information regarding the optimum prediction mode supplied from the prediction unit 522 in the prediction mode information Pinfo. Then, the encoding unit 515 encodes the above-described various encoding parameters (Header information Hinfo, prediction mode information Pinfo, transform information Tinfo, filter information Finfo, and the like) to generate a bit string.

Furthermore, the encoding unit 515 multiplexes the bit strings (coded data) of various types of information generated as described above to generate a bit stream of coded data. The encoding unit 515 supplies the bit stream to the accumulation buffer 516.

<Accumulation Buffer>

The accumulation buffer 516 temporarily holds a bit stream of coded data obtained in the encoding unit 515. The accumulation buffer 516 outputs a bit stream of the held coded data to the outside of the image encoding device 500 at a predetermined timing. For example, the bit stream is transmitted to the decoding side via an arbitrary recording medium, an arbitrary transmission medium, an arbitrary information processing device, or the like. That is, the accumulation buffer 516 is also a transmission unit that transmits a bit stream (coded data).

<Inverse Quantization Unit>

The inverse quantization unit 517 performs processing related to inverse quantization. For example, the inverse quantization unit 517 uses the quantization coefficient qcoeff supplied from the quantization unit 514 and the transform information Tinfo supplied from the control unit 501 as inputs, and scales (inversely quantizes) the value of the quantization coefficient qcoeff on the basis of the transform information Tinfo. Note that this inverse quantization is inverse processing of the quantization performed in the quantization unit 514. The inverse quantization unit 517 supplies the transform coefficient Coeff_IQ obtained by such inverse quantization to the inverse orthogonal transform unit 518.

<Inverse Orthogonal Transform Unit>

The inverse orthogonal transform unit 518 performs processing related to inverse orthogonal transform. For example, the inverse orthogonal transform unit 518 uses the transform coefficient Coeff IQ supplied from the inverse quantization unit 517 and the transform information Tinfo supplied from the control unit 501 as inputs, and performs inverse orthogonal transform on the transform coefficient Coeff IQ on the basis of the transform information Tinfo to derive the prediction residual D'. This inverse orthogonal transform is inverse processing of the orthogonal transform performed by the orthogonal transform unit 513. The inverse orthogonal transform unit 518 supplies the prediction residual D' obtained by such inverse orthogonal transform to the calculation unit 519.

In other words, the inverse orthogonal transform unit 518 executes an inverse process of the process executed by the orthogonal transform unit 513. That is, similarly to the case of the orthogonal transform unit 513, the inverse orthogonal transform unit 518 is not limited to the inverse orthogonal transform and can perform arbitrary inverse coefficient transform. This inverse coefficient transform is inverse processing of the coefficient transform executed by the orthogonal transform unit 513. That is, the prediction residual D' may be derived by performing arbitrary inverse coefficient transform on the transform coefficient Coeff_IQ. Therefore, the inverse orthogonal transform unit 518 can also be referred to as an inverse coefficient transform unit.

<Calculation Unit>

The calculation unit 519 uses the prediction residual D' supplied from the inverse orthogonal transform unit 518 and the predicted image P supplied from the prediction unit 522 as inputs. The calculation unit 519 adds the prediction residual D' and the predicted image P corresponding to the prediction residual D' to derive a locally decoded image Rlocal. The calculation unit 519 supplies the derived locally decoded image Rlocal to the in-loop filter unit 520 and the frame memory 521.

<In-Loop Filter Unit>

The in-loop filter unit 520 performs processing related to the in-loop filter processing. For example, the in-loop filter unit 520 uses the locally decoded image Rlocal supplied from the calculation unit 519, the filter information Finfo supplied from the control unit 501, and the input image (original image) supplied from the rearrangement buffer 511 as inputs. Note that the information input to the in-loop filter unit 520 is arbitrary, and information other than these pieces of information may be input. For example, a prediction mode, motion information, a code amount target value, a quantization parameter QP, a picture type, information of a block (CU, CTU, etc.), and the like may be input to the in-loop filter unit 520 as necessary.

The in-loop filter unit 520 appropriately performs filter processing on the locally decoded image Rlocal on the basis of the filter information Finfo. The in-loop filter unit 520 also uses the input image (original image) and other input information for the filtering processing as necessary.

For example, the in-loop filter unit 520 applies four in-loop filters of a bilateral filter, a deblocking filter (DBF), a sample adaptive offset (SAO), and an adaptive loop filter (ALF) in this order. Note that which filter is applied and in which order the filter is applied are arbitrary and can be selected as appropriate.

Of course, the filter processing performed by the in-loop filter unit 520 is arbitrary and is not limited to the above example. For example, the in-loop filter unit 520 may apply a wiener filter or the like.

The in-loop filter unit 520 supplies the filtered locally decoded image Rlocal to the frame memory 521. Note that, for example, in a case where information regarding a filter such as a filter coefficient is transmitted to the decoding side, the in-loop filter unit 520 supplies the information regarding the filter to the encoding unit 515.

<Frame Memory>

The frame memory 521 performs processing related to storage of data related to an image. For example, the frame memory 521 uses the locally decoded image Rlocal supplied from the calculation unit 519 and the filtered locally decoded image Rlocal supplied from the in-loop filter unit 520 as inputs, and holds (stores) the inputs. Furthermore, the frame memory 521 reconstructs and holds the decoded image R for each picture unit using the locally decoded image Rlocal (stores the decoded image R in a buffer in the frame memory 521). The frame memory 521 supplies the decoded image R (or a part thereof) to the prediction unit 522 in response to a request from the prediction unit 522.

<Prediction Unit>

The prediction unit 522 performs processing related to generation of a predicted image. For example, the prediction unit 522 uses the prediction mode information Pinfo supplied from the control unit 501, the input image (original image) supplied from the rearrangement buffer 511, and the decoded image R (or a part thereof) read from the frame memory 521 as inputs. The prediction unit 522 performs prediction processing such as inter prediction or intra prediction using the prediction mode information Pinfo and the input image (original image), performs prediction with reference to the decoded image R as a reference image, performs motion compensation processing on the basis of the prediction result, and generates the predicted image P. The prediction unit 522 supplies the generated predicted image P to the calculation unit 512 and the calculation unit 519. Furthermore, the prediction unit 522 supplies information regarding the prediction mode selected by the above processing, that is, the optimum prediction mode, to the encoding unit 515 as necessary.

<Rate Control Unit>

The rate control unit 523 performs processing related to rate control. For example, the rate control unit 523 controls the rate of the quantization operation of the quantization unit 514 so that overflow or underflow does not occur on the basis of the code amount of the coded data accumulated in the accumulation buffer 516.

Note that these processing units (the control unit 501, the rearrangement buffer 511 to the rate control unit 523) have an arbitrary configuration. For example, each processing unit may be configured by a logic circuit that implements the above-described processing. Furthermore, it is also possible that each processing unit includes, for example, a CPU, a ROM, a RAM and the like, and executes a program using them, thereby implementing the above-described processing. Of course, it is also possible that each processing unit has both configurations such that some of the above-described processes may be realized by the logic circuit and the others may be realized by execution of the program. The configurations of the processing units may be independent from each other and, for example, some processing units may implement a part of the above-described processing by the logic circuit, some other processing units may implement the above-described processing by executing the program, and still some other processing units may implement the above-described processing by both the logic circuit and the execution of the program.

In the image encoding device 500 having the above-described configuration, the above-described present technology may be applied to the encoding unit 515.

For example, each of the methods described above in <3. Bypass encoding and bypass decoding of last coefficient position> may be applied to the encoding unit 515. For example, in a case where the encoding unit applies Method #1 in encoding the quantization coefficient qcoeff and sps_high_throughput_flag is true, the encoding unit 515 may encode the prefix portion of the last coefficient position (last_sig_coeff_{x, y}_prefix) as a bypass code bin. Similarly, the encoding unit 515 can apply each of the methods described above in <3. Bypass encoding and bypass decoding of last coefficient position> to the encoding of the quantization coefficient qcoeff. By doing so, the image encoding device 500 can obtain an effect similar to the effect of each method described above in<3. Bypass encoding and bypass decoding of last coefficient position>. Therefore, the image encoding device 500 can reduce the generation amount of context encoding bins, and can suppress an increase in the processing amount of encoding and decoding. For example, the image encoding device 500 can reduce the processing amount of CABAC in encoding image data of a high bit depth and a high bit rate, and improve the throughput.

Furthermore, for example, each method described above in <4. Skipping encoding or decoding of last coefficient position> may be applied to the encoding unit 515. For example, in a case where the encoding unit 515 applies Method #2 in encoding the quantization coefficient qcoeff and sps_high_throughput_flag is true, encoding of the last coefficient position may be skipped (omitted). Similarly, the encoding unit 515 can apply each of the methods described above in <4. Skipping encoding or decoding of last coefficient position> to the encoding of the quantization coefficient qcoeff. By doing so, the image encoding device 500 can obtain an effect similar to the effect of each method described above in <4. Skipping encoding or decoding of last coefficient position>. Therefore, the image encoding device 500 can reduce the generation amount of context encoding bins, and can suppress an increase in the processing amount of encoding and decoding. For example, the image encoding device 500 can reduce the processing amount of CABAC in encoding image data of a high bit depth and a high bit rate, and improve the throughput.

<Flow of Image Encoding Process>

Next, an example of a flow of an image encoding process executed by the image encoding device 500 having the above-described configuration will be described with reference to a flowchart in FIG. 30.

In step S501, when the image encoding process is started, the rearrangement buffer 511 is controlled by the control unit 501 to rearrange an order of frames of input moving image data from the order of display to the order of coding.

In step S502, the control unit 501 sets units of processing (performs block partition) for the input images held by the rearrangement buffer 511.

In step S503, the control unit 501 determines (sets) an encoding parameter for the input images held by the rearrangement buffer 511.

In step S504, the prediction unit 522 performs prediction processing and generates a predicted image or the like in an optimum prediction mode. For example, in the prediction processing, the prediction unit 522 performs intra prediction to generate a predicted image or the like in an optimum intra prediction mode, performs inter prediction to generate a predicted image or the like in an optimum inter prediction mode, and selects an optimum prediction mode from the predicted images on the basis of a cost function value or the like.

In step S505, the calculation unit 512 calculates a difference between the input images and the predicted images in the optimum mode selected by the prediction processing in step S504. That is, the calculation unit 512 generates the prediction residual D between the input image and the predicted image. The prediction residual D obtained in this manner has a smaller data amount than the original image data. Therefore, the amount of data can be compressed as compared with a case where an image is coded as it is.

In step S506, the orthogonal transform unit 513 performs orthogonal transform processing on the prediction residual D generated by the processing in step S505 to derive a transform coefficient Coeff.

In step S507, the quantization unit 514 quantizes the transform coefficient Coeff obtained by the processing in step S506 by using the quantization parameter calculated by the control unit 501 or the like, and derives the quantization coefficient qcoeff.

In step S508, the inverse quantization unit 517 inversely quantizes the quantization coefficient qcoeff generated by the processing in step S507 with a characteristic corresponding to the quantization characteristic in step S507 to derive the transform coefficient Coeff_IQ.

In step S509, the inverse orthogonal transform unit 518 inversely orthogonally transforms the transform coefficient Coeff_IQ obtained by the processing in step S508 by a method corresponding to the orthogonal transform processing in step S506, and derives the prediction residual D'.

In step S510, the calculation unit 519 adds the predicted image obtained by the prediction processing in step S504 to the prediction residual D' derived by the processing in step S509, thereby generating a locally decoded image.

In step S511, the in-loop filter unit 520 performs in-loop filter processing on the locally decoded image derived by the processing in step S510.

In step S512, the frame memory 521 stores the locally decoded image derived by the processing in step S510 and the locally decoded image filtered in step S511.

In step S513, the encoding unit 515 executes encoding processing, encodes the quantization coefficient qcoeff, various encoding parameters, and the like obtained by the processing in step S507, and generates a bit stream of coded data.

In step S514, the accumulation buffer 516 accumulates the bit stream obtained in step S513 and outputs the bit stream to the outside of the image encoding device 500. This bit stream is transmitted to the decoding side via a transmission path or a recording medium, for example. Furthermore, the rate control unit 523 performs rate control as necessary.

When the processing of step S514 ends, the image encoding process ends.

The above-described present technology may be applied to the encoding processing executed in step S513 of such an image encoding process.

For example, in the encoding processing, each method described above in <3. Bypass encoding and bypass decoding of last coefficient position> may be applied. For example, in a case where the encoding unit applies Method #1 in encoding the quantization coefficient qcoeff and sps_high_throughput_flag is true, the encoding unit 515 may encode the prefix portion of the last coefficient position (last_sig_coeff_{x, y}_prefix) as a bypass code bin. Similarly, the encoding unit 515 can apply each of the methods described above in <3. Bypass encoding and bypass decoding of last coefficient position> to the encoding of the quantization coefficient qcoeff. By doing so, the image encoding device 500 can obtain an effect similar to the effect of each method described above in<3. Bypass encoding and bypass decoding of last coefficient position>. Therefore, the image encoding device 500 can reduce the generation amount of context encoding bins, and can suppress an increase in the processing amount of encoding and decoding. For example, the image encoding device 500 can reduce the processing amount of CABAC in encoding image data of a high bit depth and a high bit rate, and improve the throughput.

Furthermore, in the encoding processing, each method described above in <4. Skipping encoding or decoding of last coefficient position> may be applied. For example, in a case where the encoding unit 515 applies Method #2 in encoding the quantization coefficient qcoeff and sps_high-_throughput_flag is true, encoding of the last coefficient position may be skipped (omitted). Similarly, the encoding unit 515 can apply each of the methods described above in <4. Skipping encoding or decoding of last coefficient position> to the encoding of the quantization coefficient qcoeff. By doing so, the image encoding device 500 can obtain an effect similar to the effect of each method described above in <4. Skipping encoding or decoding of last coefficient position>. Therefore, the image encoding device 500 can reduce the generation amount of context encoding bins, and can suppress an increase in the processing amount of encoding and decoding. For example, the image encoding device 500 can reduce the processing amount of CABAC in encoding image data of a high bit depth and a high bit rate, and improve the throughput.

6. Embodiment (Image Decoding Device)

<Image Decoding Device>

Figure 31:
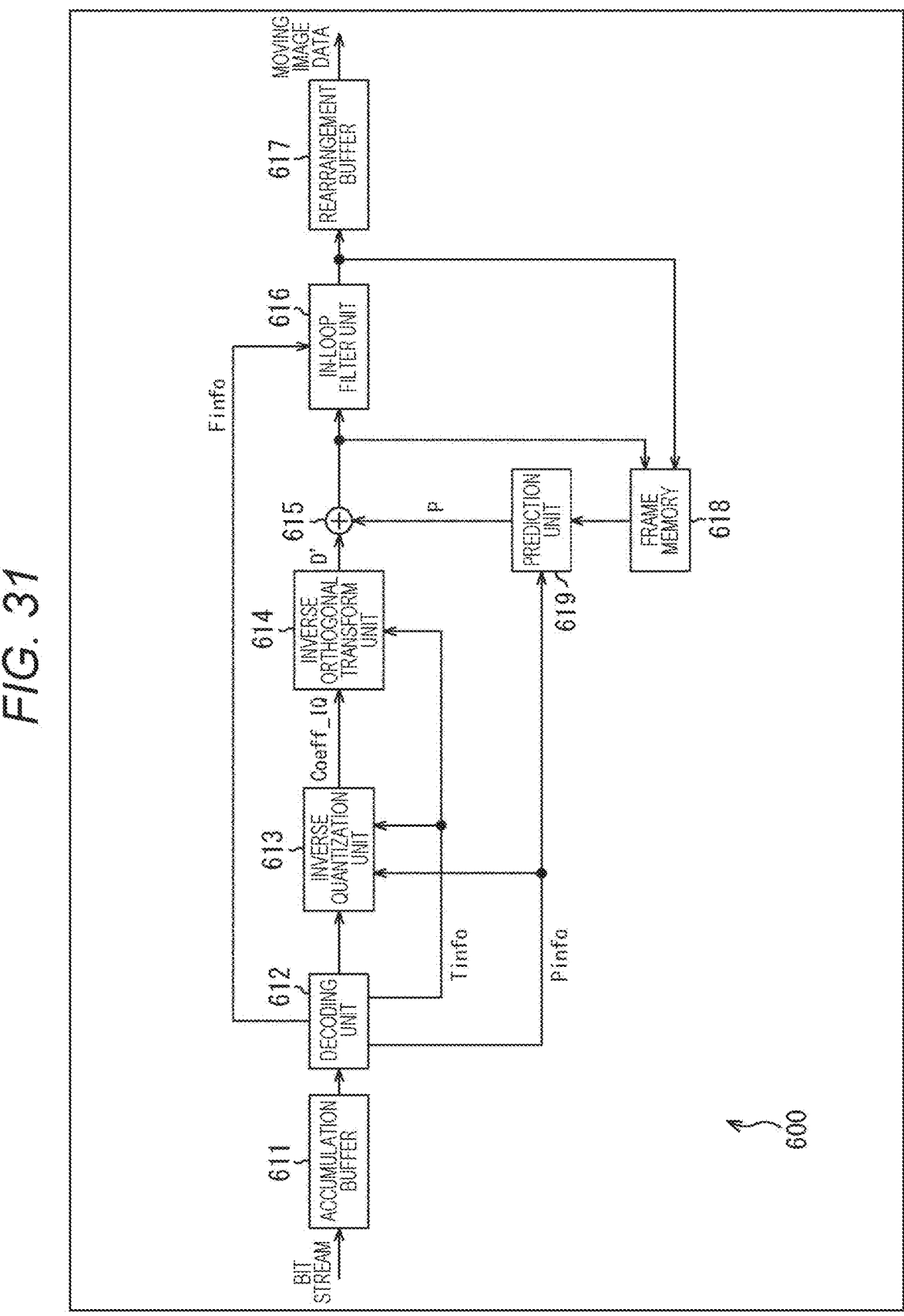
FIG. 31 is a block diagram illustrating a main configuration example of an image decoding device.

The present technology described above can be applied to any configuration. For example, the present technology can be applied to an image decoding device. FIG. 31 is a block diagram illustrating an example of a configuration of an image decoding device which is an aspect of an image processing device to which the present technology is applied. An image decoding device 600 illustrated in FIG. 31 is an device that generates moving image data by decoding coded data (bit stream) of a moving image. For example, the image decoding device 600 can decode the coded data by the decoding method described in any one of the above Non-Patent Documents.

Note that, in FIG. 31, main processing units (blocks), data flows, and the like are illustrated, and those illustrated in FIG. 31 are not necessarily all. That is, the image decoding device 600 may include a processing unit not illustrated as a block in FIG. 31. Furthermore, the image decoding device 600 may have a process or a data flow that is not illustrated as an arrow or the like in FIG. 31.

As illustrated in FIG. 31, the image decoding device 600 includes an accumulation buffer 611, a decoding unit 612, an inverse quantization unit 613, an inverse orthogonal transform unit 614, a calculation unit 615, an in-loop filter unit 616, a rearrangement buffer 617, a frame memory 618, and a prediction unit 619. Note that the prediction unit 619 includes an intra prediction unit, an inter prediction unit, and the like (not illustrated).

<Accumulation Buffer>

The accumulation buffer 611 acquires and holds (stores) a bit stream input to the image decoding device 600. The accumulation buffer 611 supplies the accumulated bit stream to the decoding unit 612 at a predetermined timing or in a case where a predetermined condition is satisfied.

<Decoding Unit>

The decoding unit 612 performs processing related to image decoding. For example, the decoding unit 612 uses the bit stream supplied from the accumulation buffer 611 as an input, performs variable-length decoding on the syntax value of each syntax element from the bit string according to the definition of the syntax table, and derives a parameter.

The syntax element and the parameter derived from the syntax value of the syntax element include, for example, header information Hinfo, prediction mode information Pinfo, transform information Tinfo, filter information Finfo, and the like. That is, the decoding unit 612 parses (analyzes and acquires) these pieces of information from a bit stream. These pieces of information will be described below.

<Header Information Hinfo>

The header information Hinfo includes, for example, header information such as video parameter set (VPS)/ sequence parameter set (SPS)/Picture Parameter Set (PPS)/ slice header (SH). The header information Hinfo includes, for example, information defining an image size (width PicWidth, height PicHeight), a bit depth (luminance bit-DepthY, color difference bitDepthC), a chroma array type ChromaArrayType, a maximum value MaxCUSize/minimum value MinCUSize of CU size, a maximum depth MaxQTDepth/a minimum depth MinQTDepth of quadtree partitioning (also referred to as Quad-tree partitioning), a maximum depth MaxBTDepth/minimum depth MinBT-Depth of binary tree partitioning (Binary-tree partitioning), a maximum value MaxTSSize of a transform skip block (also referred to as a maximum transform skip block size), an on/off flag (also referred to as an enabled flag) of each coding tool, and the like.

For example, as the on-off flag of the encoding tool included in the header information Hinfo, there is an on-off flag related to the following transform and quantization processing. Note that the on-off flag of the encoding tool can also be interpreted as a flag indicating whether or not syntax related to the encoding tool exists in the coded data. Furthermore, in a case where the value of the on-off flag is one (true), it is indicated that the encoding tool can be used, and in a case where the value of the on-off flag is zero (false), it is indicated that the encoding tool cannot be used. Note that the interpretation of the flag value may be reversed.

An inter-component prediction enabled flag (ccp_enabled_flag): is flag information indicating whether or not inter-component prediction (cross-component prediction (CCP), also referred to as CC prediction) can be used. For example, in a case where the flag information is "1" (true), it is indicated that the flag information can be used, and in a case where the flag information is "0" (false), it is indicated that the flag information cannot be used.

Note that the CCP is also referred to as cross-component linear prediction (CCLM or CCLMP).

<Prediction Mode Information Pinfo>

The prediction mode information Pinfo includes, for example, information such as size information PBSize (predicted block size) of the processing target PB (predicted block), intra prediction mode information IPinfo, and motion prediction information MVinfo.

The intra-prediction mode information IPinfo includes, for example, prev_intra_luma_pred_flag, mpm_idx, rem_intra_pred_mode in JCTVC-W1005, 7.3.8.5 Coding Unit syntax, a luminance intra-prediction mode IntraPredModeY derived from the syntax, or the like.

Furthermore, the intra-prediction mode information IPinfo includes, for example, a cross-component prediction flag (ccp_flag (cclmp_flag)), a multi-class linear prediction mode flag (mclm_flag), a chroma sample position type identifier (chroma_sample_loc_type_idx), a chroma MPM identifier (chroma_mpm_idx), a luminance intra-prediction mode (IntraPredModeC) derived from these syntaxes, or the like.

The inter-component prediction flag (ccp_flag (cclmp-_flag)) is flag information indicating whether or not to apply the inter-component linear prediction. For example, when ccp_flag==1, it is indicated that the inter-component prediction is applied, and when ccp_flag==0, it is indicated that the inter-component prediction is not applied.

The multi-class linear prediction mode flag (mclm_flag) is information regarding a mode of linear prediction (linear prediction mode information). More specifically, the multi-class linear prediction mode flag (mclm_flag) is flag information indicating whether or not to set the multi-class linear prediction mode. For example, in a case of "0", a one-class mode (single-class mode) (for example, CCLMP) is indicated, and in a case of "1", a two-class mode (multi-class mode) (for example, MCLMP) is indicated.

The chrominance sample position type identifier (chroma_sample_loc_type_idx) is an identifier that identifies a type (also referred to as a chrominance sample position type) of a pixel position of the chrominance component. For example, in a case where the chrominance array type (ChromaArrayType), which is information regarding a color format, indicates 420 format, the chrominance sample position type identifier is assigned as in the following expression.

chroma_sample_loc_type_idx==0: Type2 chroma_sample_loc_type_idx==1: Type3 chroma_sample_loc_type_idx==2: Type0 chroma_sample_loc_type_idx==3:Type1

Note that the chroma sample position type identifier (chroma_sample_loc_type_idx) is transmitted as (stored in) information regarding a pixel position of a chroma component (chroma_sample_loc_info( )).

The chroma MPM identifier (chroma_mpm_idx) is an identifier indicating which prediction mode candidate in a chroma intra-prediction mode candidate list (intraPredModeCandListC) is specified as a chroma intra-prediction mode.

The motion prediction information MVinfo includes, for example, information such as merge_idx, merge_flag, inter_pred_idc, ref_idx_LX, mvp_lX_flag, X={0, 1}, and mvd (see, for example, JCTVC-W1005, 7.3.8.6 Prediction Unit Syntax).

Needless to say, information to be included in the prediction mode information Pinfo is arbitrary, and information other than these pieces of information may be included.
<Transform Information Tinfo>

The transform information Tinfo includes, for example, the following information. Of course, the information included in the transform information Tinfo is arbitrary, and information other than these pieces of information may be included.

Lateral width size (TBWSize) and vertical width size (TBHSize) of transform block to be processed
Transform skip flag (transform_skip_flag (also referred to as ts_flag))
Scan identifier (scanIdx)
Quantization parameter (qp)
Quantization matrix (scaling_matrix (for example, JCTVC-W1005, 7.3.4 Scaling list data syntax))

Note that log 2TBWSize and log 2TBHSize may be included in the transform information Tinfo instead of TBWSize and TBHSize. log 2TBWSize is a logarithmic value of TBWSize with base 2. log 2TBHSize is the logarithmic value of TBHSize with base 2. Furthermore, in the image decoding device 600, the transform_skip_flag is a flag indicating whether or not inverse coefficient transform (inverse primary transform and inverse secondary transform) is skipped.
<Filter Information Finfo>

The filter information Finfo includes, for example, control information related to each filter process described below.
Control information regarding the deblocking filter (DBF)
Control information regarding pixel adaptive offset (SAO)
Control Information regarding adaptive loop filter (ALF)
Control information on other linear and nonlinear filters
More specifically, for example, information for specifying a picture to which each filter is applied and a region in the picture, filter on/off control information in units of CUs, filter on/off control information regarding a boundary of slices or tiles, or the like is included. Of course, the information included in the filter information Finfo is arbitrary, and information other than these pieces of information may be included.

The description returns to the description of the decoding unit 612. The decoding unit 612 derives the quantization coefficient qcoeff with reference to syntax related to the quantization coefficient qcoeff obtained by decoding the bit stream. The decoding unit 612 supplies the quantization coefficient qcoeff to the inverse quantization unit 613.

Furthermore, the decoding unit 612 supplies encoding parameters such as the parsed header information Hinfo, prediction mode information Pinfo, transform information Tinfo, filter information Finfo, and the like to each block. For example, the decoding unit 612 supplies the header information Hinfo to the inverse quantization unit 613, the inverse orthogonal transform unit 614, the prediction unit 619, and the in-loop filter unit 616. Furthermore, the decoding unit 612 supplies the prediction mode information Pinfo to the inverse quantization unit 613 and the prediction unit 619. Furthermore, the decoding unit 612 supplies the transform information Tinfo to the inverse quantization unit 613 and the inverse orthogonal transform unit 614. Furthermore, the decoding unit 612 supplies the filter information Finfo to the in-loop filter unit 616.

Of course, the above example is one example, and the present technology is not limited to this example. For example, each encoding parameter may be supplied to an arbitrary processing unit. Furthermore, other information may be supplied to an arbitrary processing unit.
<Inverse Quantization Unit>

The inverse quantization unit 613 has at least a configuration necessary for performing processing related to inverse quantization. For example, the inverse quantization unit 613 uses the transform information Tinfo and the quantization coefficient qcoeff supplied from the decoding unit 612 as inputs, scales (inversely quantizes) the value of the quantization coefficient qcoeff on the basis of the transform information Tinfo, and derives the transform coefficient Coeff IQ after inverse quantization. The inverse quantization unit 613 supplies the derived transform coefficient Coeff IQ to the inverse orthogonal transform unit 614.

Note that this inverse quantization is performed as inverse processing of the quantization by the quantization unit 514 of the image encoding device 500. Furthermore, this inverse quantization is processing similar to the inverse quantization by the inverse quantization unit 517 of the image encoding device 500. That is, the inverse quantization unit 517 of the image encoding device 500 performs processing (inverse quantization) similar to the inverse quantization unit 613.

<Inverse Orthogonal Transform Unit>

The inverse orthogonal transform unit 614 performs processing related to inverse orthogonal transform. For example, the inverse orthogonal transform unit 614 uses the transform coefficient Coeff IQ supplied from the inverse quantization unit 613 and the transform information Tinfo supplied from the decoding unit 612 as inputs, and performs inverse orthogonal transform processing on the transform coefficient Coeff IQ on the basis of the transform information Tinfo to derive the prediction residual D'. For example, the inverse orthogonal transform unit 614 performs inverse secondary transform for the transform coefficient Coeff IQ on the basis of the ST identifier to generate a primary transform coefficient, and performs primary transform for the primary transform coefficient to generate a prediction residual D'. The inverse orthogonal transform unit 614 supplies the derived prediction residual D' to the calculation unit 615.

Note that this inverse orthogonal transform is performed as inverse processing of the orthogonal transform by the orthogonal transform unit 513 of the image encoding device 500. Furthermore, this inverse orthogonal transform is processing similar to the inverse orthogonal transform by the inverse orthogonal transform unit 518 of the image encoding device 500. That is, the inverse orthogonal transform unit 518 of the image encoding device 500 performs processing (inverse orthogonal transform) similar to the inverse orthogonal transform unit 614.

Therefore, the inverse orthogonal transform unit 614 can perform any inverse coefficient transform without being limited to the inverse orthogonal transform, similarly to the inverse orthogonal transform unit 518 of the image encoding device 500. This inverse coefficient transform is inverse processing of the coefficient transform executed by the orthogonal transform unit 513 of the image encoding device 500. That is, the prediction residual D' may be derived by performing arbitrary inverse coefficient transform on the transform coefficient Coeff IQ. Therefore, the inverse orthogonal transform unit 614 can also be referred to as an inverse coefficient transform unit.

<Calculation Unit>

The calculation unit 615 performs processing related to addition of information regarding an image. For example, the calculation unit 615 uses the prediction residual D' supplied from the inverse orthogonal transform unit 614 and the predicted image P supplied from the prediction unit 619 as inputs. The calculation unit 615 adds the prediction residual D' and the predicted image P (prediction signal) corresponding to the prediction residual D' to derive the locally decoded image Rlocal as expressed by the following formula. The calculation unit 615 supplies the derived locally decoded image Rlocal to the in-loop filter unit 616 and the frame memory 618.

$$Rlocal = D' + P$$

<In-Loop Filter Unit>

The in-loop filter unit 616 performs processing related to the in-loop filter processing. For example, the in-loop filter unit 616 uses the locally decoded image Rlocal supplied from the calculation unit 615 and the filter information Finfo supplied from the decoding unit 612 as inputs. Note that the information input to the in-loop filter unit 616 is arbitrary, and information other than these pieces of information may be input.

The in-loop filter unit 616 appropriately performs filter processing on the locally decoded image Rlocal on the basis of the filter information Finfo.

For example, the in-loop filter unit 616 applies four in-loop filters of a bilateral filter, a deblocking filter (DBF), an sample adaptive offset (SAO), and an adaptive loop filter (ALF) in this order. Note that which filter is applied and in which order the filter is applied are arbitrary and can be selected as appropriate.

The in-loop filter unit 616 performs filtering processing corresponding to the filtering processing performed by the encoding side (for example, the in-loop filter unit 520 of the image encoding device 500). Of course, the filter processing performed by the in-loop filter unit 616 is arbitrary and is not limited to the above example. For example, the in-loop filter unit 616 may apply a wiener filter or the like.

The in-loop filter unit 616 supplies the filtered locally decoded image Rlocal to the rearrangement buffer 617 and the frame memory 618.

<Rearrangement Buffer>

The rearrangement buffer 617 receives the locally decoded image Rlocal supplied from the in-loop filter unit 616 as an input and holds (stores) the locally decoded image Rlocal. The rearrangement buffer 617 reconstructs and holds (stores in the buffer) the decoded image R for each picture unit using the locally decoded image Rlocal. The rearrangement buffer 617 rearranges the obtained decoded image R from the decoding order to the reproduction order. The rearrangement buffer 617 outputs the rearranged decoded image R group to the outside of the image decoding device 600 as moving image data.

<Frame Memory>

The frame memory 618 performs processing related to storage of data related to an image. For example, the frame memory 618 uses the locally decoded image Rlocal supplied from the calculation unit 615 as an input, reconstructs the decoded image R for each picture unit, and stores the decoded image R in the buffer in the frame memory 618.

Furthermore, the frame memory 618 uses the locally decoded image Rlocal subjected to the in-loop filter processing supplied from the in-loop filter unit 616 as an input, reconstructs the decoded image R for each picture unit, and stores the decoded image R in the buffer in the frame memory 618. The frame memory 618 appropriately supplies the stored decoded image R (or a part thereof) to the prediction unit 619 as a reference image.

Note that the frame memory 618 may store header information Hinfo, prediction mode information Pinfo, transform information Tinfo, filter information Finfo, and the like related to generation of the decoded image.

<Prediction Unit>

The prediction unit 619 performs processing related to generation of a predicted image. For example, the prediction unit 619 uses the prediction mode information Pinfo supplied from the decoding unit 612 as an input, performs prediction by a prediction method specified by the prediction mode information Pinfo, and derives the predicted image P. At the time of derivation, the prediction unit 619 uses the decoded image R (or a part thereof) before filtering or after filtering stored in the frame memory 618, specified by the prediction mode information Pinfo, as a reference image. The prediction unit 619 supplies the derived predicted image P to the calculation unit 615.

Note that these processing units (the accumulation buffer 611 to the prediction unit 619) have an arbitrary configuration. For example, each processing unit may be configured by a logic circuit that implements the above-described processing. Furthermore, it is also possible that each processing unit includes, for example, a CPU, a ROM, a RAM and the like, and executes a program using them, thereby implementing the above-described processing. Of course, it is also possible that each processing unit has both configurations such that some of the above-described processes may be realized by the logic circuit and the others may be realized by execution of the program. The configurations of the processing units may be independent from each other and, for example, some processing units may implement a part of the above-described processing by the logic circuit, some other processing units may implement the above-described processing by executing the program, and still some other processing units may implement the above-described processing by both the logic circuit and the execution of the program.

In the image decoding device 600 having the above-described configuration, the above-described present technology may be applied to the decoding unit 612.

For example, each of the methods described above in <3. Bypass encoding and bypass decoding of last coefficient position> may be applied to the decoding unit 612. For example, in a case where the decoding unit 612 applies Method #1 in the decoding of the bit stream and sps_high_throughput_flag is true, a prefix portion (last_sig_coeff_{x, y}_prefix) of a last coefficient position included in the bit stream may be decoded as a bypass code bin. Similarly, the decoding unit 612 can apply each method described above in<3. Bypass encoding and bypass decoding of last coefficient position> in decoding the bit stream. By doing so, the image decoding device 600 can obtain an effect similar to the effect of each method described above in <3. Bypass encoding and bypass decoding of last coefficient position>. Therefore, the image decoding device 600 can reduce the generation amount of context encoding bins and suppress an increase in the processing amount of encoding and decoding. For example, the image decoding device 600 can reduce the processing amount of CABAC in decoding image data of high bit depth and high bit rate, and improve the throughput.

Furthermore, for example, each method described above in <4. Skipping encoding or decoding of last coefficient position> may be applied to the decoding unit 612. For example, in a case where the decoding unit 612 applies Method #2 in the decoding of the bit stream and sps_high_throughput_flag is true, the decoding of the last coefficient position may be skipped (omitted). Similarly, the decoding unit 612 can apply each method described above in <4. Skipping encoding or decoding of last coefficient position> in decoding the bit stream. By doing so, the image decoding device 600 can obtain an effect similar to the effect of each method described above in <4. Skipping encoding or decoding of last coefficient position>. Therefore, the image decoding device 600 can reduce the generation amount of context encoding bins and suppress an increase in the processing amount of encoding and decoding. For example, the image decoding device 600 can reduce the processing amount of CABAC in decoding image data of high bit depth and high bit rate, and improve the throughput.

<Flow of Image Decoding Process>

Figure 32:
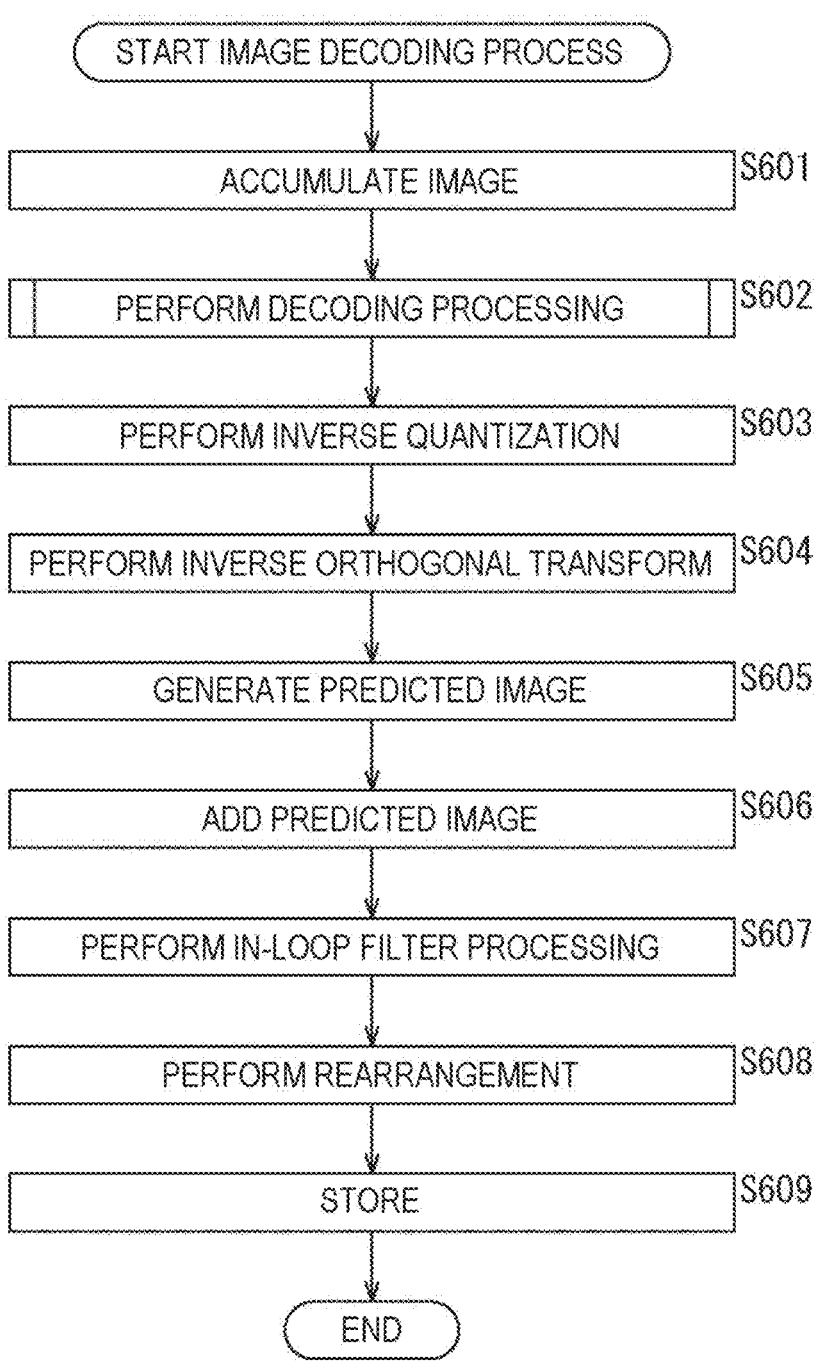
FIG. 32 is a flowchart illustrating an example of a flow of an image decoding process.

Next, an example of a flow of an image decoding process executed by the image decoding device 600 having the above configuration will be described with reference to a flowchart of FIG. 32.

When the image decoding process is started, in step S601, the accumulation buffer 611 acquires and holds (accumulates) coded data (bit stream) supplied from the outside of the image decoding device 600.

In step S602, the decoding unit 612 executes decoding processing, and decodes the coded data (bit stream) to obtain the quantization coefficient qcoeff. Furthermore, the decoding unit 612 parses (analyzes and acquires) various encoding parameters from the coded data (bit stream) by this decoding.

In step S603, the inverse quantization unit 613 performs inverse quantization, which is inverse processing of the quantization performed on the encoding side, on the quantization coefficient qcoeff obtained by the processing in step S602 to obtain the transform coefficient Coeff_IQ.

In step S604, the inverse orthogonal transform unit 614 performs inverse orthogonal transform processing, which is inverse processing of the orthogonal transform processing performed on the encoding side, on the transform coefficient Coeff IQ obtained in step S603 to obtain a prediction residual D'.

In step S605, the prediction unit 619 executes prediction processing by a prediction method designated by the encoding side on the basis of the information parsed in step S602, and generates the predicted image P by referring to the reference image stored in the frame memory 618 or the like.

In step S606, the calculation unit 615 adds the prediction residual D' obtained in step S604 and the predicted image P obtained in step S605 to derive the locally decoded image Rlocal.

In step S607, the in-loop filter unit 616 performs the in-loop filter processing on the locally decoded image Rlocal obtained by the processing of step S606.

In step S608, the rearrangement buffer 617 derives the decoded image R using the filtered locally decoded image Rlocal obtained by the processing in step S607, and rearranges the order of the group of decoded images R from the decoding order to the reproduction order. The group of the decoded images R rearranged in order of regeneration is output as moving images to outside of the image decoding device 600.

Furthermore, in step S609, the frame memory 618 stores at least one of the locally decoded image Rlocal obtained by the processing in step S606 and the locally decoded image Rlocal after the filter processing obtained by the processing in step S607.

When the processing of step S609 ends, the image decoding process ends.

The above-described present technology may be applied to the encoding processing executed in step S602 of such an image decoding process.

For example, in the decoding processing, each method described above in <3. Bypass encoding and bypass decoding of last coefficient position> may be applied. For example, in a case where the decoding unit 612 applies Method #1 in the decoding of the bit stream and sps_high_throughput_flag is true, a prefix portion (last_sig_coeff_{x, y}_prefix) of a last coefficient position included in the bit stream may be decoded as a bypass code bin. Similarly, the decoding unit 612 can apply each method described above in<3. Bypass encoding and bypass decoding of last coefficient position> in decoding the bit stream. By doing so, the image decoding device 600 can obtain an effect similar to the effect of each method described above in <3. Bypass encoding and bypass decoding of last coefficient position>. Therefore, the image decoding device 600 can reduce the generation amount of context encoding bins and suppress an increase in the processing amount of encoding and decoding. For example, the image decoding device 600 can reduce the processing amount of CABAC in decoding image data of high bit depth and high bit rate, and improve the throughput.

Furthermore, in the decoding processing, each method described above in <4. Skipping encoding or decoding of last coefficient position> may be applied. For example, in a case where the decoding unit 612 applies Method #1 in the decoding of the bit stream and sps_high_throughput_flag is true, the decoding of the last coefficient position may be skipped (omitted). Similarly, the decoding unit 612 can apply each method described above in <4. Skipping encoding or decoding of last coefficient position> in decoding the bit stream. By doing so, the image decoding device 600 can obtain an effect similar to the effect of each method described above in <4. Skipping encoding or decoding of last coefficient position>. Therefore, the image decoding device 600 can reduce the generation amount of context encoding bins and suppress an increase in the processing amount of encoding and decoding. For example, the image decoding device 600 can reduce the processing amount of CABAC in decoding image data of high bit depth and high bit rate, and improve the throughput.

7. Supplementary Note

<Computer>

The above-described series of processing can be executed by hardware or software. In a case where the series of processing is executed by software, a program constituting the software is installed in a computer. Here, the computer includes a computer incorporated in dedicated hardware, a general-purpose personal computer capable of executing various functions by installing various programs, and the like, for example.

Figure 33:
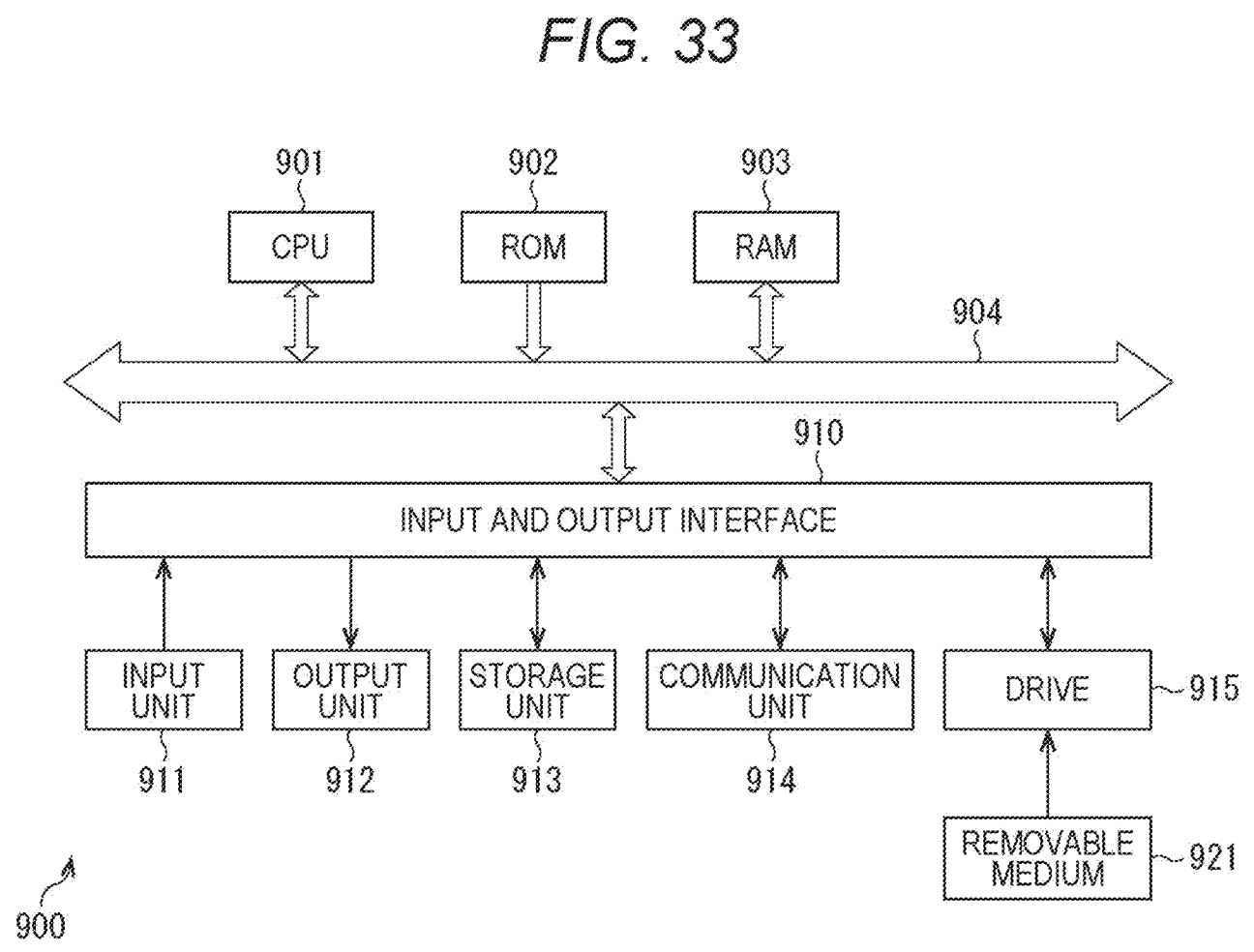

FIG. 33 is a block diagram illustrating a configuration example of hardware of a computer that executes the above-described series of processing by a program.

In a computer 900 illustrated in FIG. 33, a central processing unit (CPU) 901, a read only memory (ROM) 902, and a random access memory (RAM) 903 are mutually connected via a bus 904.

An input and output interface 910 is also connected to the bus 904. An input unit 911, an output unit 912, a storage unit 913, a communication unit 914, and a drive 915 are connected to the input and output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes a network interface, for example. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input and output interface 910 and the bus 904 and executes the program, whereby the above-described series of processing is performed. The RAM 903 also appropriately stores data and the like necessary for the CPU 901 to execute various processing.

The program executed by the computer can be applied by being recorded on, for example, the removable medium 921 as a package medium or the like. In this case, the program can be installed in the storage unit 913 via the input and output interface 910 by attaching the removable medium 921 to the drive 915.

Furthermore, this program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Applicable Target of the Present Technology>

The present technology can be applied to any image encoding system or decoding system. That is, as long as it does not contradict the present technology described above, the specifications of various processing related to the image encoding and decoding, such as conversion (inverse conversion), quantization (inverse quantization), encoding (decoding), and prediction are arbitrary, and are not limited to the above-described examples. Furthermore, some of these processing may be omitted as long as they do not contradict the present technology described above.

Furthermore, the present technology can be applied to a multi-view image encoding system that encodes a multi-view image including images of a plurality of viewpoints (views). Also, the present technology can be applied to a multi-view image decoding system that decodes coded data of a multi-view image including images of a plurality of viewpoints (views). In that case, the present technology is only required to be applied to encoding and decoding of each viewpoint (view). is only required to Moreover, the present technology can be applied to a hierarchical image encoding (scalable encoding) system that encodes a hierarchical image layered (hierarchized) so as to have a scalability function for a predetermined parameter. Furthermore, the present technology can be applied to a hierarchical image decoding (scalable decoding) system that decodes coded data of a hierarchical image layered (hierarchized) so as to have a scalability function for a predetermined parameter. In that case, the present technology is only required to be applied to encoding and decoding of each layer (layer).

Furthermore, the present technology can be applied to any configuration. For example, the present technology may be applied to various electronic devices such as a transmitter or receiver (for example, a television receiver or a mobile phone) for satellite broadcasting, wired broadcasting such as cable television, distribution on the Internet, or distribution to a terminal by cellular communication, a device (for example, a hard disk recorder or a camera) that records an image on a medium such as an optical disk, a magnetic disk, or a flash memory, or regenerates an image from the storage medium, or the like.

Furthermore, for example, the present technology can also be implemented as a partial configuration of a device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that, in the present specification, a system means a set of a plurality of components (devices, modules (parts), and the like), and it does not matter whether or not all the components are in the same housing. Consequently, both of a plurality of devices stored in different housings and connected via a network, and one device in which a plurality of modules is stored in one housing are systems.

<Field and Application to which the Present Technology is Applicable>

The system, device, processing unit and the like to which the present technology is applied may be used in arbitrary fields such as traffic, medical care, crime prevention, agriculture, livestock industry, mining, beauty care, factory, household appliance, weather, and natural surveillance, for example. Furthermore, any application thereof may be used.

For example, the present technology can be applied to systems and devices used for providing content for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine or the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife, and the like. Moreover, for example, the present technology can also be applied to systems and devices used for sports.

Others

Note that, in this specification, the "flag" is information for identifying a plurality of states, and includes not only information used for identifying two states of true (1) and false (0) but also information capable of identifying three or more states. Therefore, the value that may be taken by the "flag" may be, for example, a binary of I/O or a ternary or more. That is, the number of bits forming this "flag" is arbitrary, and may be one bit or a plurality of bits. Furthermore, identification information (including the flag) is assumed to include not only identification information thereof in a bit stream but also difference information of the identification information with respect to a certain reference information in the bit stream, and thus, in the present description, the "flag" and "identification information" include not only the information thereof but also the difference information with respect to the reference information.

Furthermore, various types of information (such as metadata) related to coded data (bit stream) may be transmitted or recorded in any form as long as it is associated with the coded data. Herein, the term "associate" is intended to mean to make, when processing one data, the other data available (linkable), for example. That is, the data associated with each other may be collected as one data or may be made individual data. For example, information associated with the coded data (image) may be transmitted on a transmission path different from that of the coded data (image). Furthermore, for example, the information associated with the coded data (image) may be recorded in a recording medium different from that of the coded data (image) (or another recording area of the same recording medium). Note that, this "association" may be not the entire data but a part of data. For example, an image and information corresponding to the image may be associated with each other in any unit such as a plurality of frames, one frame, or a part within a frame.

Note that, in the present specification, terms such as "combine", "multiplex", "add", "integrate", "include", "store", "put in", "introduce", "insert", and the like mean, for example, to combine a plurality of objects into one, such as to combine coded data and metadata into one data, and mean one method of "associating" described above.

Furthermore, the embodiments of the present technology are not limited to the above-described embodiments, and various modifications can be made without departing from the scope of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the above-described configurations may be added to the configuration of each device (or each processing unit). Moreover, when the configuration and operation of the entire system are substantially the same, part of the configuration of a certain device (or processing unit) may be included in the configuration of another device (or another processing unit).

Furthermore, for example, the above-described program may be executed in any device. In this case, it is sufficient that the device has a necessary function (functional block or the like) and is only required to obtain necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can also be executed as processes of a plurality of steps. Conversely, the processing described as a plurality of steps can be collectively executed as one step.

Furthermore, the program executed by the computer may have the following features. For example, the processing of the steps describing the program may be executed in time series in the order described in the present specification. Furthermore, the processing of the steps describing the program may be executed in parallel. Moreover, the processing of the steps describing the program may be individually executed at the necessary timing, such as when the program is called. That is, unless there is a contradiction, the processing of each step may be executed in an order different from the order described above. Furthermore, processing of steps describing this program may be executed in parallel with processing of another program. Moreover, the processing of the steps describing this program may be executed in combination with the processing of another program.

Furthermore, for example, a plurality of techniques related to the present technology can be implemented independently as a single body as long as there is no contradiction. Of course, a plurality of arbitrary present technologies can be implemented in combination. For example, part or all of the present technology described in any of the embodiments can be implemented in combination with part or all of the present technologies described in other embodiments. Furthermore, part or all of any of the above-described present technology can be implemented using together with another technology that is not described above.

Note that the present technology can also have the following configuration.

(1) An image processing device including an encoding unit that encodes a prefix portion of a last coefficient position included in image data as a bypass encoding bin in a case of a high-throughput mode in which a context encoding bin after the last coefficient position of the image data is processed as a bypass encoding bin.

(2) The image processing device according to (1), in which the encoding unit encodes the prefix portion of the last coefficient position as a context encoding bin in a case of not being in the high-throughput mode.

(3) The image processing device according to (1) or (2), in which the encoding unit encodes a suffix portion of the last coefficient position included in the image data as a bypass encoding bin.

(4) The image processing device according to any one of (1) to (3), in which in a case of the high-throughput mode, the encoding unit performs alignment processing of an encoding process immediately before encoding of the last coefficient position.

(5) The image processing device according to (4), in which in the alignment processing, the encoding unit sets a variable iVlCurrRange indicating a range in arithmetic encoding to 256.

(6) The image processing device according to (4) or (5), in which the encoding unit further sets a generation amount of a number of context encoding bins to 0 immediately before encoding of the last coefficient position.

(7) The image processing device according to any one of (4) to (6), in which in a case of not being in the high-throughput mode, the encoding unit derives a generation amount of a number of context encoding bins on a basis of a reference value of the number of context encoding bins and a transform block size immediately before encoding of the last coefficient position.

(8) An image processing method including encoding a prefix portion of a last coefficient position included in image data as a bypass encoding bin in a case of a high-throughput mode in which a context encoding bin after the last coefficient position of the image data is processed as a bypass encoding bin.

(11) An image processing device including a decoding unit that decodes a prefix portion of a last coefficient position included in coded data of image data as a bypass encoding bin in a case of a high-throughput mode in which a context encoding bin after the last coefficient position of the image data is processed as a bypass encoding bin.

(12) The image processing device according to (11), in which the decoding unit decodes the prefix portion of the last coefficient position as a context encoding bin in a case of not being in the high-throughput mode.

(13) The image processing device according to (11) or (12), in which the decoding unit decodes a suffix portion of the last coefficient position included in the coded data as a bypass encoding bin.

(14) The image processing device according to any one of (11) to (13), in which in a case of the high-throughput mode, the decoding unit performs alignment processing of a decoding process immediately before decoding of the last coefficient position.

(15) The image processing device according to (14), in which in the alignment processing, the decoding unit sets a variable iVlCurrRange indicating a range in arithmetic encoding to 256.

(16) The image processing device according to (14) or (15), in which the decoding unit further sets an generation amount of a number of context encoding bins to 0 immediately before decoding of the last coefficient position.

(17) The image processing device according to any one of (14) to (16), in which in a case of not being in the high-throughput mode, the decoding unit derives a generation amount of a number of context encoding bins on a basis of a reference value of the number of context encoding bins and a transform block size immediately before decoding of the last coefficient position.

(18) An image processing method including decoding a prefix portion of a last coefficient position included in coded data of image data as a bypass encoding bin in a case of a high-throughput mode in which a context encoding bin after the last coefficient position of the image data is processed as a bypass encoding bin.

(21) An image processing device including an encoding unit that skips encoding of a last coefficient position included in image data in a case of a high-throughput mode in which a context encoding bin after the last coefficient position of the image data is processed as a bypass encoding bin.

(22) The image processing device according to (21), in which the encoding unit sets the last coefficient position to a lower right coordinate in a transform block.

(23) The image processing device according to (21) or (22), in which the encoding unit encodes a prefix portion and a suffix portion of the last coefficient position in a case of not being in the high-throughput mode.

(24) The image processing device according to (23), in which the encoding unit encodes the prefix portion as a context encoding bin and encodes the suffix portion as a bypass encoding bin.

(25) The image processing device according to any one of (21) to (24), in which in a case of the high-throughput mode, the encoding unit performs alignment processing of an encoding process immediately before encoding of a first sub-block coefficient flag included in the image data.

(26) The image processing device according to (25), in which in the alignment processing, the encoding unit sets a variable iVlCurrRange indicating a range in arithmetic encoding to 256.

(27) The image processing device according to (25) or (26), in which the encoding unit further sets a generation amount of a number of context encoding bins to 0 immediately before encoding of the first sub-block coefficient flag.

(28) The image processing device according to any one of (25) to (27), in which in a case of not being in the high-throughput mode, the encoding unit derives a generation amount of a number of context encoding bins on a basis of a reference value of the number of context encoding bins and a transform block size immediately before encoding of the first sub-block coefficient flag.

(29) An image processing method including skipping encoding of a last coefficient position included in image data in a case of a high-throughput mode in which a context encoding bin after the last coefficient position of the image data is processed as a bypass encoding bin.

(31) An image processing device including a decoding unit that skips decoding of a last coefficient position in a case of a high-throughput mode in which a context encoding bin after the last coefficient position of image data is processed as a bypass encoding bin.

(32) The image processing device according to (31), in which the decoding unit sets the last coefficient position to a lower right coordinate in a transform block.

(33) The image processing device according to (31) or (32), in which the decoding unit decodes a prefix portion and a suffix portion of the last coefficient position in a case of not being in the high-throughput mode.

(34) The image processing device according to (33), in which the decoding unit decodes the prefix portion as a context encoding bin and decodes the suffix portion as a bypass encoding bin.

(35) The image processing device according to any one of (31) to (34), in which in a case of the high-throughput mode, the decoding unit performs alignment processing of a decoding process immediately before decoding of a first sub-block coefficient flag included in the coded data.

(36) The image processing device according to (35), in which in the alignment processing, the decoding unit sets a variable iVlCurrRange indicating a range in arithmetic encoding to 256.

(37) The image processing device according to (35) or (36), in which the decoding unit further sets a generation amount of a number of context encoding bins to 0 immediately before decoding of the first sub-block coefficient flag.

(38) The image processing device according to any one of (35) to (37), in which in a case of not being in the high-throughput mode, the decoding unit derives a generation amount of a number of context encoding bins on a basis of a reference value of the number of context encoding bins and a transform block size immediately before decoding of the first sub-block coefficient flag.

(39) An image processing method including skipping decoding of a last coefficient position in a case of a high-throughput mode in which a context encoding bin after the last coefficient position of image data is processed as a bypass encoding bin.

REFERENCE SIGNS LIST

200 Encoding device
211 Selection unit
212 TS residual encoding unit
213 Non-TS residual encoding unit
231 Setting unit
232 Last coefficient position encoding unit
233 Sub-block encoding unit
300 Decoding device
311 Selection unit
312 TS residual decoding unit
313 Non-TS residual decoding unit
331 Setting unit
332 Last coefficient position decoding unit
333 Sub-block decoding unit
500 Image encoding device
515 Encoding unit
600 Image decoding device
612 Decoding unit
900 Computer

The invention claimed is:

1. An image processing device comprising:
   a circuitry that skips encoding of a last coefficient position included in image data and omits an encoding bin corresponding to the last coefficient position from a bit stream of the image data in a case of a high-throughput mode in which a context encoding bin after the last coefficient position of the image data is processed as a bypass encoding bin.

2. The image processing device according to claim 1, wherein
   the circuitry encodes the prefix portion of the last coefficient position as a context encoding bin in a case of not being in the high-throughput mode.

3. The image processing device according to claim 1, wherein
   the circuitry encodes a suffix portion of the last coefficient position included in the image data as a bypass encoding bin.

4. The image processing device according to claim 1, wherein
   in a case of not being in the high-throughput mode, the circuitry derives a generation amount of a number of context encoding bins on a basis of a reference value of the number of context encoding bins and a transform block size immediately before encoding of the last coefficient position.

5. The image processing device according to claim 1, wherein the circuitry sets the last coefficient position to a lower right coordinate in a transform block.

6. The image processing device according to claim 1, wherein the circuitry encodes a prefix portion and a suffix portion of the last coefficient position in a case of not being in the high-throughput mode.

7. The image processing device according to claim 6, wherein the circuitry encodes the prefix portion as a context encoding bin and encodes the suffix portion as a bypass encoding bin.

8. The image processing device according to claim 1, wherein in a case of the high-throughput mode, the circuitry performs alignment processing of an encoding process immediately before encoding of a first sub-block coefficient flag included in the image data.

9. The image processing device according to claim 8, wherein in the alignment processing, the circuitry sets a variable iVlCurrRange indicating a range in arithmetic encoding to 256.

10. The image processing device according to claim 8, wherein the circuitry further sets a generation amount of a number of context encoding bins to 0 immediately before encoding of the first sub-block coefficient flag.

11. An image processing method comprising:

in a case of a high-throughput mode in which a context encoding bin after a last coefficient position included in image data is processed as a bypass encoding bin:

skipping encoding of the last coefficient position included in the image data; and omitting an encoding bin corresponding to the last coefficient position from a bit stream of the image data.

12. An image processing device comprising:

a circuitry that skips decoding of a last coefficient position in a case of a high-throughput mode in which a context encoding bin after the last coefficient position of image data is processed as a bypass encoding bin, an encoding bin corresponding to the last coefficient position not being included in a bit stream of the image data.

13. An image processing method comprising:

skipping decoding of a last coefficient position in a case of a high-throughput mode in which a context encoding bin after the last coefficient position of image data is processed as a bypass encoding bin, an encoding bin corresponding to the last coefficient position not being included in a bit stream of the image data.

\* \* \* \* \*